United States Patent
Akasaka et al.

(10) Patent No.: US 8,708,822 B2
(45) Date of Patent: Apr. 29, 2014

(54) INFORMATION PROCESSING SYSTEM AND PROGRAM

(75) Inventors: Hideya Akasaka, Kyoto (JP); Yuki Takahashi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1847 days.

(21) Appl. No.: 11/441,146

(22) Filed: May 26, 2006

(65) Prior Publication Data

US 2007/0060228 A1 Mar. 15, 2007

Related U.S. Application Data

(60) Provisional application No. 60/732,649, filed on Nov. 3, 2005.

(30) Foreign Application Priority Data

Sep. 1, 2005 (JP) .................................. 2005-253715

(51) Int. Cl.
| | | |
|---|---|---|
| A63F 9/00 | (2006.01) | |
| A63F 13/00 | (2014.01) | |
| G06F 17/00 | (2006.01) | |
| G06F 19/00 | (2011.01) | |

(52) U.S. Cl.
USPC .......................................................... 463/37

(58) Field of Classification Search
USPC ...................................... 463/36, 37, 47, 47.2
See application file for complete search history.

(56) References Cited

U.S. PATENT DOCUMENTS

| | | |
|---|---|---|
| 5,394,168 A | 2/1995 | Smith, III et al. |
| 5,554,980 A | 9/1996 | Hashimoto et al. |
| 5,602,566 A | 2/1997 | Motosyuku et al. |
| 6,839,049 B1 | 1/2005 | Koizumi |
| 7,796,116 B2 * | 9/2010 | Salsman et al. ............... 345/158 |
| 2002/0107069 A1 | 8/2002 | Ishino |
| 2002/0118168 A1 | 8/2002 | Hinckley et al. |
| 2002/0140666 A1 | 10/2002 | Bradski |
| 2003/0210255 A1 | 11/2003 | Hiraki |
| 2003/0216176 A1 | 11/2003 | Shimizu et al. |
| 2004/0233223 A1 | 11/2004 | Schkolne et al. |

FOREIGN PATENT DOCUMENTS

| | | |
|---|---|---|
| EP | 0 625 744 | 11/1994 |
| EP | 0 852 961 | 7/1998 |
| EP | 1 396 781 A2 | 3/2004 |
| JP | 6-308879 | 11/1994 |

(Continued)

OTHER PUBLICATIONS

Liang et al. "JDCAD: A Highly Interactive 3D Modeling System", Computer & Graphics, vol. 18, No. 4, pp. 499-506, 1994.

(Continued)

*Primary Examiner* — Reginald Renwick
(74) *Attorney, Agent, or Firm* — Nixon & Vanderhye, P.C.

(57) ABSTRACT

A game system comprises image obtaining means, direction calculation means, moving means, and display control means. The image obtaining means obtains an image taken by an imaging device. The direction calculation means calculates a direction originally determined from the image of an imaging target included in the image taken by the imaging device. The moving means moves an operation target in a predetermined direction in accordance with the calculated direction. The display control means generates an image in accordance with the movement of the operation target performed by the moving means and displays the generated image on a screen of a display device.

32 Claims, 33 Drawing Sheets

(56) References Cited

FOREIGN PATENT DOCUMENTS

| | | |
|---|---|---|
| JP | 07-302148 | 11/1995 |
| JP | 08-122070 | 5/1996 |
| JP | 10-230077 | 9/1998 |
| JP | 2002-233665 | 8/2002 |
| JP | 2002-282541 | 10/2002 |
| JP | 3422383 | 4/2003 |
| JP | 2003-280785 | 10/2003 |
| JP | 2005-021458 | 1/2005 |
| WO | 01/86920 | 11/2001 |
| WO | 2004/012130 | 2/2004 |
| WO | WO 2004/051391 A2 | 6/2004 |
| WO | 2004/066615 | 8/2004 |
| WO | WO 2005/062273 A1 | 7/2005 |

OTHER PUBLICATIONS

Bowman et al., "Testbed Evaluation of Virtual Environment Interaction Techniques", VRST'99, Proceedings of the ACM Symposium on Virtual Reality Software and Technology ACM New York, NY, USA 1999, 8 pages.

Mine, "ISAAC: A Virtual Environment Tool for the Interactive Construction of Virtual Worlds", Technical Report TR95-020, 1995, University of North Carolina at Chapel Hill, 11 pages.

Extended European Search Report issued Aug. 22, 2008 in corresponding European Application No. 06011205.9-2218.

You S. et al: "Fusion of vision and gyro tracking for robust augmented reality registration", Proceedings IEEE Virtual Reality 2001 IEEE Computer Society, Los Alamitos, CA, USA, 2001 pp. 71-78.

Notice of Allowance mailed Jan. 30, 2012 in related U.S. Appl. No. 11/445,280, now U.S. Patent No. 8,157,651 (8 pages).

\* cited by examiner

Fig. 19

| | STATE OF THE CONTROLLER | TAKEN IMAGE | IMAGES DISPLAYED IN THE WINDOW |
|---|---|---|---|
| STATE A | 8a, 8b, 2, 7 | 17; 8a', 8b' | BOOMERANG 74b; MEDICINE 74c; BOMB 74d |
| STATE B | 8a, 8b, 2, 7 | 18; 8a', 8b' | MEDICINE 74c; BOMB 74d; ROPE 74e |
| STATE C | 8a, 8b, 2, 7 | 19; 8b', 8a' | SWORD 74a; BOOMERANG 74b; MEDICINE 74c |

| | STATE OF THE CONTROLLER | TAKEN IMAGE |
|---|---|---|
| STATE A |  |  |
| STATE B |  |  |

| | STATE OF THE CONTROLLER | MOVING DIRECTION |
|---|---|---|
| STATE A |  | STOP |
| STATE B |  | FORWARD |
| STATE C |  | BACKWARD |

| | STATE OF THE CONTROLLER | ACCELERATION |
|---|---|---|
| STATE A |  θa | 0 |
| STATE B |  7 | A1 |
| STATE C |  θb | Amax |

INFORMATION PROCESSING SYSTEM AND PROGRAM

CROSS REFERENCE OF RELATED APPLICATION

The disclosure of Japanese Patent Application No. 2005-253715 is incorporated herein by reference. This application also claims the benefit of Provisional Application No. 60/732,649, filed Nov. 3, 2005, the entire contents of which is hereby incorporated by in this application.

BACKGROUND OF THE INVENTION

1. Field of the Invention

The present invention relates to an information processing system and program, and more particularly to an information processing system operable by a user using an operation device including an imaging device and a program used for the same.

2. Description of the Background Art

Conventionally, technologies for designating a specific position on a display screen using an optical pointing system have been proposed. For example, an optical pointing system described in Japanese Laid-Open Patent Publication No. 6-308879 is used for conferences or the like held for a plurality of viewers. According to this system, a light emitting element is provided in the vicinity of the display screen, and an imaging device using an optic/electric conversion element is built in an indicator. The user can designate an arbitrary position on the display screen using the indicator as follows. The indicator takes an image of the light emitting element by the imaging device and the position designated by the user is calculated based on the obtained image. A mark is displayed at the calculated position, and thus the designated position is indicated with the mark.

A game controller which uses an optical pointing system substantially the same as the above has been proposed (see, for example, Japanese Laid-Open Patent Publication No. 8-71252). The controller has a shape of a gun and is used for a shooting game. The shooting game is for shooting a target displayed on the screen with a gun. The gun is used for designating an arbitrary position (to which the bullet is to hit) on the screen. The gun-shaped controller has a built-in CCD camera, and light emitting elements located at four positions around the screen are imaged by the CCD camera. The controller calculates the rotation angle or the inclining angle of the gun using the obtained images. The controller uses the calculation result to detect whether or not the gun is correctly directed toward the target displayed on the screen, and thus determines whether or not the bullet has hit the target. With such a structure, a game system by which the player performs a game operation by moving the controller (gun) held in his/her hand can be realized.

With the above-described technologies, the operation device held in the user's hand (the indicator or the gun-shaped controller) is only used for designating a position on the display screen. Namely, the above-described indicator or gun-shaped controller allows the player to perform only one operation of designating a position on the display screen but not any other operation. For example, when used for a game apparatus, such an operation device allows the player to perform only one simple game operation of designating a position on the display screen. Since the game operation is so simple that the game itself is simple and is not entertaining.

SUMMARY OF THE INVENTION

Therefore, an object of the present invention is to provide an information processing system allowing the user to perform a new type of operation using an input device held in his/her hand and a program used for such an information processing system.

The present invention has the following features to attain the object mentioned above. The reference numerals, additional explanations and the like in parentheses in this section of the specification indicate the correspondence with the embodiments described later for easier understanding of the present invention and do not limit the present invention in any way.

A first aspect of the present invention is directed to a computer readable storage medium having stored thereon a program executable by a computer (CPU 10, etc.) of an information processing apparatus (game apparatus 3) for receiving operation data from an operation device (controller 7) including imaging means (imaging element 40) for taking an image of an imaging target (markers 8*a* and 8*b*) and for displaying, on a display device (monitor 2), a virtual space obtained by performing calculation processing on a predetermined operation target (image in the window, player object 81, player cart 91) using the operation data. The program causes the computer to execute an obtaining step (S1), a vector calculation step (S16), a first moving step (S3), and a display step (S4). The obtaining step obtains a taken image taken by the imaging means of the operation device as the operation data. The vector calculation step calculates a two-dimensional vector (vector represented by direction data 57) using a position of the imaging target in the taken image. The first moving step moves the operation target in a predetermined direction in accordance with a calculated value of the two-dimensional vector. The display step displays the virtual space, changed in accordance with the movement of the operation target in the first moving step, on a display area of the display device.

According to a second aspect of the present invention, the vector calculation step may include a first calculation step and a second calculation step. The first calculation step calculates coordinate sets of two predetermined points in the image of the imaging target in a coordinate system corresponding to the taken image. The second calculation step calculates the two-dimensional vector connecting the coordinate sets of the two predetermined points.

A third aspect of the present invention is directed to a computer readable storage medium having stored thereon a program executable by a computer (CPU 10, etc.) of an information processing apparatus (game apparatus 3). The information processing apparatus receives operation data from an operation device (controller 7) and displays, on a display device (monitor 2), a virtual space obtained by performing calculation processing on a predetermined operation target (image in the window, player object 81, player cart 91) using the operation data. The operation device includes imaging means (imaging element 40) for taking an image of an imaging target and first calculation means (image processing circuit 41) for calculating coordinate sets of two predetermined points in the image of the imaging target included in a taken image taken by the imaging means. The program causes the computer to execute an obtaining step (S1), a second calculation step, a first moving step (S3), and a display step (S4). The obtaining step obtains the coordinate sets of the two predetermined points as the operation data. The second calculation step calculates a two-dimensional vector connecting the coordinate sets of the two predetermined points. The first moving step moves the operation target in a predetermined direction in accordance with a calculated value of the two-dimensional vector. The display step displays the virtual space, changed in accordance with the movement of the operation target in the first moving step, on a display area of the display device.

A fourth aspect of the present invention is directed to a computer readable storage medium having stored thereon a program executable by a computer (CPU 10, etc.) of an information processing apparatus (game apparatus 3). The information processing apparatus receives operation data from an operation device (controller 7) and displays, on a display device (monitor 2), a virtual space obtained by performing calculation processing on a predetermined operation target (image in the window, player object 81, player cart 91) using the operation data. The operation device includes imaging means (imaging element 40) for taking an image of an imaging target and vector calculation means (image processing circuit 41) for calculating a two-dimensional vector using a position of the imaging target in a taken image taken by the imaging means. The program causes the computer to execute an obtaining step (S1), a first moving step (S3), and a display step (S4). The obtaining step obtains the two-dimensional vector as the operation data. The first moving step moves the operation target in a predetermined direction accordance with an obtained value of the two-dimensional vector. The display step displays an image of the virtual space, changed in accordance with the movement of the operation target in the first moving step, on a display area of the display device.

According to a fifth aspect of the present invention, the program may further cause the computer to execute an indicated coordinate set calculation step (S24). The indicated coordinate set calculation step calculates a predetermined indicated coordinate set which corresponds to a position on the display area, in correspondence with a position of the image of the imaging target in the taken image obtained in the obtaining step. The first moving step moves the operation target by a calculation using the two-dimensional vector and the indicated coordinate set.

According to a sixth aspect of the present invention, the program may further cause the computer to execute an indicated coordinate set calculation step. The indicated coordinate set calculation step calculates a predetermined indicated coordinate set which corresponds to a position on the display area, in correspondence with a coordinate set of an intermediate point between the two predetermined points. The first moving step moves the operation target by a calculation using the two-dimensional vector and the indicated coordinate set.

According to a seventh aspect of the present invention, the operation data may further include a coordinate set of at least one point corresponding to a position of the image of the imaging target. In this case, the program further causes the computer to execute an indicated coordinate set calculation step. The indicated coordinate set calculation step calculates a predetermined indicated coordinate set which corresponds to a position on the display area, in correspondence with the coordinate set of the at least one point. The first moving step moves the operation target by a calculation using the two-dimensional vector and the indicated coordinate set.

According to an eighth aspect of the present invention, the indicated coordinate set calculation step may include a first step (S31, S32) and a second step (S24). The first step calculates a position of the image of the imaging target in the case where the image taken by the imaging means is rotated around the center of the image and the two-dimensional vector is directed in one certain direction by the rotation. The second step calculates the indicated coordinate set which corresponds to the position on the display area, in correspondence with the position calculated in the first step.

According to a ninth aspect of the present invention, the program may further cause the computer to execute an indicated coordinate set calculation step. The indicated coordinate set calculation step sets a predetermined indicated coordinate set which corresponds to a position on the display area as an indicated coordinate set. The first moving step moves the operation target by a calculation using the two-dimensional vector and the indicated coordinate set.

According to a tenth aspect of the present invention, the program may further cause the computer to execute an object location step (S42, S51). The object location step locates at least one object (player object 81, player cart 91) in the virtual space. The first moving step moves any one of the at least one object located in the virtual space as the operation target.

According to an eleventh aspect of the present invention, the program may further cause the computer to execute an object location step (S42, S51), a determination step (S25), and an operation target setting step. The object location step locates at least one object in the virtual space. The determination step determines whether or not any one of the at least one object is displayed at the position on the display area which corresponds to the indicated coordinate set calculated in the indicated coordinate set calculation step. The operation target setting step, when it is determined that one of the at least one object is displayed at the position which corresponds to the indicated coordinate set, sets the one object as the operation target. The first moving step moves the one object which is set in the operation target setting step.

According to a twelfth aspect of the present invention, the virtual space may be a virtual three-dimensional space. In this case, the object location step locates at least one three-dimensional object in the virtual three-dimensional space. The first moving step moves one of the at least one three-dimensional object in a predetermined three-dimensional direction in the virtual space.

According to a thirteenth aspect of the present invention, the virtual space may be a virtual three-dimensional space. In this case, the program further causes the computer to execute a virtual camera setting step (S51) and an operation target setting step. The virtual camera setting step sets a virtual camera directed in a predetermined direction at a predetermined position in the virtual space. The operation target setting step sets the virtual camera as the operation target. The first moving step moves the virtual camera as the operation target in a predetermined three-dimensional direction in the virtual space. The display step displays an image of the virtual space seen from the virtual camera on the display area.

According to a fourteenth aspect of the present invention, the virtual space may be a virtual three-dimensional space. In this case, the program further causes the computer to execute a three-dimensional indicated coordinate set setting step (S46). The three-dimensional indicated coordinate set setting step calculates a three-dimensional coordinate set in the virtual space which corresponds to the indicated coordinate set calculated in the indicated coordinate set calculation step and sets the three-dimensional coordinate set (coordinate set of the target position in the second example) as a three-dimensional indicated coordinate set. The first moving step moves the operation target by a calculation using the two-dimensional vector and the three-dimensional indicated coordinate set.

According to a fifteenth aspect of the present invention, the first moving step may move the operation target in a direction toward a position of the indicated coordinate set calculated in the indicated coordinate set calculation step.

According to a sixteenth aspect of the present invention, the first moving step may move the operation target in a direction toward a position of the three-dimensional coordinate set calculated in the three-dimensional indicated coordinate set setting step.

According to a seventeenth aspect of the present invention, the virtual space may include an object (image in the window; for example, the menu image in the first example) to be displayed in a predetermined range (window) of the display area in the display step. The virtual space has, for example, a concept encompassing a game space constructed three-dimensionally, a two-dimensional space, and a desktop screen of a personal computer. In this case, the first moving step moves a display content of the object such that an image displayed in the predetermined range is scrolled in the predetermined direction.

According to an eighteenth aspect of the present invention, the virtual space may include an object (image in the window; for example, the menu image in the first example) to be displayed in a predetermined range (window) of the display area in the display step. In this case, the program further causes the computer to execute an operation target setting step (S25). The operation target setting step determines whether or not the indicated coordinate set is included in a range corresponding to the predetermined range, and when the indicated coordinate set is included, sets the object as the operation target. The first moving step moves a display content of the object which is set in the operation target setting step, such that an image displayed in the predetermined range is scrolled in the predetermined direction.

According to a nineteenth aspect of the present invention, the virtual space may include an object to be displayed in a predetermined range of the display area as item images representing selectable items in the display step. In this case, the first moving step moves a display content of the object which is set in the operation target setting step, such that the selectable items are scrolled in the predetermined direction to be displayed in the predetermined range sequentially. The program further causes the computer to execute a selection input acceptance step (S26) and an item determination step (S27, S28). The selection input acceptance step accepts an instruction input showing that one of the selectable items is selected. The item determination step, when the instruction input is accepted at the point when one of the item images is displayed at a position of the indicted coordinate set calculated in the indicated coordinate set calculation step, determines that the selectable item represented by the one of the item images is selected.

According to a twentieth aspect of the present invention, a moving path of the operation target may be preset. In this case, the first moving step moves the operation target in a direction along the moving path.

According to a twenty-first aspect of the present invention, the program may further cause the computer to execute an inclination calculation step (S33, S44, S53). The inclination calculation step calculates a difference between a direction of the two-dimensional vector and a predetermined reference direction as an angle or a vector. The first moving step moves the operation target in accordance with the difference calculated in the inclination calculation step.

According to a twenty-second aspect of the present invention, the first moving step may determine a moving amount of the operation target in accordance with a value of the difference calculated in the inclination calculation step.

According to a twenty-third aspect of the present invention, the first moving step may determine a velocity at which the operation target is to move in accordance with a value of the difference calculated in the inclination calculation step.

According to a twenty-fourth aspect of the present invention, the first moving step may determine an acceleration at which the operation target is to move in accordance with a value of the difference calculated in the inclination calculation step.

According to a twenty-fifth aspect of the present invention, the first moving step may determine a position in the predetermined direction in which the operation target is to move in accordance with a value of the difference calculated in the inclination calculation step.

According to a twenty-sixth aspect of the present invention, the first moving step may move the operation target when the value of the difference calculated in the inclination calculation step exceeds a predetermined value.

According to a twenty-seventh aspect of the present invention, the operation target may be movable in two predetermined directions. In this case, the first moving step determines a direction in which the operation target is to move among the two predetermined directions in accordance with a comparison result of the value of the difference calculated in the inclination calculation step and a predetermined reference value.

According to a twenty-eighth aspect of the present invention, the information processing apparatus may comprise storage means (main memory 13) and operation acceptance means (operation section 32 of the controller 7). The storage means stores the reference direction. The operation acceptance means accepts a predetermined operation from a user. The program further causes the computer to execute a storage control step (S41). The storage control step stores, in the storage means, a direction of the two-dimensional vector calculated at the point when the predetermined operation is accepted by the operation acceptance means as a new reference direction.

According to a twenty-ninth aspect of the present invention, the information processing apparatus may comprise storage means (main memory 13). The storage means stores the reference direction. The program further causes the computer to execute a storage control step. The storage control step, when a two-dimensional vector is newly calculated, stores a direction of the two-dimensional vector previously calculated, in the storage means as the reference direction.

According to a thirtieth aspect of the present invention, the operation device may comprise inclination determining means (including acceleration sensor 37) for determining an inclination of the operation device. In this case, the program further causes the computer to execute a determination step, an inclination obtaining step, and a second moving step. The determination step determines whether or not a vector can be calculated from the taken image in the vector calculation step. The inclination obtaining step, when it is determined in the determination step that the vector cannot be calculated, obtains inclination data representing the inclination of the operation device determined by the inclination determining means. The second moving step, when it is determined in the determination step that the vector cannot be calculated, moves the operation target in the predetermined direction in accordance with the inclination represented by the inclination data. The vector calculation step stops processing of calculating the vector when it is determined in the determination step that the vector cannot be calculated.

A thirty-first aspect of the present invention is directed to an information processing system comprising an operation device (controller 7), an information processing apparatus (game apparatus 3), a display device (monitor 2). The operation device is operable by a user and includes imaging means (imaging element 40) for taking an image of a predetermined imaging target (markers 8a and 8b). The information processing apparatus is communicably connected to the operation device. The display device displays a result obtained by processing executed by the information processing apparatus. The information processing system comprises display control means (CPU 10, etc. for executing step S4; hereinafter, only the step number executed by each means will be shown), first calculation means (image processing circuit 41), second calculation means (S16), and first moving means (S3). The display control means displays a window on the display device. The first calculation means calculates coordinate sets of two predetermined points in the image of the imaging target included in a taken image taken by the imagining means. The second calculation means calculates a two-dimensional vector connecting the coordinate sets of the two predetermined points. The first moving means obtains a rotation amount based on a calculated value of the two-dimensional vector and a value of a two-dimensional vector previously calculated, and scrolls a content in the window in accordance with the rotation amount.

According to a thirty-second aspect of the present invention, the display control means may have a function of displaying a plurality of windows. The information processing system further comprises indicated coordinate set calculation means. The indicated coordinate set calculation means calculates an indicated coordinate set of one point on the display area of the display device, based on a positional relationship between the coordinate sets of the two predetermined points in the taken image. The first moving means detects one of the plurality of windows which overlaps the indicated coordinate set and scrolls a content in the one window in accordance with the rotation amount.

According to the first aspect, a two-dimensional vector is calculated in the vector calculation step from the image of the imaging target (taken image). The value of the two-dimensional vector changes in accordance with the rotation state of the operation device including the imaging device. Accordingly, by displaying the operation target so as to move in accordance with the direction of the two-dimensional vector, the operation target can be moved in accordance with the operation of rotating the operation device. Namely, according to the first aspect, a novel operation method by which the user can move the operation target by rotating the operation device itself held in his/her hand is provided. Also according to the first aspect, the taken image is obtained from the operation device, and therefore the operation device only needs to have a function of taking an image. Thus, the structure of the operation device can be simplified.

According to the second aspect, the positions of the two predetermined points in the image of the imaging target are calculated. Therefore, a two-dimensional vector can be easily calculated using the positions of the two points.

According to the third aspect, like in the first aspect, a novel operation method by which the user can move the operation target by rotating the operation device itself held in his/her hand is provided. Also according to the third aspect, the positions of the two predetermined points in the image of the imaging target are calculated by the operation device. Therefore, the information processing apparatus can easily calculate a two-dimensional vector using the positions of the two points. Thus, the processing load of the computer of the information processing apparatus can be alleviated.

According to the fourth aspect, like in the first aspect, a novel operation method by which the user can move the operation target by rotating the operation device itself held in his/her hand is provided. Also according to the fourth aspect, a two-dimensional vector is calculated by the operation device. Therefore, the information processing apparatus does not need to execute processing of calculating the two-dimensional vector. Thus, the processing load of the computer of the information processing apparatus can be alleviated.

According to the fifth aspect, a position on the display area is calculated in the indicated coordinate set calculation step from the position of the image of the imaging target in the taken image. Therefore, the user can designate a position on the display area with the operation device usable while being held in his/her hand. In addition, the operation target is moved using the position designated by the user and the two-dimensional vector. Therefore, a more complicated moving operation is made possible with the operation device usable while being held in the user's hand, and the user can control the movement of the operation target more precisely.

According to the sixth aspect, a position on the display area is calculated in the indicated coordinate set calculation step from the position of the image of the imaging target in the taken image. Therefore, the user can designate a position on the display area with the operation device usable while being held in his/her hand. In addition, the operation target is moved using the position designated by the user and the two-dimensional vector. Therefore, a more complicated moving operation is made possible with the operation device usable while being held in the user's hand, and the user can control the movement of the operation target more precisely.

According to the seventh aspect, a position on the display area is calculated in the indicated coordinate set calculation step from the position of the image of the imaging target in the taken image. Therefore, the user can designate a position on the display area with the operation device usable while being held in his/her hand. In addition, the operation target is moved using the position designated by the user and the two-dimensional vector. Therefore, a more complicated moving operation is made possible with the operation device usable while being held in the user's hand, and the user can control the movement of the operation target more precisely.

The position of the image of the imaging target in the taken image is different in accordance with the rotation state of the operation device (see FIG. 23). Namely, even if the operation device indicates one position, the position of the image of the imaging target may be different depending on the rotation state of the operation device. In this case, the position indicated by the operation device (i.e., the position of the indicated coordinate set to be calculated in the indicated coordinate set calculation step) cannot be accurately calculated from the position of the image of the imaging target. By contrast, according to the eighth aspect, the position of the image of the imaging target, in the case where the image taken by the imaging means is rotated so as to be directed in one certain direction, is calculated. Therefore, the influence of the rotation state of the operation device can be eliminated, and the position on the display screen or in the virtual space can be accurately calculated from the position of the taken image in the indicated coordinate set calculation step.

According to the ninth aspect, a position on the display area is calculated in the indicated coordinate set calculation step from the position of the image of the imaging target in the taken image. Therefore, the user can designate a position on the display area with the operation device usable while being held in his/her hand. In addition, the operation target is moved using the position designated by the user and the two-dimensional vector. Therefore, a more complicated moving operation is made possible with the operation device usable while being held in the user's hand, and the user can control the movement of the operation target more precisely.

According to the tenth aspect, the user can move the object which appears in the virtual three-dimensional space by a novel operation of rotating the operation device itself.

According to the eleventh aspect, the object displayed at the position on the display area corresponding to the indicated coordinate set calculated in the indicated coordinate set calculation step is set as the operation target. Therefore, the user can perform an operation of designating the object displayed on the display screen using the operation device. In addition, the user can move the designated object using the operation device. Thus, the user can issue two types of instructions, i.e., an instruction regarding the selection of the object as the operation target and an instruction to move the selected object, with one type of operation, i.e., an operation on a posture of the operation device while holding the operation device in his/her hand.

According to the twelfth aspect, the object which is present in the virtual three-dimensional space can be moved by a novel operation of rotating the operation device itself.

According to the thirteenth aspect, by moving the virtual camera in the first moving step, the position of the point of attention or the viewing direction with respect to the image of the virtual space displayed on the display screen can be changed. The user can change the position of the point of attention or the viewing direction with respect to the image of the virtual space displayed on the display screen using a novel operation of rotating the operation device itself.

According to the fourteenth aspect, the object which is present in the virtual three-dimensional space can be moved by a novel operation of rotating the operation device itself.

According to the fifteenth aspect, the operation target is moved to the position on the display screen which is represented by the indicated coordinate set. Thus, the user can designate a position on the display screen and move the operation target up to the designated position, using the operation device. Thus, the user can designate a desired position and move the operation target to that position using the operation device, as opposed to merely moving the operation target using the operation device. Therefore, the user can control the movement of the operation target more precisely. Addition, the user can issue two types of instructions, i.e., an instruction to execute the movement and an instruction to designate a position to which the operation target is to move, with one type of operation, i.e., an operation on a posture of one operation device.

According to the sixteenth aspect, the operation target is moved to the position in the virtual space which is represented by the indicated coordinate set. Thus, the user can designate a position in the virtual space and move the operation target up to the designated position, using the operation device. Thus, the user can designate a desired position and move the operation target to that position in the virtual three-dimensional space using the operation device, as opposed to merely moving the operation target using the operation device. Therefore, the user can control the movement of the operation target more precisely. In addition, the user can issue two types of instructions, i.e., an instruction to execute the movement and an instruction to designate a position to which the operation target is to move, with one type of operation, i.e., an operation on a posture of one operation device.

According to the seventeenth aspect, the operation of scrolling the image displayed in the predetermined range can be performed by a novel operation of rotating the operation device itself.

According to the eighteenth aspect, an object in the predetermined range which is at the position represented by the indicated coordinate set is set as the operation target. Thus, the user can perform an operation of designating an object displayed in the display area using the operation device. In addition, the user can scroll the designated object using the operation device. Therefore, the user can issue two types of instructions, i.e., an instruction regarding the selection of the object as the operation target and an instruction to scroll the selected object, with one type of operation, i.e., an operation on a posture of one operation device while holding the operation device in his/her hand.

According to the nineteenth aspect, the user can perform an operation of selecting an item displayed in the display area using the operation device. In addition, the user can scroll the image in the predetermined area using the operation device. Therefore, the user can issue an instruction regarding the selection of the object as the operation target, an instruction to scroll the selected object, and also an instruction to select the item displayed in the predetermined range, with one type of operation, i.e., an operation on a posture of one operation device.

According to the twentieth aspect, the operation target can be moved along the moving path by a novel operation of rotating the operation device itself. By freely setting the moving path, the operation can be freely moved.

According to the twenty-first aspect, the operation target is moved in accordance with the difference between the direction of the two-dimensional vector and the reference direction. This difference changes in accordance with the degree to which the operation device is to be rotated. Therefore, the moving manner of the operation target can be changed by the degree to which the operation device is to be rotated.

According to the twenty-second aspect, the moving amount of the operation target is determined based on the above-mentioned difference. Therefore, the user can change the moving amount of the operation target by changing the degree to which the operation device is to be rotated. Thus, the user can intuitively and easily control the moving amount of the operation target.

According to the twenty-third aspect, the velocity of the operation target is determined based on the above-mentioned difference. Therefore, the user can change the velocity of the operation target by changing the degree to which the operation device is to be rotated. Thus, the user can intuitively and easily control the velocity of the operation target.

According to the twenty-fourth aspect, the acceleration of the operation target is determined based on the above-mentioned difference. Therefore, the user can change the acceleration of the operation target by changing the degree to which the operation device is to be rotated. Thus, the user can intuitively and easily control the acceleration of the operation target.

According to the twenty-fifth aspect, the position of the operation target is determined based on the above-mentioned difference. Therefore, the user can change the position of the operation target by changing the degree to which the operation device is to be rotated. Thus, the user can intuitively and easily control the position of the operation target.

If the operation target is moved as a result of responding too sensitively to the rotation angle of the operation device, the user is required to operate the operation device precisely, which deteriorates the operability of the operation device. By contrast, according to the twenty-sixth aspect, the operation target is not moved unless the above-mentioned difference exceeds the predetermined range. Therefore, a so-called "play" margin can be set in the rotation operation of the operation device. Thus, the operability of the operation device can be improved.

According to the twenty-seventh aspect, the direction in which the operation target is to move differs depending on which of the above-mentioned difference and the predetermined reference value is greater. Therefore, the user can change the moving direction of the operation target by changing the direction in which the operation device is to be rotated.

According to the twenty-eighth aspect, the reference direction is updated by the user performing the predetermined operation. The user can freely set the reference direction, and thus can change the settings of the operation device so as to be easily usable to himself/herself.

According to the twenty-ninth aspect, the operation target is moved in accordance with the difference between the direction of the two-dimensional vector previously calculated and the direction of the two-dimensional vector currently calculated. Therefore, the operation target can be moved by a relative rotation angle of the operation target.

According to the thirtieth aspect, when the operation device is held by the user in the state of exceeding a range in which the imaging means can take an image of the imaging target (operable range described later), the operation target is rotated in accordance with the inclination determined by the inclination determining means. Therefore, even if the operable range is exceeded while the user is performing an operation of moving the operation device, the rotation of the operation target can be continued.

According to the thirty-first aspect, a two-dimensional vector is calculated from the image of the imaging target (taken image) in the second calculation step. The value of the two-dimensional vector changes in accordance with the rotation state of the operation device including the imaging device. The information processing apparatus scrolls the content in the window in accordance with the rotation amount obtained based on the two-dimensional vector. Therefore, the user can move the operation target in accordance with an operation of rotating the operation device. Namely, according to the thirty-first aspect, a novel operation method by which the user can scroll the window by rotating the operation device itself held in his/her hand is provided.

According to the thirty-second aspect, the window at the position represented by the indicated coordinate set is the target of scrolling. Therefore, the user can perform an operation of designating the window using the operation device. In addition, the user can scroll the designated object using the operation device. Accordingly, the user can issue two types of instructions, i.e., an instruction regarding the selection of the window as the operation target and an instruction to scroll the selected window, with one type of operation, i.e., an operation on a posture of one operation device while holding the operation device in his/her hand.

These and other objects, features, aspects and advantages of the present invention will become more apparent from the following detailed description of the present invention when taken in conjunction with the accompanying drawings.

BRIEF DESCRIPTION OF THE DRAWINGS

FIG. 19 shows a change of an image in the window by a rotation operation;

DESCRIPTION OF THE PREFERRED EMBODIMENTS

Figure 1:
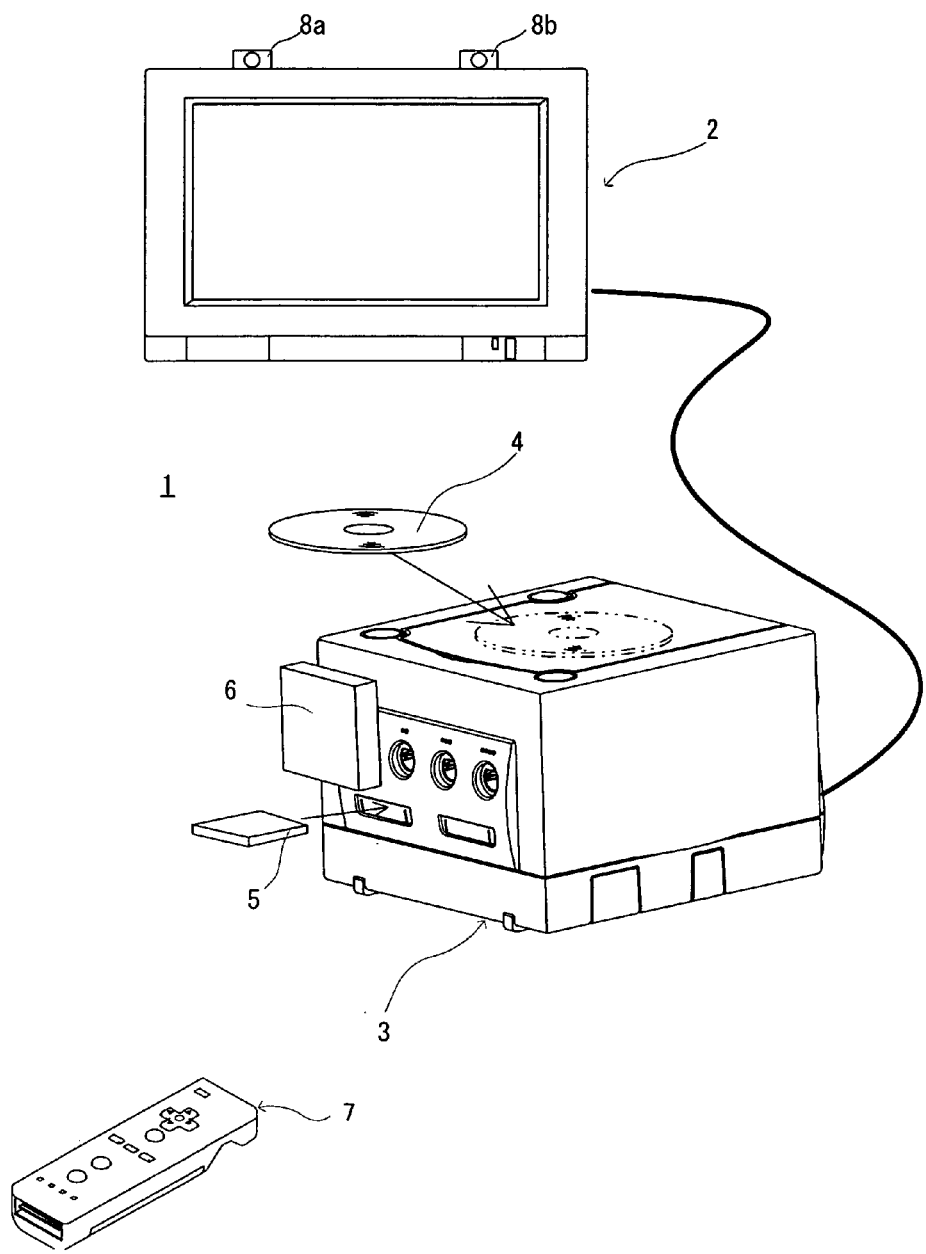
FIG. 1 is an external view of a game system 1 as an exemplary information processing system according to one embodiment of the present invention.

With reference to FIG. 1, a game system 1 as an example of an information processing system according to one embodiment of the present invention will be described. FIG. 1 is an external view illustrating the game system 1. In the following exemplary description, the game system 1 according to the present invention is of an installation type.

As shown in FIG. 1, the game system 1 includes an installation type game apparatus (hereinafter, referred to simply as a "game apparatus") 3, which is connected to a display (hereinafter, referred to as a "monitor") 2 such as a home-use TV receiver including a speaker 22 via a connection cord, and a controller 7 for giving operation data to the game apparatus 3. Two markers 8a and 8b are provided in the vicinity of the monitor 2 (above the screen of the monitor 2 in FIG. 1). The markers 8a and 8b are specifically infrared LEDs, and each outputs light including infrared light forward from the monitor 2. The game apparatus 3 is connected to a receiving unit 6 via a connection terminal. The receiving unit 6 receives operation data which is wirelessly transmitted from the controller 7. The controller 7 and the game apparatus 3 are connected to each other by wireless communication. On the game apparatus 3, an optical disc 4 as an example of an exchangeable information storage medium is detachably mounted. The game apparatus 3 has, on a top main surface thereof, a power ON/OFF switch, a game processing reset switch, and an OPEN switch for opening a top lid of the game apparatus 3. When a player presses the OPEN switch, the lid is opened, so that the optical disc 4 is mounted or dismounted.

On the game apparatus 3, an external memory card 5 is detachably mounted when necessary. The external memory card 5 has a backup memory or the like mounted thereon for fixedly storing saved data or the like. The game apparatus 3 executes a game program or the like stored on the optical disc 4 and displays the result on the monitor 2 as a game image. The game apparatus 3 can also reproduce a state of a game played in the past using saved data stored on the memory card 5 and display the game image on the monitor 2. The player playing with the game apparatus 3 can enjoy the game by operating the controller 7 while watching the game image displayed on the display screen of the monitor 2.

The controller 7 wirelessly transmits operation data from a communication section 36 included therein (described later) to the game apparatus 3 connected to the receiving unit 6, using the technology of, for example, Bluetooth (registered trademark). The controller 7 is operation means for operating an operation target (an object displayed on the display screen of the monitor 2 or a virtual camera). The controller 7 includes an operation section having a plurality of operation buttons. As described later in detail, the controller 7 also includes an imaging information calculation section 35 for taking an image seen from the controller 7. The imaging information calculation section 35 takes an image of each of the markers 8a and 8b located in the vicinity of the monitor 2. The game apparatus 3 uses these images to obtain an operation signal corresponding to the position and the posture of the controller 7.

Figure 2:
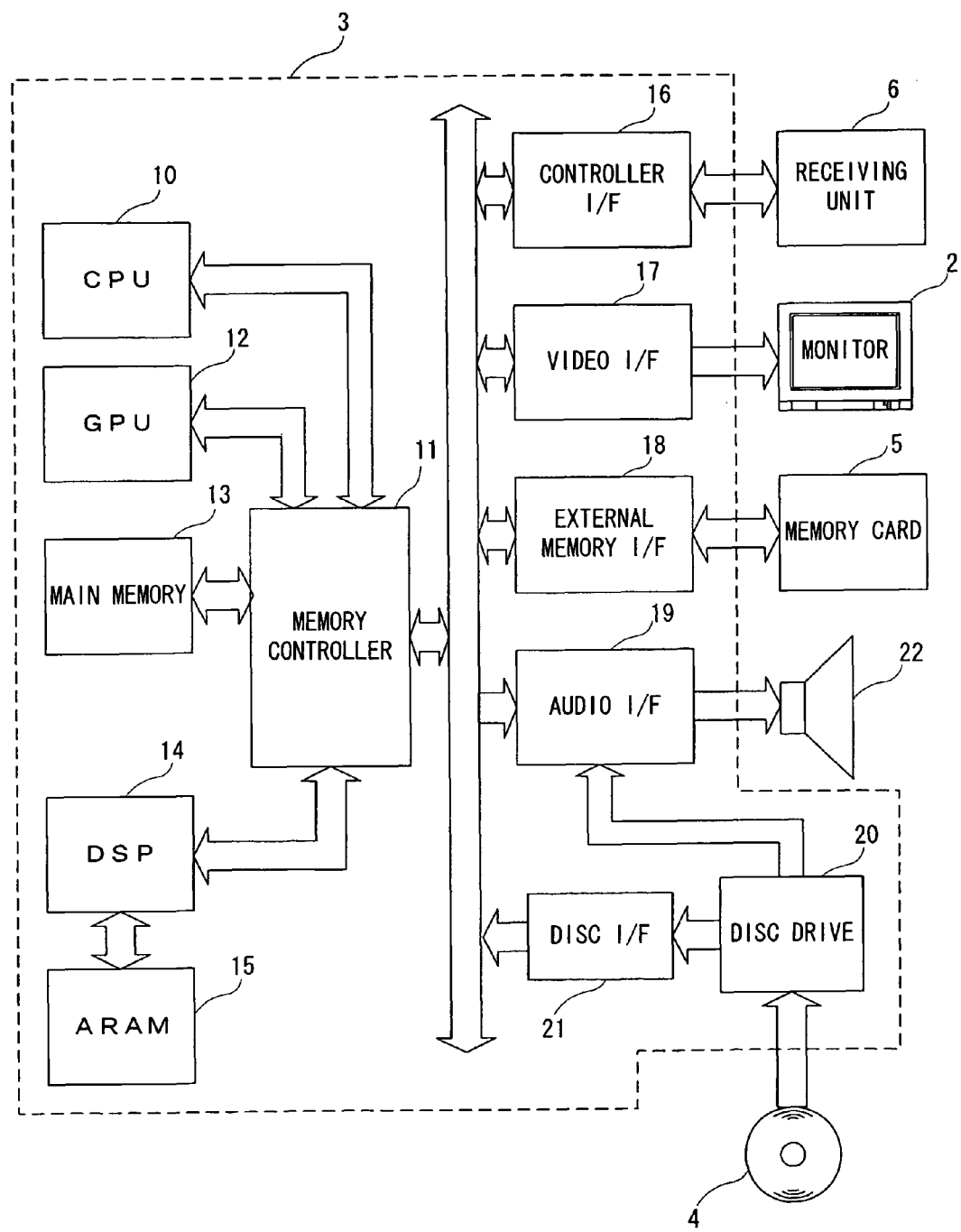
FIG. 2 is a functional block diagram of a game apparatus 3.

With reference to FIG. 2, a structure of the game apparatus 3 will be described. FIG. 2 is a functional block diagram of the game apparatus 3.

As shown in FIG. 2, the game apparatus 3 includes, for example, a RISC CPU (central processing unit) 10 for executing various types of programs. The CPU 10 executes a start program stored in a boot ROM (not shown) to, for example, initialize memories including a main memory 13, and then executes a game program stored on the optical disc 4 to perform game processing or the like in accordance with the game program. The CPU 10 is connected to a GPU (Graphics Processing Unit) 12, the main memory 13, a DSP (Digital Signal Processor) 14, and an ARAM (Audio RAM) 15 via a memory controller 11. The memory controller 11 is connected to a controller I/F (interface) 16, a video I/F 17, an external memory I/F 18, an audio I/F 19, and a disc I/F 21 via a predetermined bus. The controller I/F 16, the video I/F 17, the external memory I/F 18, the audio I/F 19 and the disc I/F 21 are respectively connected to the receiving unit 6, the monitor 2, the external memory card 5, the speaker 22 and a disc drive 20.

The GPU 12 performs image processing based on an instruction from the CPU 10. The GPU 12 includes, for example, a semiconductor chip for performing calculation processing necessary for displaying 3D graphics. The GPU 12 performs the image processing using a memory dedicated for image processing (not shown) and a part of the storage area of the main memory 13. The GPU 12 generates game image data and a movie to be displayed on the display screen of the monitor 2 using such memories, and outputs the generated data or movie to the monitor 2 via the memory controller 11 and the video I/F 17 as necessary.

The main memory 13 is a storage area used by the CPU 10, and stores a game program or the like necessary for processing performed by the CPU 10 as necessary. For example, the main memory 13 stores a game program read from the optical disc 4 by the CPU 10, various types of data or the like. The game program, the various types of data or the like stored in the main memory 13 are executed by the CPU 10.

The DSP 14 processes sound data or the like generated by the CPU 10 during the execution of the game program. The DSP 14 is connected to the ARAM 15 for storing the sound data or the like. The ARAM 15 is used when the DSP 14 performs predetermined processing (for example, storage of the game program or sound data already read). The DSP 14 reads the sound data stored in the ARAM 15 and outputs the sound data to the speaker 22 included in the monitor 2 via the memory controller 11 and the audio I/F 19.

The memory controller 11 comprehensively controls data transfer, and is connected to the various I/Fs described above. The controller I/F 16 includes, for example, four controller I/Fs, and communicably connects the game apparatus 3 to an external device which is engageable via connectors of the controller I/Fs. For example, the receiving unit 6 is engaged with such a connector and is connected to the game apparatus 3 via the controller I/F 16. As described above, the receiving unit 6 receives the operation data from the controller 7 and outputs the operation data to the CPU 10 via the controller I/F 16. In other embodiments, the game apparatus 3 may include a receiving module for receiving the operation data transmitted from the controller 7, instead of the receiving unit 6. In this case, the operation data received by the receiving module is output to the CPU 10 via a predetermined bus. The video I/F 17 is connected to the monitor 2. The external memory I/F 18 is connected to the external memory card 5 and is accessible to a backup memory or the like provided in the external card 5. The audio I/F 19 is connected to the speaker 22 built in the monitor 2, and is connected such that the sound data read by the DSP 14 from the ARAM 15 or sound data directly output from the disc drive 20 is output from the speaker 22. The disc I/F 21 is connected to the disc drive 20. The disc drive 20 reads data stored at a predetermined reading position of the optical disc 4 and outputs the data to a bus of the game apparatus 3 or the audio I/F 19.

Figure 3A:
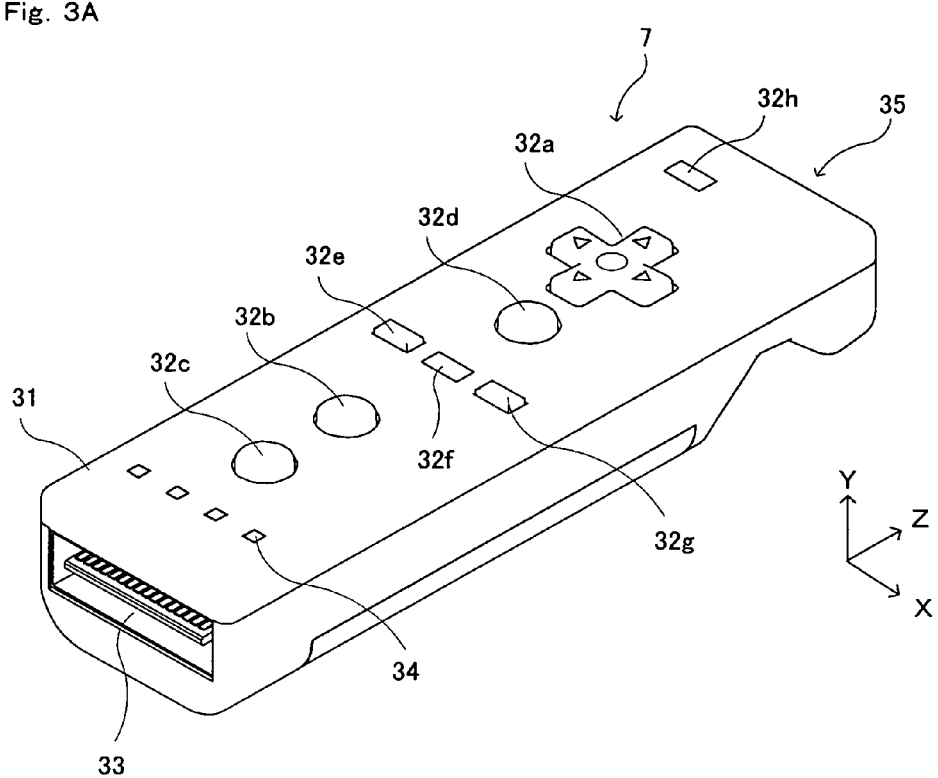
FIG. 3A is an isometric view of a controller 7 seen from the top rear side thereof.
Figure 3B:
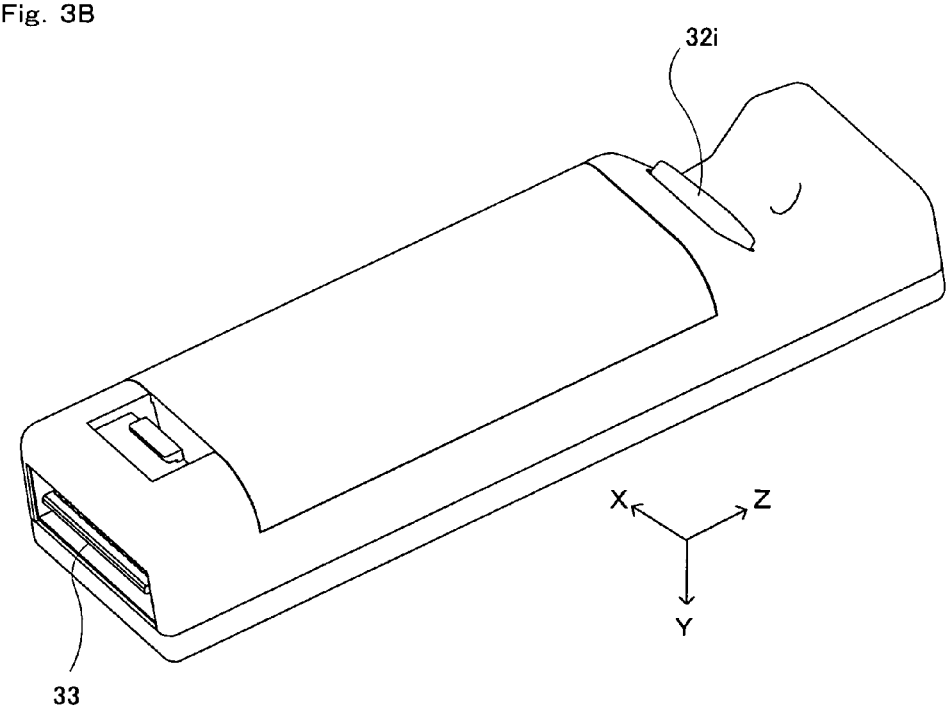
FIG. 3B is an isometric view of the controller 7 seen from the bottom rear side thereof.
Figure 4:
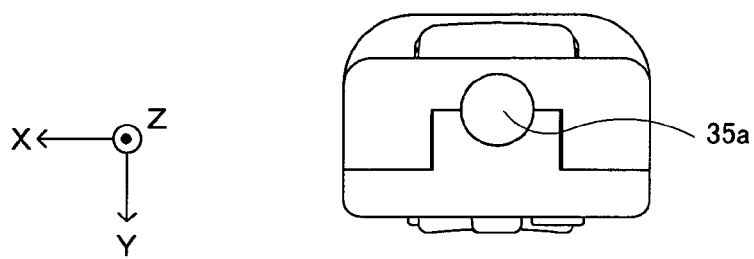
FIG. 4 is a front view of the controller 7.

With reference to FIG. 3A through FIG. 7, the controller 7 will be described. FIG. 3A through FIG. 5B are external isometric views of the controller 7. FIG. 3A is an isometric view of the controller 7 seen from the top rear side thereof. FIG. 3B is an isometric view of the controller 7 seen from the bottom rear side thereof. FIG. 4 is a front view of the controller 7.

As shown in FIG. 3A, FIG. 3B and FIG. 4, the controller 7 includes a housing 31 formed by plastic molding or the like. The housing 31 has a generally parallelepiped shape extending in a longitudinal or front-rear direction (the Z-axis direction shown in FIG. 3A). The overall size of the housing 31 is small enough to be held by one hand of an adult or even a child. The player can use the controller 7 to perform a game operation of pressing buttons provided thereon and also to perform a game operation of changing the position or direction of the controller 7 itself. For example, the player can rotate the controller 7 with the longitudinal direction thereof as an axis to move an operation target. The player can change the position indicated by the controller 7 on the display screen to, for example, move the operation target toward the post-change position. The "position indicated by the controller 7 on the display screen" refers to a position at which a phantom straight line extending from a front end of the controller 7 in the longitudinal direction crosses the display screen of the monitor 2. Hereinafter, such a position will be sometimes referred to as an "indicated position" or an "indicated position by the controller 7". The longitudinal direction of the controller 7 (housing 31) will be sometimes referred to as an "indicated direction".

The housing 31 has a plurality of operation buttons. Provided on a top surface of the housing 31 are a cross key 32a, an X button 32b, a Y button 32c, a B button 32d, a select switch 32e, a menu switch 32f, and a start switch 32g. On a bottom surface of the housing 31, a recessed portion is formed. On a rear slope surface of the recessed portion, an A button 32i is provided. These buttons and switches are assigned various functions in accordance with the game program executed by the game apparatus 3, but this will not be described in detail because the functions are not directly relevant to the present invention. On the top surface of the housing 31, a power switch 32h is provided for remotely turning on or off the game apparatus 3.

Figure 5A:
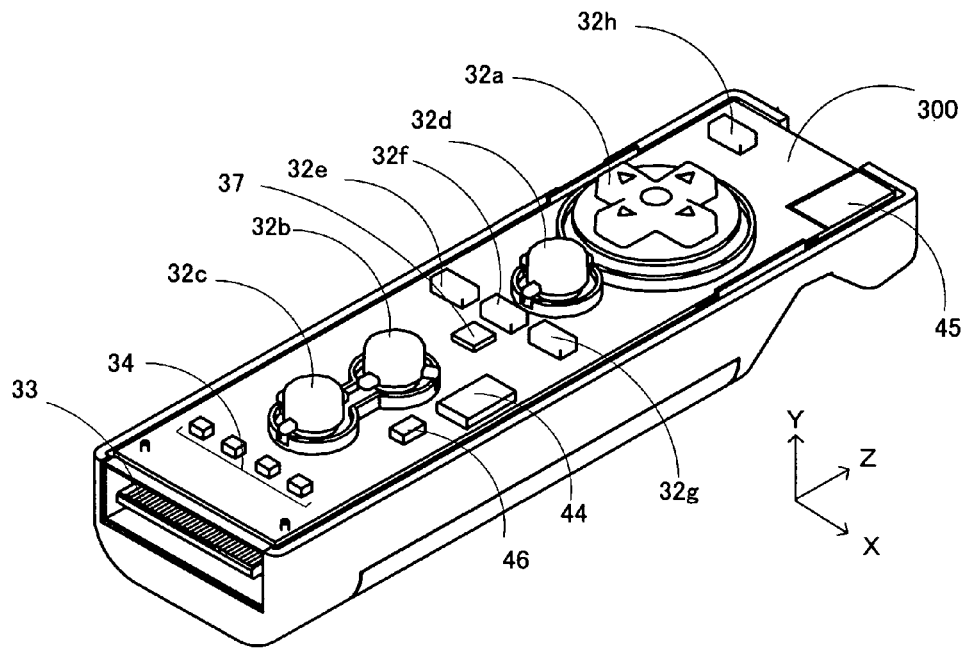
FIG. 5A is an isometric view illustrating a state where an upper casing of the controller 7 is removed.
Figure 5B:
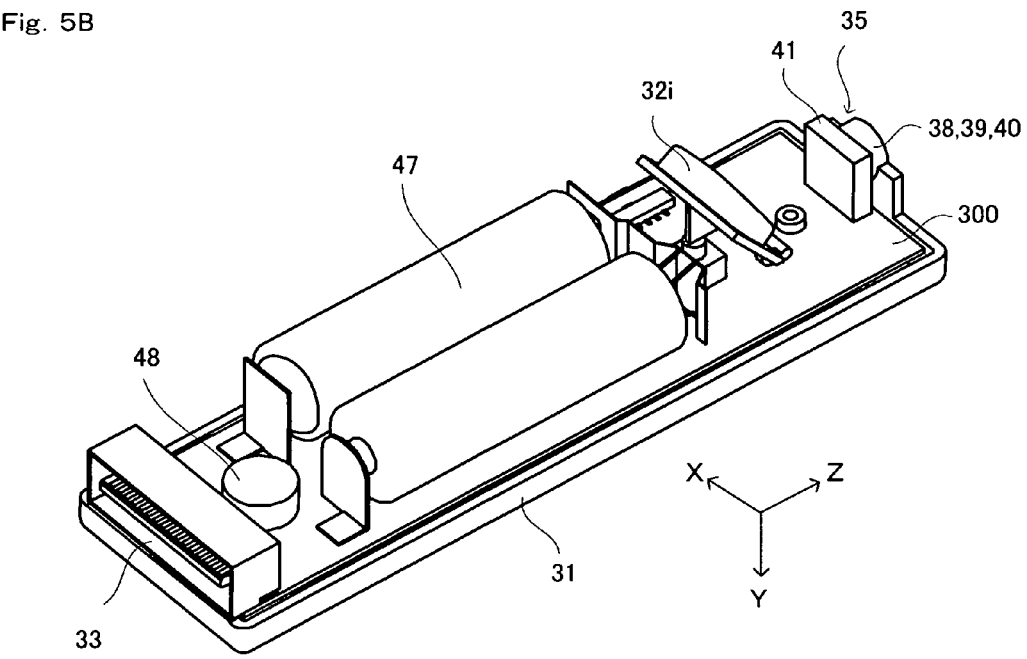
FIG. 5B is an isometric view illustrating a state where a lower casing of the controller 7 is removed.

The controller 7 has the imaging information calculation section 35 (FIG. 5B). As shown in FIG. 4, a light incident opening 35a of the imaging information calculation section 35 is provided on a front surface of the housing 31. On a rear surface of the housing 31, a connector 33 is provided. The connector 33 is, for example, a 32-pin edge connector, and is used for connecting the controller 7 to another device. In a rear part of the top surface of the housing 31, a plurality of LEDs 34 are provided. The controller 7 is assigned a controller type (number) so as to be distinguishable from the other controllers 7. The LEDs 34 are used for informing the player of the controller type which is currently set to controller 7 that he/she is using. Specifically, when the controller 7 transmits the operation data to the game apparatus 3, one of the plurality of LEDs 34 corresponding to the controller type is lit up.

Figure 6:
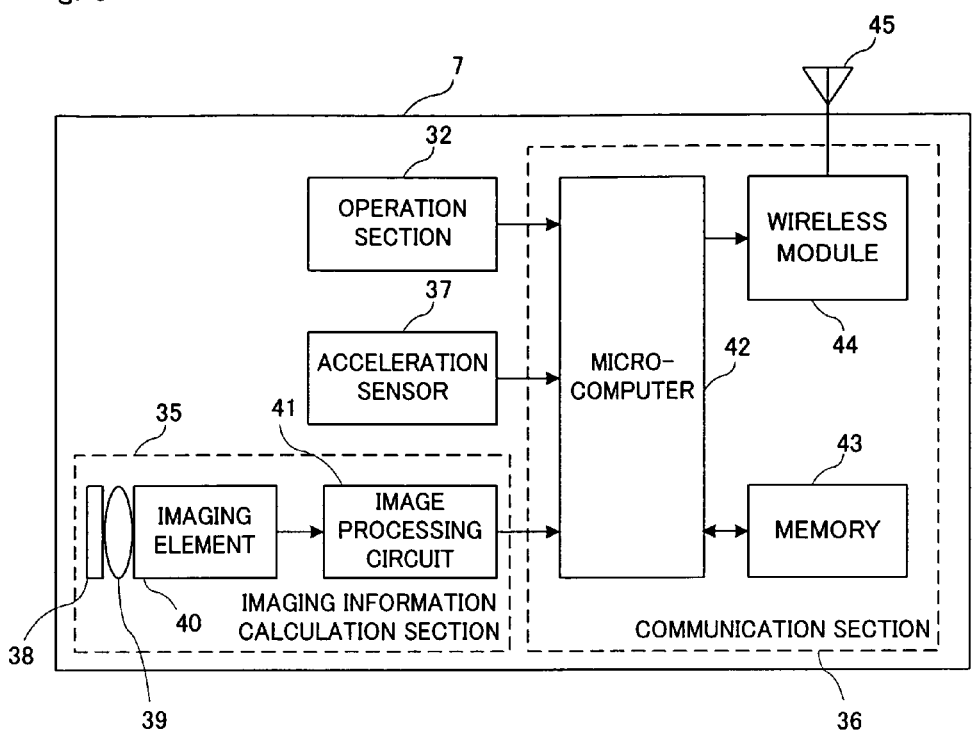
FIG. 6 is a block diagram illustrating a structure of the controller 7.

With reference to FIG. 5A, FIG. 5B and FIG. 6, an internal structure of the controller 7 will be described. FIG. 5A and FIG. 5B illustrate an internal structure of the controller 7. FIG. 5A is an isometric view illustrating a state where an upper casing (a part of the housing 31) of the controller 7 is removed. FIG. 5B is an isometric view illustrating a state where a lower casing (a part of the housing 31) of the controller 7 is removed. FIG. 5B shows a reverse side of a substrate 300 shown in FIG. 5A.

As shown in FIG. 5A, the substrate 300 is fixed inside the housing 31. On a top main surface of the substrate 300, the operation buttons 32a through 32h, an acceleration sensor 37, the LEDs 34, a quartz oscillator 46, a wireless module 44, an antenna 45 and the like are provided. These elements are connected to a microcomputer 42 (see FIG. 6) via lines (not shown) formed on the substrate 300 and the like. The wireless module 44 and the antenna 45 allow the controller 7 to act as a wireless controller. The quartz oscillator 46 generates a reference clock of the microcomputer 42 described later.

As shown in FIG. 5B, at a front edge of a bottom main surface of the substrate 300, the imaging information calculation section 35 is provided. The imaging information calculation section 35 includes an infrared filter 38, a lens 39, an imaging element 40 and an image processing circuit 41 located in this order from the front surface of the controller 7. These elements are attached to the bottom main surface of the substrate 300. At a rear edge of the bottom main surface of the substrate 300, the connector 33 is attached. The operation button 32i is attached on the bottom main surface of the substrate 300 rearward to the imaging information calculation section 35, and cells 47 are accommodated rearward to the operation button 32i. On the bottom main surface of the substrate 300 between the cells 47 and the connector 33, a vibrator 48 is attached. The vibrator 48 may be, for example, a vibration motor or a solenoid. The controller 7 is vibrated by an actuation of the vibrator 48, and the vibration is conveyed to the player holding the controller 7. Thus, a so-called vibration-responsive game is realized.

FIG. 6 is a block diagram showing the structure of the controller 7. The controller 7 includes the communication section 36 and the acceleration sensor 37 in addition to the above-described operation section 32 (operation buttons) and the imaging information calculation section 35.

The imaging information calculation section 35 is a system for analyzing image data taken by imaging means and detecting the position of the center of gravity, the size and the like of an area having a high brightness in the image data. The imaging information calculation section 35 has, for example, a maximum sampling period of about 200 frames/sec., and therefore can trace and analyze even a relatively fast motion of the controller 7.

Specifically, the imaging information calculation section 35 includes the infrared filter 38, the lens 39, the imaging element 40 and the image processing circuit 41. The infrared filter 38 allows only infrared light to pass therethrough, among light incident on the front surface of the controller 7. The markers 8a and 8b located in the vicinity of the display screen of the monitor 2 are infrared LEDs for outputting infrared light forward from the monitor 2. Therefore, the provision of the infrared filter 38 allows the image of each of the markers 8a and 8b to be taken more accurately. The lens 39 collects the infrared light which has passed through the infrared filter 38 and outputs the infrared light to the imaging element 40. The imaging element 40 is a solid-state imaging device such as, for example, a CMOS sensor or a CCD. The imaging element 40 takes an image of the infrared light collected by the lens 39. Accordingly, the imaging element 40 takes an image of only the infrared light which has passed through the infrared filter 38 and generates image data. Hereinafter, an image taken by the imaging element 40 will be referred to as a "taken image". The image data generated by the imaging element 40 is processed by the image processing circuit 41. The image processing circuit 41 calculates the positions of the imaging targets (the markers 8a and 8b) in the taken image, and outputs coordinate sets indicating the respective positions of the markers 8a and 8b in the taken image to the communication section 36. The processing executed by the image processing circuit 41 will be described later in detail.

The acceleration sensor 37 detects an acceleration in three axial directions of the controller 7, i.e., the up-down direction (Y-axis direction in FIG. 3A), the left-right direction (X-axis direction in FIG. 3A), and the front-rear direction (the Z-axis direction in FIG. 3A). The acceleration sensor 37 allows the inclinations of the controller 7 in the X-axis, Y-axis and Z-axis directions to be determined. The game apparatus 3 can also determine a rotation angle of the controller 7 around the Z axis by the acceleration sensor 37, in addition to based on the taken image mentioned above. Data representing accelerations detected by the acceleration sensor 37 is output to the communication section 36.

As explained above, the controller 7 preferably includes a three-axis, linear acceleration sensor 37 that detects linear acceleration in each of the three axial directions described above. Alternatively, a two axis linear accelerometer that only detects linear acceleration along each of the X-axis and Y-axis (or other pair of axes) may be used in another embodiment depending on the type of control signals desired. As a non-limiting example, the three-axis or two-axis linear accelerometer 37 may be of the type available from Analog Devices, Inc. or STMicroelectronics N.V. Preferably, the acceleration sensor 37 is an electrostatic capacitance or capacitance-coupling type that is based on silicon micro-machined MEMS (microelectromechanical systems) technology. However, any other suitable accelerometer technology (e.g., piezoelectric type or piezoresistance type) now existing or later developed may be used to provide the three-axis or two-axis acceleration sensor 37.

As one skilled in the art understands, linear accelerometers, as used in acceleration sensor 37, are only capable of detecting acceleration along a straight line corresponding to each axis of the acceleration sensor. In other words, the direct output of the acceleration sensor 37 is limited to signals indicative of linear acceleration (static or dynamic) along each of the two or three axes thereof. As a result, the acceleration sensor 37 cannot directly detect movement along a non-linear (e.g. arcuate) path, rotation, rotational movement, angular displacement, tilt, position, attitude or any other physical characteristic.

However, through additional processing of the linear acceleration signals output from the acceleration sensor 37, additional information relating to the controller 7 can be inferred or calculated, as one skilled in the art will readily understand from the description herein. For example, by detecting static, linear acceleration (i.e., gravity), the linear acceleration output of the acceleration sensor 37 can be used to infer or calculate tilt or inclination of the object relative to the gravity vector by correlating tilt angles with detected linear acceleration. In this way, the acceleration sensor 37 can be used in combination with the micro-computer 42 (or another processor) to determine tilt, attitude or position of the controller 7. Similarly, various movements and/or positions of the controller 7 can be calculated or inferred through processing of the linear acceleration signals generated by the acceleration sensor 37 when the controller 7 containing the acceleration sensor 37 is subjected to dynamic accelerations by, for example, the hand of a user. In another embodiment, the acceleration sensor 37 may include an embedded signal processor or other type of dedicated processor for performing any desired processing of the acceleration signals output from the accelerometers therein prior to outputting signals to micro-computer 42. For example, the embedded or dedicated processor could convert the detected acceleration signal to a corresponding tilt angle when the acceleration sensor is intended to detect static acceleration (i.e., gravity).

In another exemplary embodiment, the acceleration sensor 37 may be replaced with a gyro-sensor of any suitable technology incorporating, for example, a rotating or vibrating element. Exemplary MEMS gyro-sensors that may be used in this embodiment are available from Analog Devices, Inc. Unlike the linear acceleration sensor 37, a gyro-sensor is capable of directly detecting rotation (or angular rate) around an axis defined by the gyroscopic element (or elements) therein. Thus, due to the fundamental differences between a gyro-sensor and a linear acceleration sensor (e.g., angle-based vs. vector-based output), corresponding changes need to be made to the processing operations that are performed on the output signals from these devices depending on which device is selected for a particular application. More specifically, when tilt or inclination is calculated using a gyro-sensor instead of the acceleration sensor, significant changes are necessary. Specifically, when using a gyro-sensor, the value of inclination is initialized at the start of detection. Then, data on the angular velocity which is output from the gyroscope is integrated. Furthermore, a change amount in inclination from the value of inclination previously initialized is calculated. In this case, the calculated inclination corresponds to an angle. In contrast, when an acceleration sensor is used, the inclination is calculated by comparing the value of the acceleration of gravity of each axial component with a predetermined reference. Therefore, the calculated inclination can be represented as a vector. Thus, without initialization, an absolute direction can be determined with an accelerometer. The type of the value calculated as an inclination is also very different between a gyroscope and an accelerometer; i.e., the value is an angle when a gyroscope is used and is a vector when an acceleration sensor is used. Therefore, when a gyroscope is used instead of an acceleration sensor or vice versa, data on inclination also needs to be processed by a predetermined conversion that takes into account the fundamental differences between these two devices. Due to the fact that the nature of gyroscopes is known to one skilled in the art, as well as the fundamental differences between linear accelerometers and gyroscopes, further details are not provided herein so as not to obscure the remainder of the disclosure. While gyro-sensors provide certain advantages due to their ability to directly detect rotation, linear acceleration sensors are generally more cost effective when used in connection with the controller applications described herein.

The communication section 36 includes the microcomputer 42, a memory 43, the wireless module 44 and the antenna 45. The microcomputer 42 controls the wireless module 44 for wirelessly transmitting the data obtained by the microcomputer 42 while using the memory 43 as a storage area during processing.

Data which is output from the operation section 32, the acceleration sensor 37 and the imaging information calculation section 35 to the microcomputer 42 is temporarily stored in the memory 43. The wireless transmission from the communication section 36 to the receiving unit 6 is performed at a predetermined time interval. Since game processing is generally performed at a cycle of 1/60 sec., the wireless transmission needs to be performed at a cycle of a shorter time period. At the transmission timing to the receiving unit 6, the microcomputer 42 outputs the data stored in the memory 43 to the wireless module 44 as operation data. The wireless module 44 uses, for example, the Bluetooth (registered trademark) technology to modulate a carrier wave of a predetermined frequency with the operation data and radiate the resultant very weak electric signal from the antenna 45. Namely, the operation data is modulated into a very weak electric signal by the wireless module 44 and transmitted from the controller 7. The very weak electric signal is received by the receiving unit 6 on the side of the game apparatus 3. The received very weak electric signal is demodulated or decoded, so that the game apparatus 3 can obtain the operation data. The CPU 10 of the game apparatus 3 executes the game processing based on the obtained operation data and the game program.

The shape of the controller 7, and the shape, number, position or the like of the operation buttons and switches shown in FIG. 3A through FIG. 5B are merely exemplary, and may be altered without departing from the scope of the present invention. The position of the imaging information calculation section 35 in the controller 7 (the light incident opening 35a of the imaging information calculation section 35) does not need to be on the front surface of the housing 31, and may be on another surface as long as light can enter from the outside of the housing 31. In this case, the "indicated direction" is a direction vertical to the light incident opening.

By using the controller 7, the player can perform a game operation, which was not possible conventionally, of changing the position of the controller 7 itself or rotating the controller 7, in addition to the pressing of the operation buttons or switches. Hereinafter, the game operations using the controller 7 will be described.

Figure 7:
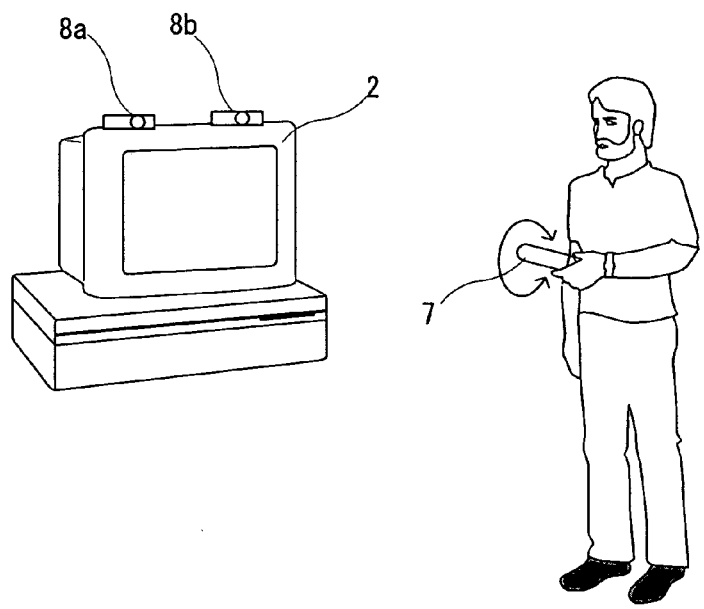
FIG. 7 shows a general view of a game operation using the controller 7.

FIG. 7 is a general view of a game operation using the controller 7. As shown in FIG. 7, when playing the game using the controller 7 with the game system 1, the player holds the controller 7 with one hand (for example, left hand). The markers 8a and 8b are located parallel to the transverse or width direction of the monitor 2. The player holds the controller 7 such that the front surface of the controller 7 (having the light incident opening 35a by which the imaging information calculation section 35 takes the image of each of the markers 8a and 8b) faces the markers 8a and 8b. In this state, the player rotates the controller 7 (as indicated by the arrows in FIG. 7) or changes the position indicated by the controller 7 on the display screen to perform the game operations.

Figure 8:
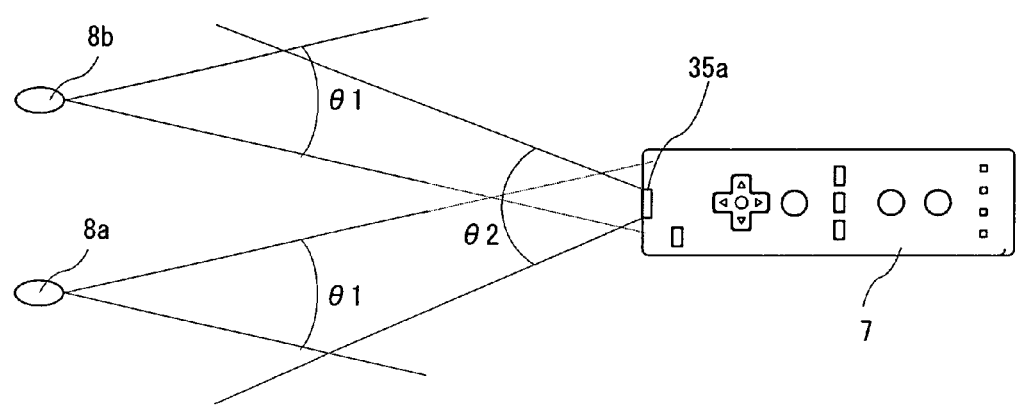
FIG. 8 illustrates the viewing angles of markers 8a and 8b and the controller 7.
Figure 9:
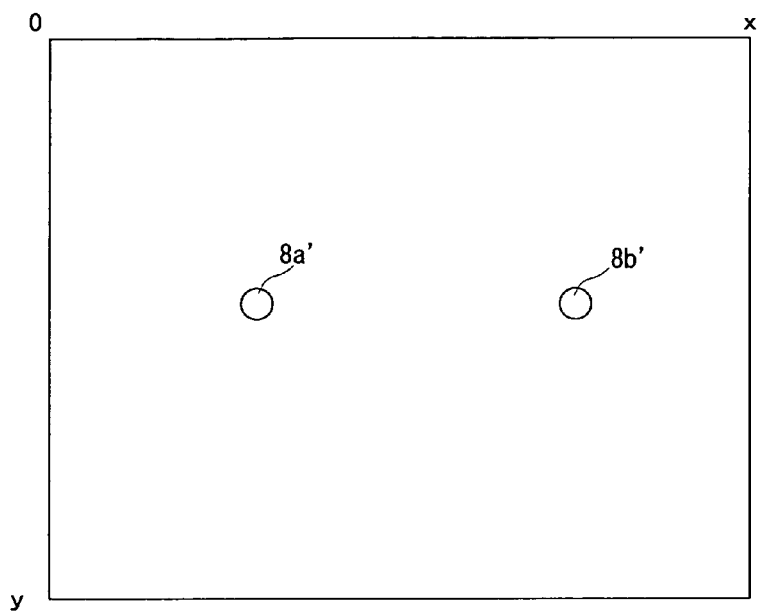
FIG. 9 shows an example of a taken image including a target image.

FIG. 8 illustrates the viewing angles of the markers 8a and 8b and the controller 7. As shown in FIG. 8, the markers 8a and 8b each radiate infrared light at a viewing angle θ1. The imaging element 40 of the imaging information calculation section 35 can receive light incident thereon at a viewing angle θ2. For example, the viewing angle θ1 of each of the markers 8a and 8b is 34° (half value angle), and the viewing angle θ2 of the imaging element 40 is 41°. The player holds the controller 7 at the position and the direction with which the imaging information calculation section 35 can receive the infrared light from both the markers 8a and 8b. Specifically, the player holds the controller 7 in a range in which both the markers 8a and 8b exist in the viewing angle θ2 of the imaging element 40 and the controller 7 exists in the viewing angle θ1 of the marker 8a and also in the viewing angle θ1 of the marker 8b. The player can perform a game operation by changing the position or the direction of the controller 7 in this range. When the position or the direction of the controller 7 is outside the above-described range, the game operation based on the position and the direction of the controller 7 cannot be performed. Hereinafter, the above-described range will be referred to as an "operable range".

Where the controller 7 is held in the operable range, the imaging information calculation section 35 takes an image of each of the markers 8a and 8b. The taken image obtained by the imaging element 40 includes an image (target image) of each of the markers 8a and 8b which are imaging targets. FIG. 9 shows an example of the taken image including the target images. Using image data of the taken image including the target images, the image processing circuit 41 calculates a coordinate set representing the position of each of the markers 8a and 8b in the taken image.

The target images appear as high brightness areas in the image data of the taken image. Therefore, the image processing circuit 41 first detects the high brightness areas as candidates of the target images. Next, based on the size of each detected high brightness area, the image processing circuit 41 determines whether or not the high brightness area is a target image. The taken image may include images other than the target images (images 8a' and 8b' of the markers 8a and 8b) due to sunlight coming through a window or light of a fluorescent lamp. The determination is performed in order to distinguish the target images 8a' and 8b' from the other images so that the target images are accurately detected. Specifically, it is determined whether or not each detected high brightness area has a size within a predetermined size range. When the high brightness area has a size within the predetermined size range, the high brightness area is determined to be a target image; whereas when the high brightness area has a size outside the predetermined size range, the high brightness area is determined not to be a target image.

The image processing circuit 41 calculates the position of a high brightness area which is determined to be a target image as a result of the determination. Specifically, the image processing circuit 41 calculates the position of the center of gravity of the high brightness area. If the target images are accurately detected, two high brightness areas are determined to be target images by the determination. Therefore, two positions are calculated. The position in the taken image is represented with a coordinate system (x-y coordinate system) in which the upper left corner of the taken image is the origin, the downward direction from the origin is a positive y-axis direction, and the rightward direction from the origin is a positive x-axis direction. Accordingly, the image processing circuit 41 outputs data on the two coordinate set values indicating the two positions obtained by the calculation. The output data on the coordinate set values is transmitted to the game apparatus 3 as operation data by the microcomputer 42 as described above.

Figure 10:
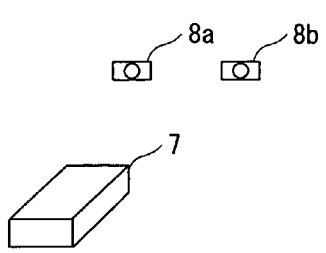
FIG. 10 shows a change of the taken image when the position and/or the direction of the controller 7 is changed.

Using the data on the coordinate set values included in the received operation data, the game apparatus 3 can calculate the indicated position (the position indicated by the controller 7 on the display screen), the rotation angle (posture) of the controller 7 around the indicated direction, and the distance from the controller 7 to each of the markers 8a and 8b. FIG. 10 shows a change of the taken image when the position and/or the direction of the controller 7 is changed. FIG. 10 shows the correspondence between the state of the controller 7 and the taken image obtained when the controller 7 is in the respective state. In FIG. 10, a taken image I1 is obtained when the controller 7 is in state A. In the taken image I1, the target images 8a' and 8b' of the markers 8a and 8b are located in the vicinity of the center of the taken image I1. The target images 8a' and 8b' are located generally parallel to the x-axis direction. In State A, the controller 7 points to a position intermediate between the markers 8a and 8b. In this specification, the term "intermediate" means substantially exactly halfway between the two points, coordinate sets or images.

State B shown in FIG. 10 is obtained by rotating the controller 7 at 90° clockwise around the indicated direction as an axis (around the Z axis) from state A. In this specification, the terms "clockwise" and "counterclockwise" used regarding the controller 7 refer to the rotation directions when seen from behind the controller 7 (from the negative end of the Z-axis direction in FIG. 3A, i.e., from the rear end of the housing 31).

In state B, a taken image I2 is obtained by the imaging information calculation section 35. In the taken image I2, the target images 8a' and 8b' have been moved on an arc at 90° counterclockwise from the taken image I1. When the posture of the controller 7 is changed in this manner, the direction of the target image in the taken image (the direction from the image 8a' to the image 8b', or the direction from the image 8b' to the image 8a') is changed. Accordingly, the posture of the controller 7 with respect to the rotation around the indicated direction as an axis is found by detecting the direction of the target images in the taken image.

State C shown in FIG. 10 is obtained by translating the controller 7 rightward (in the positive x-axis direction) from state A. In state C, a taken image I3 is obtained by the imaging information calculation section 35. In the taken image I3, the target images 8a' and 8b' have been moved leftward (in the negative x-axis direction) from the taken image I1. In state C, the indicated direction of controller 7 is directed rightward with respect to state A. The indicated direction of controller 7 can be directed rightward by rotating the controller 7 around the Y axis as well as translating the controller 7 rightward. When the controller 7 is rotated around the Y axis, substantially the same taken image as the taken image I3 is obtained. Therefore, when the controller 7 is moved (rotated) so as to direct the indicated direction of the controller 7 rightward, substantially the same taken image as the taken image I3 is obtained. Namely, an image in which the target images 8a' and 8b' have been translated is obtained. Accordingly, the indicated direction of the controller 7 can be found by detecting the positions of the target images in the taken image (in the example described below, the position of an intermediate point between the images 8a' and 8b').

Figure 11:
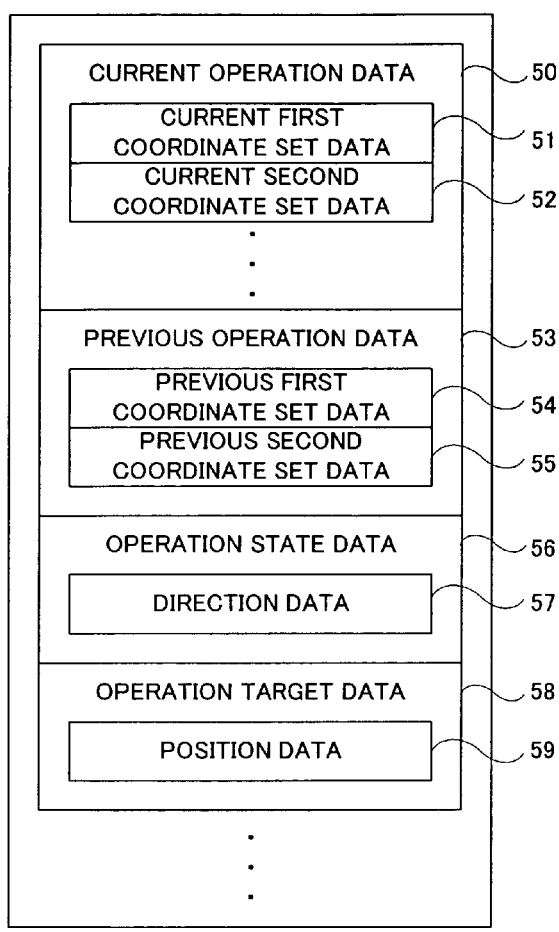
FIG. 11 shows main data stored on a main memory 13 of the game apparatus 3.

Next, the game processing executed by the game apparatus 3 will be described in detail. First, main data used for the game processing will be described with reference to FIG. 11. FIG. 11 shows main data stored on the main memory 13 of the game apparatus 3. As shown in FIG. 11, the main memory 13 has stored thereon current operation data 50, previous operation 53, operation state data 56, the operation target data 58 and the like. In addition to the data shown in FIG. 11, the main memory 13 has stored thereon other data required for the game processing including data regarding a player character appearing in the game (image data, position data, etc. of the player character) and data regarding the game space (topography data, etc.).

The current operation data 50 is a latest data transmitted from the controller 7. The current operation data 50 includes current first coordinate set data 51 and current second coordinate set data 52. The current first coordinate set data 51 represents a position of the image of one of the two marks (the position in the taken image). The current second coordinate set data 52 represents a position of the image of the other mark (the position in the taken image). The position of the image of each mark is represented with the x-y coordinate system (see FIG. 9). Hereinafter, the coordinate set represented by the current first coordinate set data 51 will be referred to as a "first coordinate set", and the coordinate set represented by the current second coordinate set data 52 will be referred to as a "second coordinate set". The first coordinate set and the second coordinate set will be distinguished from each other in order to accurately calculate direction data 57 described later. Either one of the first coordinate set and the second coordinate set may represent the position of the image of the marker 8a or the marker 8b. However, in the case where the first coordinate set represents the image of one of the markers in one frame, the first coordinate set needs to represent the image of the same marker in the next frame (see steps S13 through S15 described later).

The current operation data 50 includes data obtained from the operation section 32 and the acceleration sensor 37 in addition to the coordinate set data obtained from the taken image (the current first coordinate set data 51 and the current second coordinate set data 52). The game apparatus 3 obtains the operation data from the controller 7 at a predetermined time interval (for example, at an interval of 1 frame). The latest data among the operation data obtained is stored on the main memory 13 as the current operation data 50.

The previous operation data 53 includes previous first coordinate set data 54 and previous second coordinate set data 55. In this specification, the term "previous" means "immediately previous". The previous first coordinate set data 54 is the first coordinate set data obtained immediately before the current first coordinate set data 51. Namely, when new operation data is obtained, the data which has been the current first coordinate set data 51 so far is stored as the previous first coordinate set data 54. One of the two pieces of coordinate set data included in the new operation data is stored on the main memory 13 as the current first coordinate set data 51. Similarly, the previous second coordinate set data 55 is the second coordinate set data obtained immediately before the current second coordinate set data 52. Namely, when new operation data is obtained, the data which has been the current second coordinate set data 52 so far is stored as the previous second coordinate set data 55. The other of the two pieces of coordinate set data included in the new operation data (the data which is not the data representing the first coordinate set) is stored on the main memory 13 as the current second coordinate set data 52.

The operation state data 56 represents an operation state of the controller 7 which is determined based on the taken image. The operation state data 56 represents a position, direction, and size of the target image included in the taken image. The operation state data 56 includes direction data 57. The direction data 57 represents a direction from the first coordinate set to the second coordinate set. In this embodiment, the direction data 57 represents a vector having a position of the first coordinate set as a start point and a position of the second coordinate set as an end point. The direction data 57 represents a direction of the target image (markers 8a and 8b) in the taken image.

The operation target data 58 represents a position and a posture of the operation target on the display screen or in the game space. The "operation target" may be an object displayed on the display screen, an object appearing in the virtual game space, or in the case where a virtual three-dimensional game space is constructed, a virtual camera for displaying the three-dimensional game space on the display screen. The operation target may be an image displayed on the display screen or an image in a window displayed on the display screen. The operation target data 58 includes position data 59. The position data 59 represents a position of the operation target in the game space or a position thereof on the display screen. In the case where the operation target is an image in a window, the position data 59 represents a position of an area of the image actually displayed in the window, among the entire area of the image displayable in the window.

Figure 12:
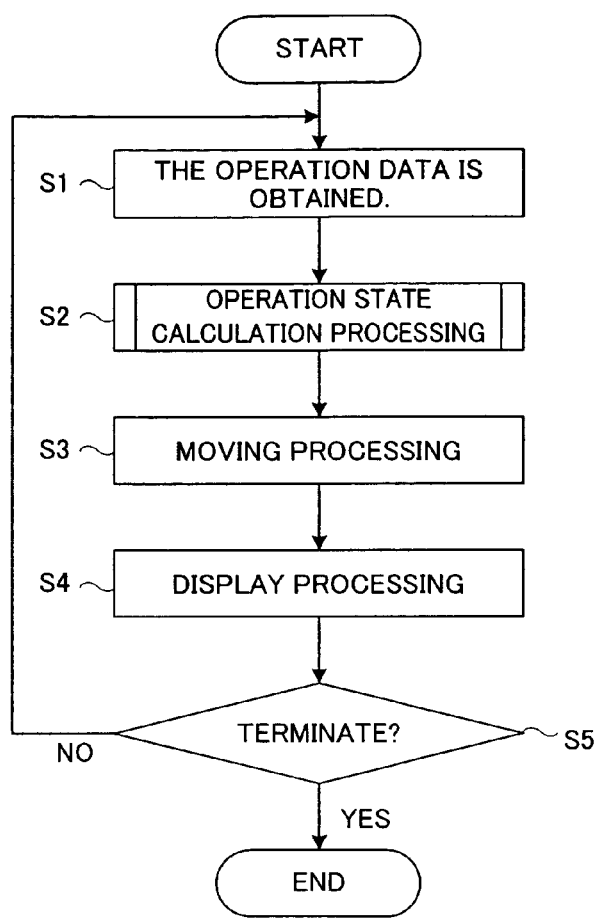
FIG. 12 is a flowchart illustrating a flow of game processing executed by the game apparatus 3.

Next, the game processing executed by the game apparatus 3 will be described in detail with reference to FIG. 12 through FIG. 16B. FIG. 12 is a flowchart illustrating a flow of the game processing executed by the game apparatus 3. When the game apparatus 3 is turned on, the CPU 10 of the game apparatus 3 executes a start program stored on the boot ROM (not shown) to initialize each unit such as the main memory 13. The game program stored on the optical disc 4 is read into the main memory 13, and the CPU 10 starts the execution of the game program. The flowchart shown in FIG. 12 illustrates the game processing after the above-described processing is completed. In the following description given with reference to FIG. 12 through FIG. 16B, the game processing regarding the position and the direction of the controller 7 will be explained in detail, and other game processing not directly relevant to the present invention will be omitted.

With reference to FIG. 12, in step S1, the operation data is obtained from the controller 7. The CPU 10 stores the operation data on the main memory 13 as the current operation data 50. The contents of the data which have been the current first coordinate set data 51 and the current second coordinate set data 52 so far are stored on the main memory 13 as the previous first coordinate set data 54 and the previous second coordinate set data 55. At this point, it has not been determined which of the two pieces of coordinate set data included in the operation data is to be the current first coordinate set data 51 and which is to be the current second coordinate set data 52. Accordingly, at this point, neither the current first coordinate set data 51 nor the current second coordinate set data 52 is stored on the main memory 13, and the two pieces of coordinate set data included in the operation data are stored on the main memory 13 separately from the current first coordinate set data 51 and the current second coordinate set data 52.

The operation data obtained in step S1 includes the coordinate set data representing the positions of the markers 8a and 8b in the taken image, and also data representing whether or not each operation button of the controller 7 has been pressed and data representing the accelerations of the controller 7 in the up-down direction and the left-right direction. In this embodiment, the controller 7 transmits the operation data at a time interval of one frame, and the CPU 10 obtains the operation data frame by frame. Accordingly, the processing loop of steps S1 through S5 shown in FIG. 12 is repeated frame by frame.

Next in step S2, operation state calculation processing is executed. In the operation state calculation processing, an operation state of controller 7 (a value corresponding to a position, a posture or the like of the controller 7) is calculated based on the operation data from the controller 7. Hereinafter, with reference to FIG. 13 and FIG. 14, the operation state calculation processing will be described in detail.

Figure 13:
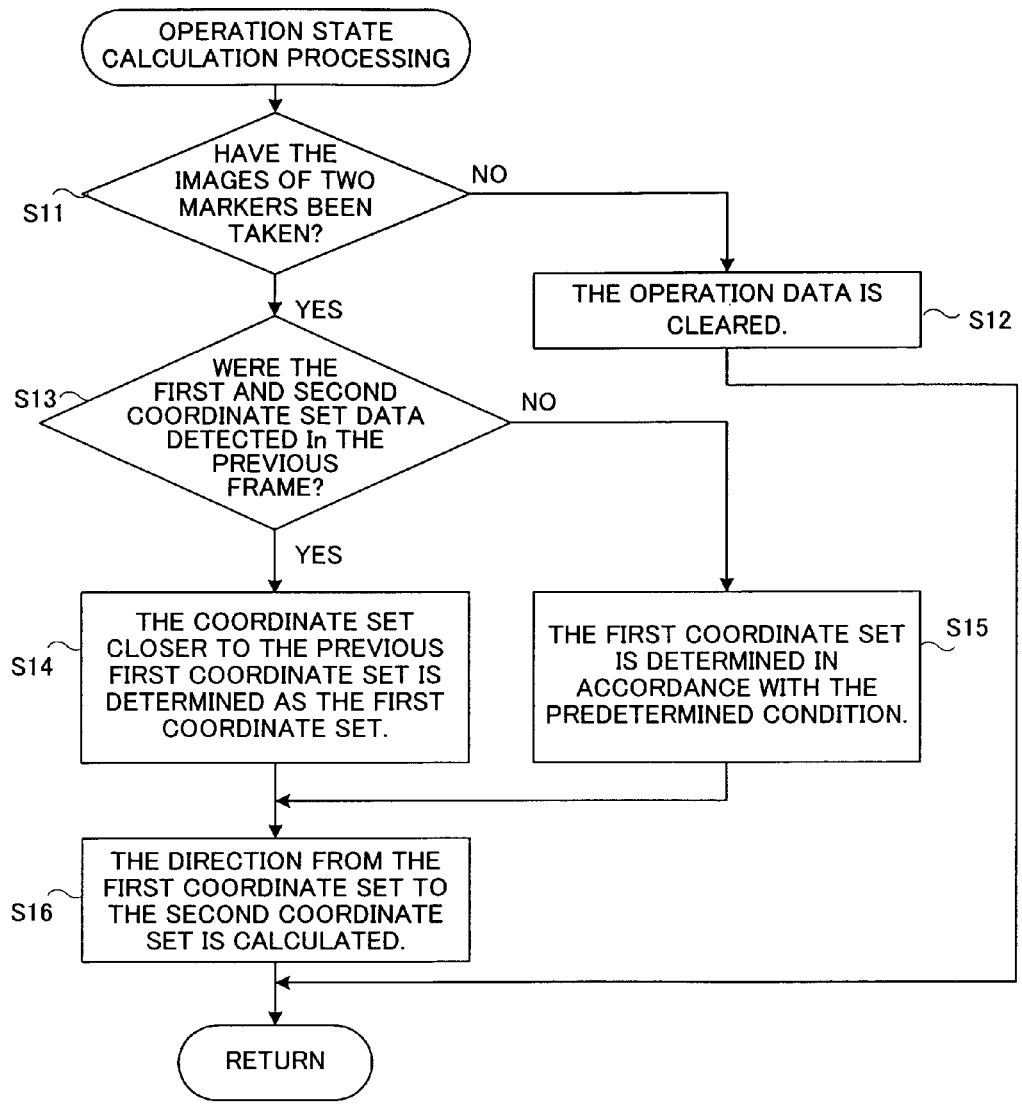
FIG. 13 is a flowchart illustrating a detailed flow of operation state calculation processing (S2) shown in FIG. 12.

FIG. 13 is a flowchart illustrating a detailed flow of the operation state calculation processing (S2) shown in FIG. 12. The operation state calculation processing is executed as follows. First in step S11, it is determined whether or not images of the two markers 8a and 8b have been taken by the imaging information calculation section 35 of the controller 7. The determination in step S11 is executed in order to determine whether or not the controller 7 is held in the operable range. When the images of the two markers 8a and 8b have not been taken by the imaging information calculation section 35 (when the controller 7 is not held in the operable range), the operation data from the controller 7 does not include two pieces of coordinate set data. Namely, when the image of only one marker is taken by the imaging information calculation section 35, the image processing circuit 41 outputs only one piece of coordinate set data, and the operation data from the controller 7 includes only one piece of coordinate set data. When the image of neither the marker 8a nor 8b is taken by the imaging information calculation section 35, the image processing circuit 41 does not output any coordinate set data, and the operation data from the controller 7 does not include any coordinate set data. Accordingly, the determination in step S11 can be performed based on whether or not the operation data obtained in step S1 includes two pieces of coordinate set data. When it is determined in step S11 that the images of the two markers 8a and 8b have been taken, processing in step S13 is executed. When it is determined in step S11 that the images of the two markers 8a and 8b have not been taken, processing in step S12 is executed.

In step S12, the contents of the operation state data 56 stored on the main memory 13 are cleared. In the case where the operation state data 56 is not stored on the main memory 13, the operation target is not moved in moving processing described later. Namely, in this embodiment, in the case where the images of two markers 8a and 8b are not taken, no game processing is executed. After step S12, the CPU 10 terminates the operation state calculation processing.

Figure 14:
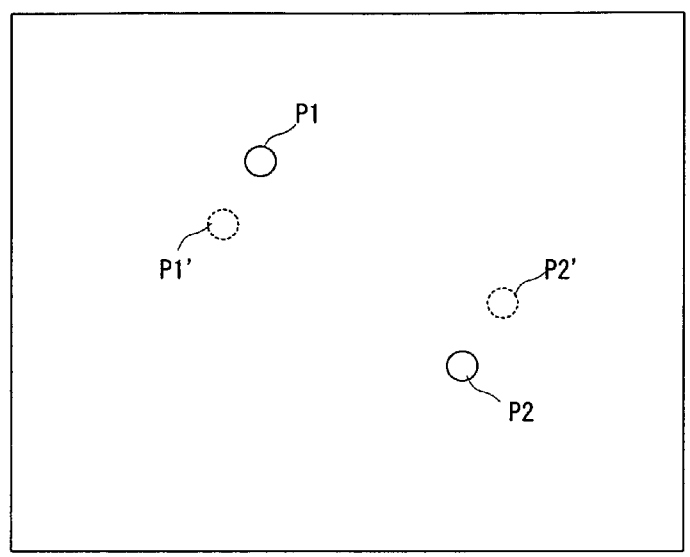
FIG. 14 illustrates processing for determining a first coordinate set and a second coordinate set.

In steps S13 through S15, it is determined which of the two pieces of coordinate set data represents the first coordinate set and which of the data represents the second coordinate set. FIG. 14 illustrates the processing for determining which is the first coordinate set and which is the second coordinate set. In FIG. 14, point P1' indicated with the dashed circle represents the position of the previous first coordinate set, and point P2' indicated with the dashed circle represents the position of the previous second coordinate set. Points P1 and P2 indicated with the solid circles show the positions of the coordinate sets represented by the two pieces of coordinate set data obtained at the current time.

Referring to FIG. 14, it cannot be detected, only from the coordinate sets P1 and P2, which of the coordinate sets P1 and P2 represented by the two pieces of coordinate set data obtained at the current time is the first coordinate set and which is the second coordinate set. Namely, the game apparatus 3 cannot determine, only from the coordinate sets P1 and P2, whether the coordinate set P1' has moved to become the coordinate set P1 or the coordinate set P2' has moved to become the coordinate set P1. Either one of the first coordinate set and the second coordinate set may represents the position of the image of the marker 8a or the marker 8b. It is important, however, to correctly detect which data represents the first coordinate set and which data represents the second coordinate set, in order to calculate the direction from the first coordinate set to the second coordinate set (step S16 described later). If the first coordinate set and the second coordinate set are detected oppositely, the direction obtained by the calculation is the opposite. If the previous first coordinate set is detected as the current second coordinate set, for example, the direction calculated in step S16 is incorrect.

In order to avoid this, in this embodiment, the first coordinate set and the second coordinate set are detected based on the distances between the previous coordinate sets and the current coordinate sets. Specifically, among the two coordinate sets newly obtained currently, the coordinate set which is closer to the previous first coordinate set is determined as the first coordinate set, and the other coordinate set is determined as the second coordinate set. In the example shown in FIG. 14, the coordinate set P1 which is closer to the previous coordinate set P1' is set as the first coordinate set, and the other coordinate set P2 is set as the second coordinate set. In the case where the controller 7 is rotated at an angle greater than 90° from one frame to the next frame, the coordinate set which is farther from the previous first coordinate set is the correct first coordinate set. However, it is considered that the controller 7 cannot actually rotate at an angle greater than 90° during one frame because the time interval at which the coordinate sets are obtained (the time interval at which the imaging information calculation section 35 takes the images)

is usually very short (for example, an interval of 1/60 sec.). Therefore, the first coordinate set can be correctly detected by setting the coordinate set closer to the previous first coordinate set as the first coordinate set.

Specifically, in step S13, it is determined whether or not the first coordinate set and the second coordinate set were detected in the previous frame. The determination in step S13 is performed based on whether or not the operation state data 56 is stored on the main memory 13. When the processing in step S12 was executed in the previous frame, the operation state data 56 is not stored on the main memory 13. In this case, at least one of the first coordinate set and the second coordinate set was not obtained in the previous frame, and so the first coordinate set and the second coordinate set cannot be determined using the previous coordinate sets. When the processing in step S13 was executed in the previous frame, the operation state data 56 is stored on the main memory 13. In this case, the first coordinate set and the second coordinate set can be determined using the previous coordinate sets. The processing in step S13 is executed in order to determine whether or not the first coordinate set and the second coordinate set are to be determined using the previous coordinate sets. When it is determined in step S13 that the first coordinate set and the second coordinate set were detected in the previous frame, processing in step S14 is executed. When it is determined in step S13 that at least one of the first coordinate set and the second coordinate set was not detected in the previous frame, processing in step S15 is executed.

In step S14, among the two coordinate sets represented by the two pieces of coordinate set data included in the operation data obtained in step S1, the coordinate set closer to the previous first coordinate set is determined as the first coordinate set. Specifically, the CPU 10 refers to the previous first coordinate set data 54 stored on the main memory 13 and the two pieces of coordinate set data included in the operation data, and specifies, among the coordinate sets represented by the two pieces of coordinate set data, the coordinate set which is closer to the coordinate set represented by the previous first coordinate set data 54. The CPU 10 stores coordinate set data on the specified coordinate set on the main memory 13 as the current first coordinate set data 51, and also stores coordinate set data on the other coordinate set on the main memory 13 as the current second coordinate set data 52.

In step S15, one of the coordinate sets represented by the two pieces of coordinate set data is determined as the first coordinate set in accordance with a predetermined condition. The predetermined condition may be any condition. For example, the CPU 10 determines the coordinate set having a smaller y-axis coordinate value as the first coordinate set, and determines the other coordinate set as the second coordinate set. Data on the coordinate set determined as the first coordinate set is stored on the main memory 13 as the current first coordinate set data 51, and data on the coordinate set determined as the second coordinate set is stored on the main memory 13 as the current second coordinate set data 52.

In step S16, a direction from the first coordinate set to the second coordinate set is determined. Specifically, the CPU 10 refers to the current first coordinate set data 51 and the current second coordinate set data 52 to calculate a vector having a position of the first coordinate set as a start point and a position of the second coordinate set as an end point. Data on the calculated vector is stored on the main memory 13 as the direction data 57. The calculated vector represents a rotation angle of the controller 7 around the indicated direction. Namely, as a result of the processing in step S16, the rotation of the controller 7 around the indicated direction is calculated. After step S16, the CPU 10 terminates the operation state calculation processing.

Returning to FIG. 12, in step S3, the moving processing of moving the operation target is executed. In the moving processing, the operation target is moved in a predetermined direction in accordance with the direction calculated in step S16. Hereinafter, the processing in step S3 will the described in detail.

The operation target in step S3 may be an object appearing in the virtual game space, a virtual camera, or an image displayed on the entire display screen, or an image displayed in a window. Namely, in this embodiment, the object may be displayed on the display screen as moving in the game space, or the image of the game space may be displayed on the display screen while the viewing point to the game space is changed. The image displayed in the window may be scrolled while being displayed, or the image displayed on the entire display screen may be scrolled while being displayed.

The moving motion of the operation target in step S3 may be any motion of moving in a predetermined direction. The "predetermined direction" may be a direction predetermined fixedly or a direction determined variably by the user or depending on the situation in the game. For example, the operation target may be set to move toward a position designated by the user (a position on the display screen or a position in the game space).

Figure 15A:
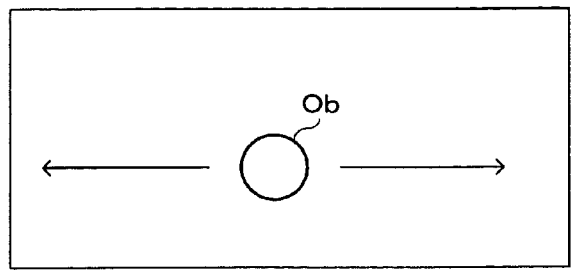
FIG. 15A and FIG. 15B show examples of a moving motion of an operation target.
Figure 15B:
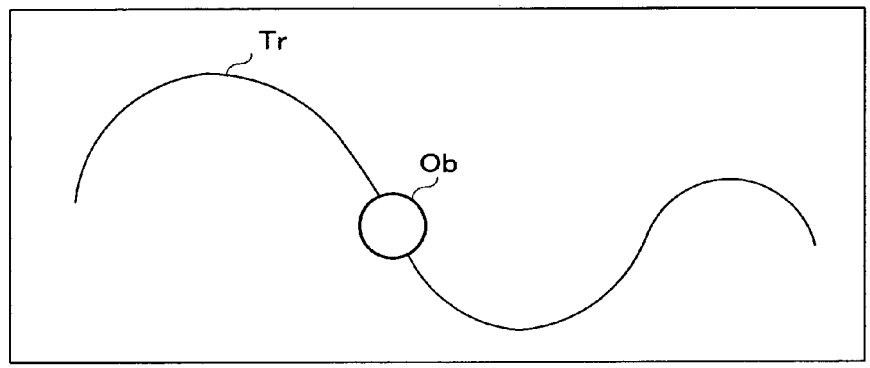

FIG. 15A through FIG. 16B show examples of a moving motion of the operation target. In FIG. 15A through FIG. 16B, an object Ob appearing in the game space is shown as an exemplary operation target. The game apparatus 3 may move the object Ob linearly as shown in FIG. 15A, or in a direction along a predetermined trajectory Tr as shown in FIG. 15B. The game apparatus 3 may move the operation target reversibly in two directions, i.e., in one direction and the opposite direction, or move the operation target only in one direction.

Figure 16A:
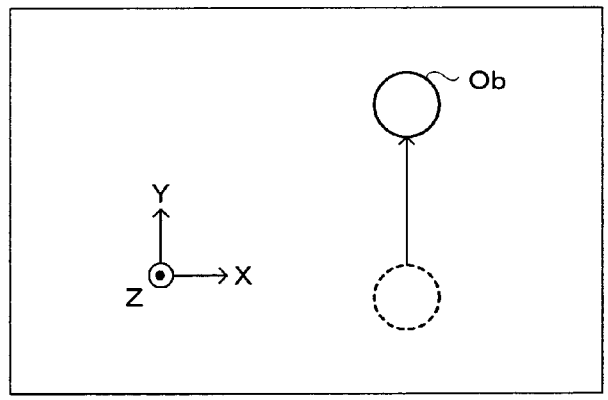
FIG. 16A and FIG. 16B show examples of the moving motion of the operation target.
Figure 16B:
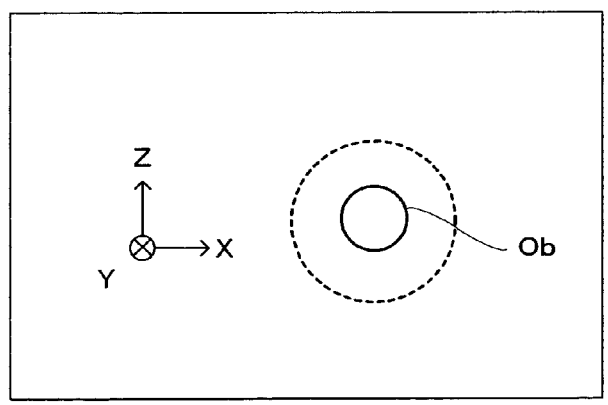

The operation target may move on the display screen or move in the game space. FIG. 16A and FIG. 16B show the object Ob moving in the virtual three-dimensional game space. The pre-movement object Ob is represented with the dashed line, and the post-movement object Ob is represented with the solid line. In the case where the game space seen from a negative Y-axis direction to a positive Y-axis direction is displayed on the display screen, when the object Ob moves deeper with respect to the display screen (in the positive Y-axis direction) as shown in FIG. 16A, the object Ob is displayed as being reduced in size (FIG. 16B). In the case where the operation target moves in the game space, it may be not easily shown that the operation target is moving on the display screen. However, the moving motion of the operation target may be a motion of moving in the game space, as well as a motion of moving on the display screen. In the former case, it is difficult to see on the display screen that the operation target is moving, but this is also in the scope of the present invention.

In step S3, the game apparatus 3 moves the operation target in accordance with the direction calculated in step S16. Specifically, the game apparatus 3 may determine the direction in which the operation target is to move, the moving amount by which the operation target is to move or the velocity (the moving amount per unit time) or the acceleration at which the operation target is to move, based on the direction determined in step S16.

In the case where the game apparatus 3 determines the direction in which the operation target is to move based on the direction determined in step S16, the game apparatus 3 may, for example, determine the moving direction of the operation target in accordance with an angular difference between the direction determined in step S16 and the predetermined reference direction. Specifically, the game apparatus 3 may move the operation target oppositely when the angular difference has a positive value from when the angular difference has a negative value.

In the case where the game apparatus 3 determines the moving amount by which the operation target is to move based on the direction determined in step S16, the game apparatus 3 may, for example, determine the moving amount in accordance with an the angular difference between the direction determined in step S16 and the predetermined reference direction. Specifically, the game apparatus 3 may determine such that as the angular difference is greater, the moving amount is greater, or may determine to move the operation target only when the angular difference has a predetermined value or greater. In the case where the game apparatus 3 determines the velocity (acceleration) of the operation target based on the direction determined in step S16, the game apparatus 3 may determine such that as the angular difference is greater, the velocity (acceleration) of the operation target is greater.

The moving amount, velocity or acceleration (hereinafter, referred to as the "moving amount, etc.") of the operation target may be determined based on the direction calculated in step S16. In the case where the moving direction of the operation target is determined based on the direction calculated in step S16, the moving amount, etc. may be determined to be a predetermined value. In the case where the moving amount, etc. of the operation target is determined based on the direction calculated in step S16, the moving amount, etc. may be determined based only on the vector representing the direction calculated in step S16, based on an angular difference between the vector representing the direction calculated in step S16 and a vector representing the reference direction, or based on an angular difference between the vector representing the direction calculated in step S16 and a vector in the previous frame. More specifically, the moving amount may be determined as follows. The correspondence between the direction of the vector representing the direction calculated in step S16 and the moving amount of the operation target when the vector is directed in the respective direction is predetermined. The moving amount of the operation target is calculated from the vector based on the correspondence. Alternatively, an angle (angular difference) made by the vector representing the direction calculated in step S16 and the vector representing the reference direction is calculated. The moving amount of the operation target is determined so as to be greater as the angular difference is greater. Still alternatively, an angle (angular difference) made by the vector in the previous frame and the vector in the current frame is calculated. The moving amount of the operation target is determined so as to be greater as the angular difference is greater.

In step S3, the game apparatus 3 determines the post-movement position of the operation target in accordance with the moving amount, etc. calculated as described above. Data representing the post-movement position of the operation target determined in step S3 is stored on the main memory 13 as the position data 59.

Returning to FIG. 12, in step S4 after step S3, display processing is executed. The CPU 10 refers to the operation target data 58 stored on the main memory 13 to generate an image in accordance with the position determined in step S3. The CPU 10 displays the generated image on the display screen of the monitor 2. For example, when the operation target is an object displayed on the display screen, the object is displayed on the display screen at the position determined in step S3. For example, in the case where the operation target is a virtual camera, an image of the game space seen from the virtual camera which is set at the position determined in step S3 is generated, and the generated image is displayed. For example, in the case where the operation target is an image in the window, the area determined in step S3, among the entire area of the image displayable in the window, is displayed in the window. By repeating the processing in step S4 frame by frame, a moving picture representing the operation target rotating can be displayed.

In step S5, it is determined whether or not to terminate the game. The game is terminated when, for example, a condition for terminating the game (for example, the parameter indicating the stamina of the player character becomes zero) or the player has performed an operation of terminating the game. When it is determined not to terminate the game, the processing is returned to step S1 and the processing in steps S1 through S5 is repeated until it is determined to terminate the game in step S5. When it is determined to terminate the game, the CPU 10 terminates the game processing shown in FIG. 12.

As described above, in this embodiment, a value corresponding to the posture of the controller 7 rotating around the front-rear direction thereof as an axis can be calculated from the taken image obtained by the imaging information calculation section 35. Based on the posture of the controller 7, the operation target can be moved. With such settings, the player can perform a game operation of rotating the controller 7 around the front-rear direction thereof as an axis so as to cause the operation target to move in accordance with the rotation of the controller 7. Thus, the game apparatus 3 can allow the player to perform a new game operation of moving the operation target by rotating the controller 7.

According to the present invention, in order to calculate the rotation of the controller 7 around the indicated direction thereof as an axis, the game apparatus 3 only needs to obtain information representing at least the direction from the taken image. Therefore, the image processing circuit 41 may output the information representing the direction, instead of the coordinate sets of the above-mentioned two positions. Specifically, the image processing circuit 41 may calculate data on a vector representing the direction from the position of the image of the marker 8a to the position of the image of the marker 8b (or the direction from the position of the image of the marker 8b to the position of the image of the marker 8a). Since this vector only needs to represent the direction, the image processing circuit 41 may output data on a unit vector having a constant size.

In other embodiments, the imaging information calculation section 35 may not include the image processing circuit 41. In this case, the imaging information calculation section 35 outputs the image data of the taken image to the microcomputer 42, and the image data is transmitted from the controller 7 to the game apparatus 3 as the operation data. The game apparatus 3 calculates the direction data based on the image data. As described above, the processing of calculating the direction data from the image data of the taken image may be partially executed by a dedicated circuit (the image processing circuit 41), entirely executed by such a circuit, or executed by the game apparatus 3 as software processing.

In the above embodiment, the two markers 8a and 8b for outputting infrared light are the imaging targets. Some other elements may be the imaging targets. An imaging target may be anything, an image of which can provide a direction. For example, three or more markers may be imaging targets, or one marker which can provide a direction can be an imaging target. In the case where one marker is the imaging target, it is desirable that the marker has a linear shape or the like, from which predetermined two points can be specified. The reason is that it is necessary to detect the direction from the marker. A circular shape is not desirable. The game apparatus 3 calculates the direction connecting the predetermined two points of the taken image to calculate the direction of the target image in the taken image. The marker is preferably a light emitting element. The marker may output light of other wavelengths than infrared, or may output white light. The frame of the display screen of the monitor 2 may be an imaging target, or the imaging target may be displayed on the display screen. With such a structure, it is not necessary to prepare a marker in addition to the monitor, and the structure of the system can be simplified.

In other embodiments, when the controller 7 goes outside the operable range, the operation target may be rotated using an output from the acceleration sensor. Specifically, when the determination result in step S11 in FIG. 13 is negative, processing of determining the rotation state of the controller 7 around the indicated direction as an axis is executed using the output from the acceleration sensor, instead of the processing in step S12. The CPU 10 refers to data representing the acceleration included in the operation data to determine the rotation state of the controller 7. In the moving processing in step S3, the operation target is rotated in accordance with the rotation state determined by the above processing. Thus, even if the controller 7 goes outside the operable range, the operation of rotating the operation target can be continued. In the case where the controller 7 goes outside the operable range and then returns to the operable range with the posture thereof being changed, the posture of the controller 7 can be determined using an output from the acceleration. Therefore, the two markers can be each identified.

The above embodiment is applicable to various games in which the controller 7 is rotated around the indicated direction as an axis. Hereinafter, specific games will be described as examples.

FIRST EXAMPLE

Figure 17:
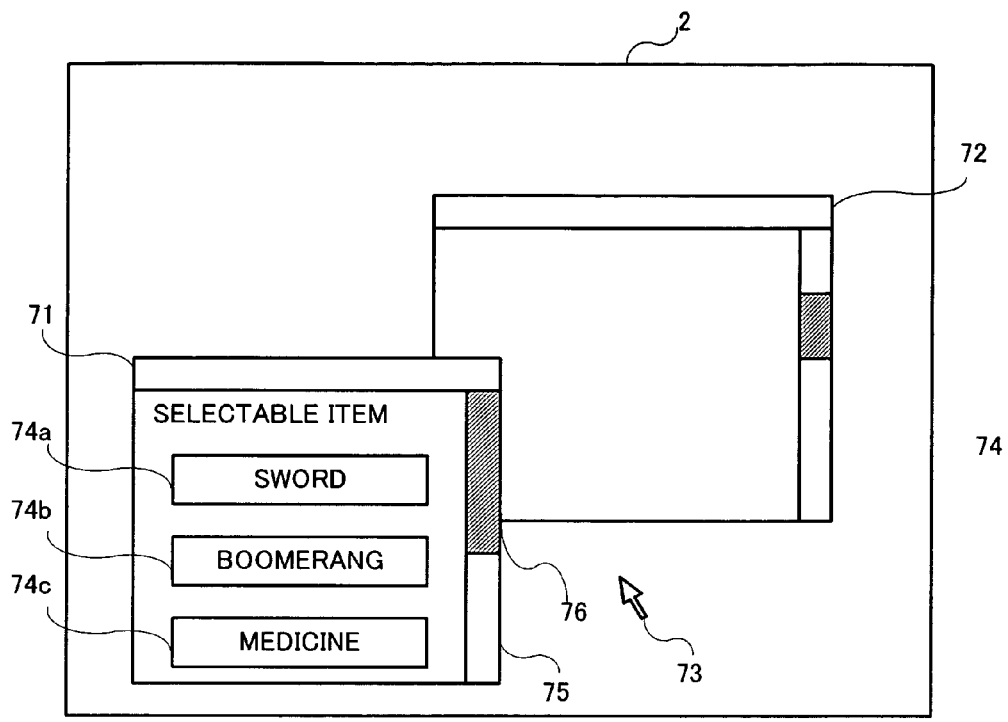
FIG. 17 shows an example of a game screen in a first example.

Hereinafter, a first example in which the present invention is applied to a menu screen of a game will be described. In this example, a game in which a player character operated by a player appears in a game space will be described. FIG. 17 shows an example of a game screen in the first example. FIG. 17 shows windows 71 and 72 displayed on the display screen of the monitor 2. The windows 71 and 72 are display areas for displaying an image of a menu screen (menu image). The windows 71 and 72 are displayed by the player performing a predetermined operation (for example, an operation of pressing the Y button 32c). FIG. 17 also shows a cursor 73. The player can freely move the cursor 73 on the display screen by operating the controller 7. Although not shown in FIG. 17, a usual game image (for example, an image of the game space in the vicinity of the player character) is displayed in the display area other than the windows 71 and 72.

Figure 18:
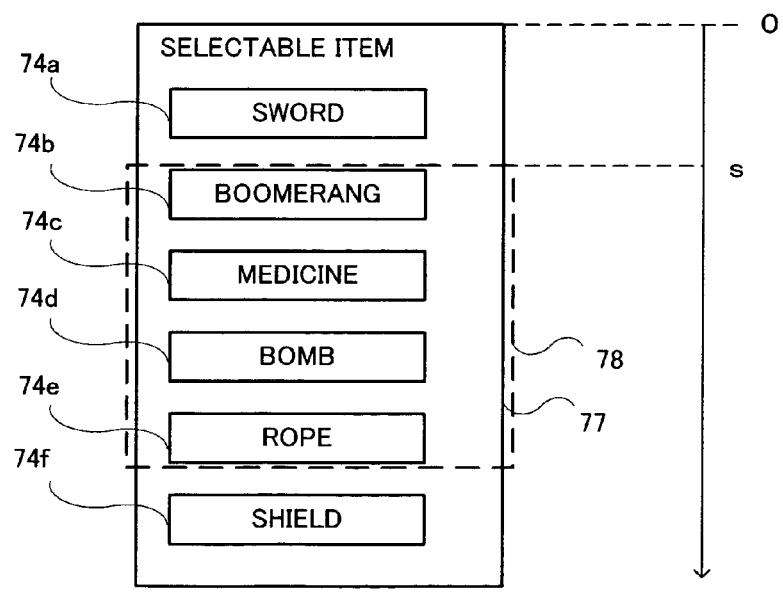
FIG. 18 shows the relationship between a menu image displayable in a window 72 and an area of the menu image which is actually displayed.

In the window 71, a menu screen for allowing the player to select an item to be used by the player character is displayed. In FIG. 17, images 74a through 74c showing selectable items are displayed in the window 71. FIG. 18 shows the relationship between the menu image displayable in the window 71 and an area actually displayed among the entire area of the menu image. As shown in FIG. 18, the menu image (represented with reference numeral 77) is larger than a display area 78 of the window 71, and thus a part of the menu image 77 is displayed in the window 71. The menu image 77 includes six images 74a through 74f showing the selectable images (item images 74a through 74f), and all the item images cannot be displayed in the window 71 at the same time. The player scrolls the menu image in the window 71 up and down to see the entire area of the menu image 77. The position of the display area 78 (the area which is actually displayed) of the window 71 is represented with length "s" from the top edge of the menu image 77 to the top edge of the display area 78.

A scroll bar 75 and a scroll box 76 at the right edge of the window 71 show which part of the menu image 77 is displayed in the window 71. In FIG. 17, the scroll box 76 is positioned at the top of the scroll bar 75. It is understood that a top part of the menu image 77 is displayed in the window 71. Although not shown in FIG. 17, items images are displayed in an area in the window 72 as well as in the window 71.

In the first example, the player can scroll the image displayed in the window by operating the controller 7 itself. Specifically, the player performs an operation of rotating the controller 7 (rotation operation) around the indicated direction as an axis to scroll the image displayed in the window up and down.

FIG. 19 shows a change of the image in the window by the rotation operation of the controller 7. FIG. 19 illustrates the correspondence among the state of the controller 7, the taken image obtained when the controller 7 is in the respective state, and the image in the window 71 when the controller 7 is in the respective state.

In FIG. 19, in state A, the top surface of the controller 7 is directed upward. In a taken image I7 obtained in state A, the images 8a' and 8b' of the markers 8a and 8b are located horizontally (the y-axis coordinates of the images 8a' and 8b' are the same). It is assumed that in this state, the image displayed in the window 71 includes the item images 74b through 74d.

In state B shown in FIG. 19, the controller 7 has been rotated counterclockwise at a predetermined angle from state A. In a taken image I8 obtained in state B, the images 8a' and 8b' have been moved on an arc clockwise at the predetermined angle from state A. In this state, the image displayed in the window 71 includes the item images 74c through 74e. Namely, the image in the window 71 is scrolled upward (the displayed area is scrolled downward). Thus, the player can scroll the image in the window 71 upward by rotating the controller 7 counterclockwise. In state C shown in FIG. 19, the controller 7 has been rotated clockwise at a predetermined angle from state A. In a taken image I9 obtained in state C, the images 8a' and 8b' have been moved on an arc counterclockwise at the predetermined angle from state A. In this state, the image displayed in the window 71 includes the item images 74a through 74c. Namely, the image in the window 71 is scrolled downward (the displayed area is scrolled upward). Thus, the player can scroll the image in the window 71 downward by rotating the controller 7 clockwise.

The player can move the cursor 73 on the display screen by changing the indicated position by the controller 7. Namely, the game apparatus 3 determines the indicated position by the controller 7 in accordance with the position or the posture of the controller 7, and displays the cursor 73 at the indicated position.

The player can designate the window as the operation target (the image in which is to be scrolled) with the cursor 73. Specifically, when the player designates either window with the cursor 73 (moves the cursor 73 to a position in either window), the designated window is displayed at the top layer. When the player performs the rotation motion in the state where the cursor 73 designates the window, the image in the window is scrolled. Even when a plurality of windows are displayed, the player can easily designate the window as the operation target using the controller 7, and easily scroll the image in the designated window, still using the controller 7.

Figure 20:
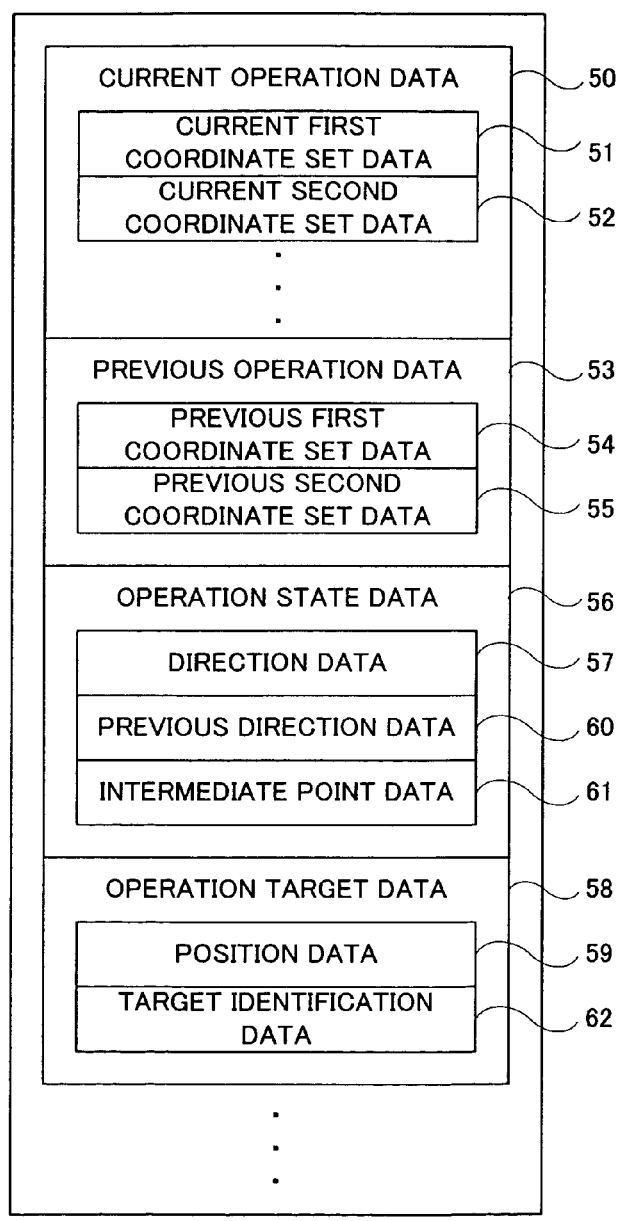
FIG. 20 shows main data stored on the main memory 13 of the game apparatus 3 in the first example.

Next, the game processing in the first example will be described in detail. FIG. 20 shows main data stored on the main memory 13 of the game apparatus 3 in the first example. In the first example, the main memory 13 has the following data stored thereon in addition to the data shown in FIG. 11. Previous direction data 60 and intermediate point data 61 are stored on the main memory 13 as a part of the operation state data 56. Target identification data 62 is stored on the main memory 13 as a part of the operation target data 58.

The previous direction data 60 is direction data calculated in the immediately previous frame. Namely, when new direction data is calculated, the data which has been the direction data 57 is stored on the main memory 13 as the previous direction data 60. The newly calculated data is stored on the main memory 13 as new direction data 57. The previous direction data 60 is used in order to calculate an amount by which the image in the window is to be scrolled (scroll amount).

The intermediate point data 61 represents a coordinate set of a point intermediate between the first coordinate set and the second coordinate set. In the case where the image of the marker 8a and the image of the marker 8b are considered as one integral target image, the intermediate point data 61 represents a position of the target image. The intermediate point data 61 is used in order to calculate the indicated position by the controller 7, i.e., the position of the cursor 73 on the display screen.

The target identification data 62 represents a window currently designated by the cursor 73, and specifically represents a predetermined number assigned to such a window. When the cursor 73 does not designate either window, data indicating that neither window is designated is stored as the target identification data 62.

In the first example, the position data 59 represents a position of the display area 78 of the currently designated window, i.e., the length s form the top edge of the menu image 77 to the top edge of the display area 78.

Figure 21:
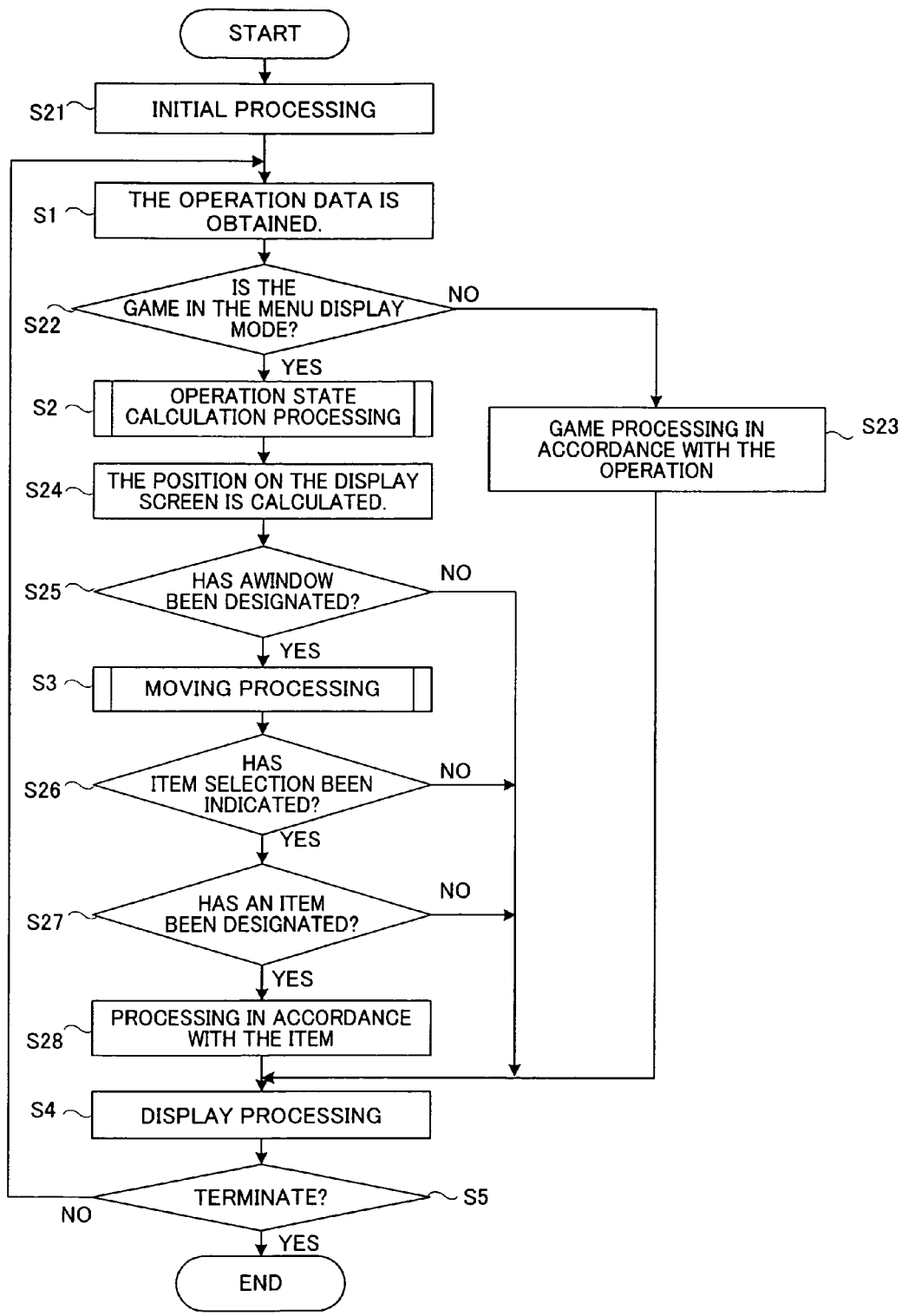
FIG. 21 is a flowchart illustrating a flow of game processing in the first example.

FIG. 21 is a flowchart illustrating a flow of the game processing in the first example. In FIG. 21, substantially the same steps as those in the game processing shown in FIG. 12 bear the same step numbers, and detailed descriptions thereof will be omitted. The processing until the processing in the flowchart shown in FIG. 21 is started is the same as in the case of FIG. 12.

The game processing in the first example is executed as follows. First in step S21, initial processing is executed. In the initial processing, the CPU 10 displays a game screen in an initial state. Specifically, a virtual game space is constructed, and the player character is located at an predetermined initial position. An image in the game space around the player character is generated and displayed on the display screen of the monitor 2.

After step S21, the processing in step S1 described above is executed, and then processing in step S22 is executed. In step S22, it is determined whether or not the game is set to a menu display mode. It is assumed that two modes are prepared in the game in the first example. One is a game mode in which the player operates the player character to proceed with the game, and the other is the menu display mode in which the menu image is displayed for changing the settings and the like regarding the game. The two mode are switched by, for example, the player performing an operation of pressing the Y button 32c. In this example, a plurality of windows are displayed when the game is placed into the menu display mode. In other embodiments, only one window may be displayed when the game is placed into the menu display mode, and a new window may be displayed by the player selecting an item in the first window. Although not shown in FIG. 21, the processing of switching the modes is executed at an appropriate timing. In step S22, the CPU 10 determines whether the current mode is the game mode or the menu display mode. When the current mode is the menu display mode, processing in step S2 is executed; whereas when current mode is the game mode, processing in step S23 is executed.

In step S23, game processing in accordance with the game operation performed by the player is executed. For example, the player character performs a desired motion. In the case where an enemy character appears in the game space, the motion of the enemy character is controlled. After step S23, the processing in step S4 is executed.

Figure 22:
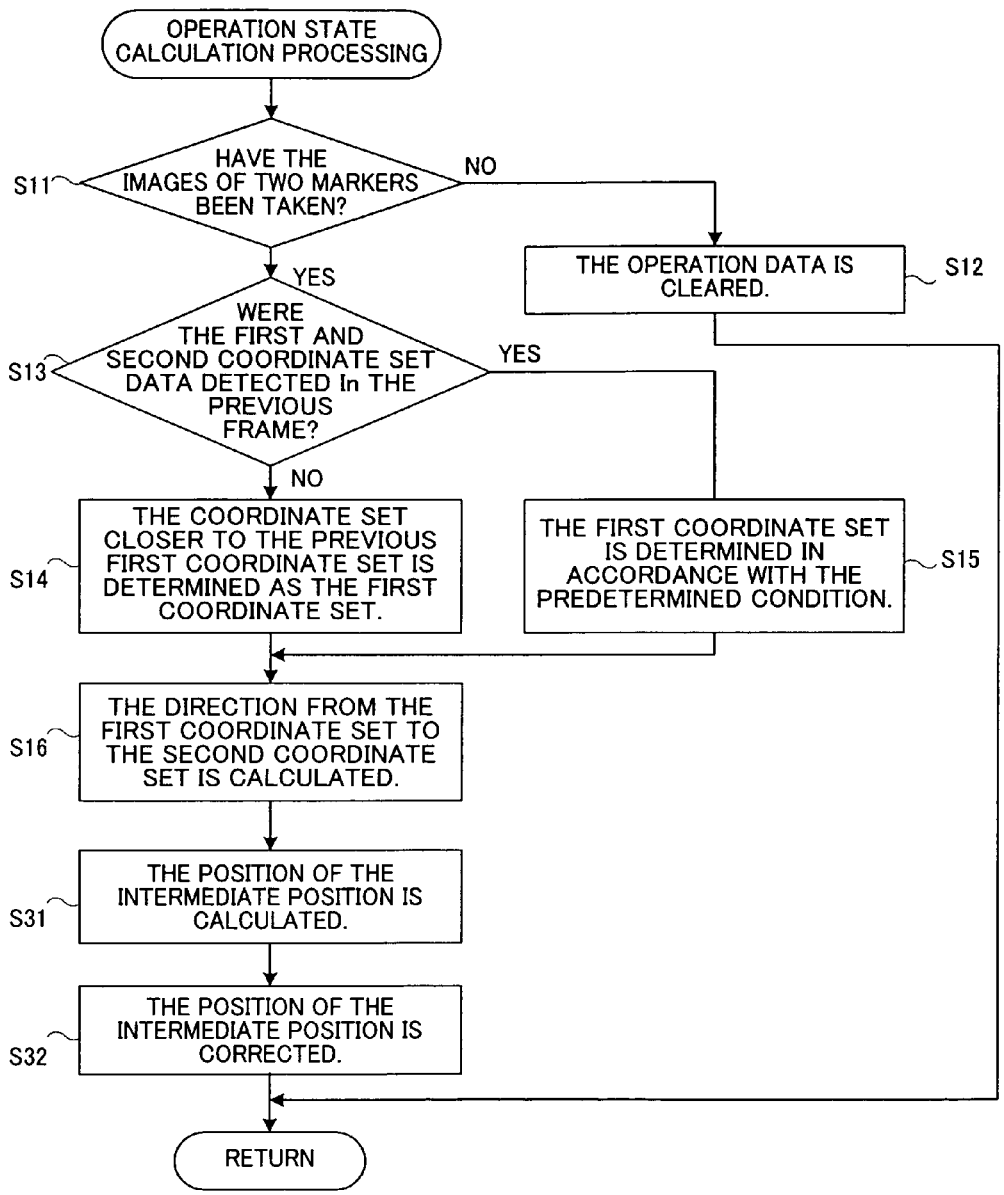
FIG. 22 is a flowchart illustrating a detailed flow of processing in step S2 in the first example.

In step S2, the operation state calculation processing is executed. FIG. 22 is a flowchart illustrating a detailed flow of the operation state calculation processing (S2) in the first example. In FIG. 22, substantially the same steps as those in the game processing shown in FIG. 13 bear the same step numbers, and detailed descriptions thereof will be omitted.

In FIG. 22, processing in steps S11 through S16 is the same as described above with reference to FIG. 13. In the first example, in step S31 after step S16, the position of the intermediate point between the first coordinate set and the second coordinate set representing the target images is calculated. Specifically, the CPU 10 refers to the current first coordinate set data 51 and the current second coordinate set data 52 to calculate the coordinate set of the intermediate point. Data on the calculated coordinate set of the intermediate point is stored on the main memory 13 as the intermediate point data 61. The intermediate point data 61 represents a position of the target image (the markers 8a and 8b) in the taken image.

Figure 23:
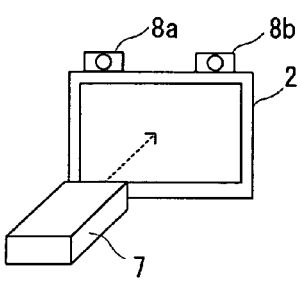
FIG. 23 is a flowchart illustrating a detailed flow of processing in step S32 shown in FIG. 22.
Figure 23:
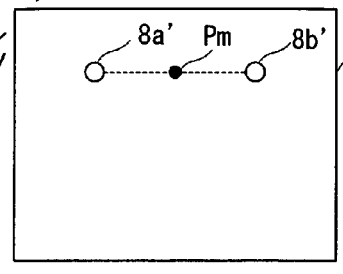
Figure 23:
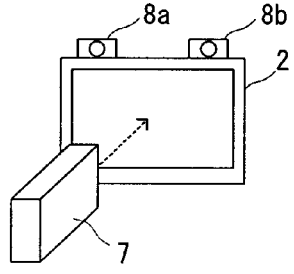
Figure 23:
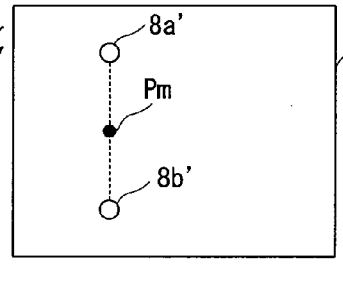

Next in step S32, the coordinate set of the intermediate point calculated in step S31 is corrected. FIG. 23 illustrates the processing in step S32 shown in FIG. 22. FIG. 23 shows the correspondence between the state of the controller 7 and the taken image obtained when the controller 7 is in the respective state. In FIG. 23, in both state A and state B, the center of the display screen of the monitor 2 is the indicated position by the controller 7. In state A, the top surface of the controller 7 is directed upward (in this example, this state will be referred to as the "reference state"); whereas in state B, the top surface of the controller 7 is directed rightward. Since the markers 8a and 8b are located above the display screen, positions of the markers 8a and 8b do not match the indicated position (at the center of the display screen). Therefore, in state A, the target images are above the center of the taken image. In state B, the target images are left to the center of the taken image. As seen from FIG. 23, even if the controller 7 points to the same position on the display screen, the position of the intermediate point (represented with "Pm") changes in accordance with the posture of the controller 7. In other words, since the positions of the markers 8a and 8b do not match the indicated position (at the center of the display screen), the positions of the target images in the taken image change by the rotation angle of the controller 7 around the indicated direction as an axis. For this reason, the indicated position cannot be accurately calculated merely based on the positions of the target images, i.e., merely by processing of calculating the positions of the target images (step S31).

In order to avoid this, in step S32, the coordinate set of the intermediate point calculated in step S31 is corrected based on the direction calculated in step S16. Specifically, the coordinate set of the intermediate point calculated in step S31 is corrected into a coordinate set of the intermediate point obtained in the case where the controller 7 is in the reference state. More specifically, the coordinate set of the intermediate point calculated in step S31 is moved on an arc around the center of the taken image as an axis by an amount corresponding to an angular difference between the direction calculated in step S16 and the direction in the reference state. In state B in FIG. 23, a vector inclined at 90° counterclockwise from the reference state is calculated in step S16. Therefore, it is understood that the controller 7 is inclined at 90° clockwise from the reference state. Accordingly, in step S32, the coordinate set of the intermediate point calculated in step S31 is moved on an arc at 90° clockwise around the center of the taken image as an axis. Data representing the coordinate set of the intermediate point corrected as above in step S32 is stored on the main memory 13 as the updated intermediate point data 61. Based on the corrected coordinate set of the intermediate point obtained in step S32, the game apparatus 3 can calculate the indicated position by the controller 7. After step S32, the CPU 10 terminates the operation state calculation processing.

Returning to FIG. 21, after step 2, processing in step S24 is executed. In step S24, the position of the cursor 73 on the display screen is calculated. Specifically, the CPU 10 calculates the position of the cursor 73 on the display screen based on the intermediate point data 61 obtained in step S32 of the operation state calculation processing. More specifically, from the coordinate set values on the coordinate system (x-y coordinate system) representing the intermediate point, coordinate set values in a coordinate system corresponding to the display screen, i.e., coordinate set values representing the position on the display screen corresponding to the intermediate point, is calculated. The position of the cursor 73 on the display screen is calculated using a function of converting the coordinate set of the intermediate point into a coordinate set on the display screen of the monitor 2. This function converts the coordinate set values of the intermediate point which are calculated from one taken image into coordinate set values representing the position on the display screen which is indicated by the controller 7 (indicated position) when such a taken image is taken. This function allows the indicated position on the display screen to be calculated from the coordinate set of the intermediate point.

Next in step S25, it is determined whether or not any of the windows is designated by the cursor 73. Specifically, the CPU 10 determines whether or not the position of the cursor 73 calculated in step S24 is within any of the windows. When the calculated position of the cursor 73 is within any of the windows, it is determined that one of the windows is designated by the cursor 73. Then, the processing in step S3 is executed. In this case, the window determined to be designated by the cursor 73 is set as the operation target. Namely, data representing the window determined to be designated by the cursor 73 is stored on the main memory 13 as the target identification data 62. By contrast, when the calculated position is not within any of the windows, it is determined that no window is designated by the cursor 73. Then, the processing in step S4 is executed.

In step S3, the moving processing is executed. In the moving processing in the first example, the menu image 77 displayed in the window as the operation target is scrolled by the rotation operation on the controller 7. Hereinafter, the moving processing will be described in detail.

Figure 24:
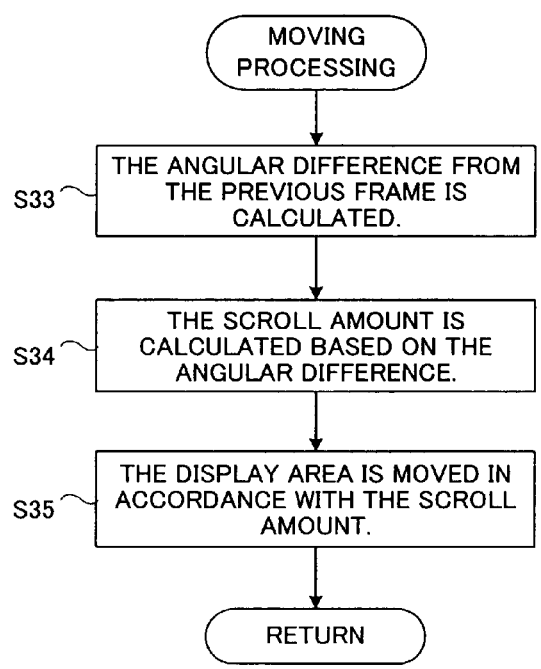
FIG. 24 is a flowchart illustrating a detailed flow of moving processing in the first example.

FIG. 24 is a flowchart illustrating a detailed flow of the moving processing in the first example. The moving processing is executed as follows. First in step S33, an angular difference between the current direction and the previous direction is calculated. The "current direction" is the direction of the target image calculated in the current frame, i.e., the direction calculated in step S16 in the current frame. The current direction is the direction of the vector represented by the direction data 57 stored on the main memory 13 (referred to as a "first vector"). The "previous direction" is the direction of the target image calculated in the previous frame, i.e., the direction calculated in step S16 in the previous frame. The previous direction is the direction of the vector represented by the previous direction data 60 stored on the main memory 13 (referred to as a "second vector"). Specifically, the CPU 10 calculates an angle (angular difference) θ made by the first vector and the second vector. The angular difference θ is represented in the range of $-180°<θ≤180°$. The angular difference θ has a positive value in the clockwise direction with respect to the second vector, and has a negative value in the counterclockwise direction with respect to the second vector. An angular difference θ having a positive value means that the taken image has been rotated clockwise and that the controller 7 has been rotated counterclockwise around the indicated direction as an axis (state B shown in FIG. 19). By contrast, an the angular difference θ having a negative value means that the taken image has been rotated counterclockwise and that the controller 7 has been rotated clockwise around the indicated direction as an axis (state C shown in FIG. 19).

Next in step S34, the scroll amount of the menu image 77 is calculated based on the angular difference calculated in step S33. The scroll amount is determined so as to have a positive value when the angular difference θ has a positive value, and so as to have a negative value when the angular difference θ has a negative value. The scroll amount is also determined such that as the absolute value of the angular difference θ is greater, the absolute value of the scroll amount is greater. Typically, the scroll amount is determined to be in direct proportion to the angular difference θ.

Next in step S35, the display area is moved in accordance with the scroll amount calculated in step S34. Namely, the length s (FIG. 18) from the top edge of the menu image 77 to the top edge of the display area 78 is changed in accordance with the scroll amount. Specifically, the CPU 10 calculates a post-change length by adding the scroll amount to the pre-change length. The content of the position data 59 stored on the main memory 13 is updated to represent the value indicating the calculated post-change length. In the display processing in step S4 described later, the display area 78 is set at the position in accordance with the post-update length, and the menu image 77 in the display area 78 is displayed in the window. Thus, the menu image 77 is displayed on the display screen as a result of scrolling (moving). After step S35, the CPU 10 terminates the moving processing.

Returning to FIG. 21, in step S26 after step S3, it is determined whether or not the player has performed an operation of selecting an item in the window. Specifically, the CPU 10 refers to the operation data obtained in step S1 to determine whether or not the player has performed such an operation (for example, an operation of pressing the A button 32i). When it is determined that such an operation has been performed, processing in step S27 is executed. When it is determined that such an operation has not been performed, processing in steps S27 and S28 is skipped and the processing in step S4 is executed.

In step S27, it is determined whether or not an item has been designated by the cursor 73. Specifically, the CPU 10 determines whether or not the position on the display screen calculated in step S25 is the position at which an item image is displayed. When it is determined that the position on the display screen is the position at which an item image is displayed, processing in step S28 is executed. When it is determined that the position on the display screen is not the position at which an item image is displayed, the processing in step S28 is skipped and the processing in step S4 is executed. The processing in steps S26 and S27 is executed in order to determine whether or not an item has been selected in the state where the cursor 73 designates a corresponding item image. When the determination results in steps S26 and S27 are both positive, the CPU 10 determines that an item has been selected, and executes the game processing in accordance with the selected item in step S28.

In step S28, the processing in accordance with the selected item is executed. For example, when the item image 74a in the window 71 in FIG. 17 is selected, the CPU 10 changes data regarding the player character, image data of the player character and the like, such that the player character can use a sword. After step S28, the processing in step S4 is executed.

In step S4, the display processing is executed. Namely, in the case where the moving processing is executed in step S3 in the current frame, the menu image 77 is displayed in the display area 78 in the window in accordance with the updated position data 59. The cursor 73 is displayed at the position on the display screen calculated in step S25. The processing in step S5 after step S4 is substantially the same as described above with reference to FIG. 12.

In the first example described above, an operation target (an image in the window) is moved by a calculation using a two-dimensional vector represented by the direction data 57 and a coordinate set representing the indicated position on the display screen. Thus, a content displayed in the window can be scrolled by rotating the controller 7 itself. Also, the cursor 73 can be moved on the display screen to designate the window as the operation target by changing the indicated position by the controller 7. According to the first example, two different types of operations, i.e., an operation of designating a window as an operation target and an operation of scrolling a content displayed in the window can be performed by operating the controller 7 itself. A novel operation method using the controller 7 can be provided.

In the first example, the window as the operation target is selected by designating a position on the display screen using the controller 7. In other embodiments, a position on the display screen may be designated by any method. For example, the cursor may be moved by the cross key provided on the controller 7.

In the first example, the window displaying the menu image during the game is described as an example. In other embodiments, the window as a target of scrolling is not limited to a window used for the game, and may be a window displayed on a desk top image of a personal computer or the like. The present invention is applicable to general personal computers. For example, the present invention is applicable to scrolling an image in a browser window.

Figure 25:
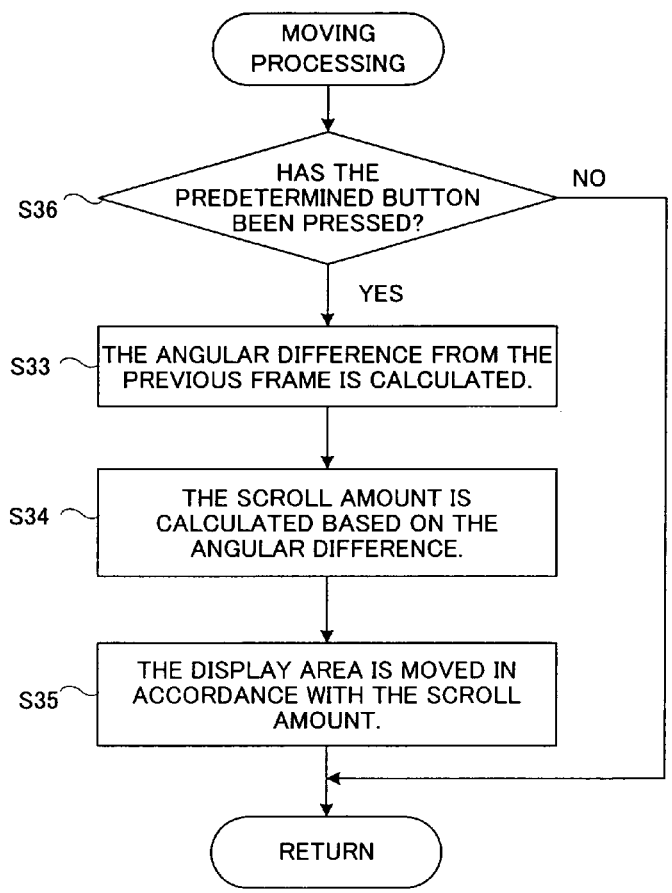
FIG. 25 is a flowchart illustrating a detailed flow of the moving processing in a modification of the first example.

The rotation operation on the controller 7 may be set to be possible only while a predetermined button operation is being performed (for example, an operation of pressing the B button 32d). FIG. 25 is a flowchart illustrating a detailed flow of the moving processing in a modification of the first example. The processing shown in FIG. 25 is different from the processing shown in FIG. 24 in that processing in step S36 is executed.

In FIG. 25, in step S36, it is determined whether or not a predetermined button has been pressed. Specifically, the CPU 10 refers to the operation data obtained in step S1 to determine whether or not such an operation (for example, an operation of pressing the B button 32d) has been performed. When it is determined that such an operation has been performed, the processing in steps S33 through S35 is executed. When it is determined that such an operation has not been performed, the processing in steps S33 through S35 is skipped and the CPU 10 terminates the moving processing.

As described above, by the processing shown in FIG. 25, the display area 78 is not moved (the menu image 77 is not scrolled) when the B button 32d is not pressed. Namely, the player can scroll the display content in the window only when rotating the operation 7 around the indicated direction in the state of pressing the B button 32d. In the case where the display area 78 is moved regardless of whether the B button 32d has been pressed or not (in the case of the moving processing shown in FIG. 24), the display area 78 in the window may be scrolled if the controller 7 is rotated even slightly. Therefore, even if the player does not intend to rotate the controller 7, for example, even if the player only intends to change the indicated position (intends to perform an operation of changing the indicated direction), the display content in the window may be scrolled despite his/her intention.

By contrast, in the case where the display area 78 is moved under the condition that the B button 32d is pressed (the moving processing shown in FIG. 25), the display content in the window is scrolled only when the player so intends. The player can rotate the controller 7 while pressing the B button 32d when intending to scroll the display content in the window. As described above, the processing shown in FIG. 25 can prevent the controller 7 from rotating despite the player's intention.

In other embodiments, the scroll amount may be set to zero in step S34 when the absolute value of the angular difference θ calculated in step S33 is smaller than a predetermined value. Namely, the operation target may be set not to move when the angular difference θ is very small. Depending on the type of, or the situation in, the game, the player may wish to maintain the operation target at a certain posture. If, in such a case, the operation target moves as a result of responding too sensitively to the rotation angle of the controller 7, the operability of the controller 7 is deteriorated. By setting a so-called "play" margin in the rotation operation of the controller 7 as described above, the operability of the controller 7 can be improved.

In the first example, the game apparatus 3 obtains data representing two positions of the target images (the markers 8a and 8b) as operation data from the controller 7 and calculates an intermediate point between the two positions, and thus specifies the position of the image in the taken image. In other embodiments, the controller 7 may calculate the position of the intermediate point and transmit data representing the calculated position of the intermediate point to the game apparatus 3 as operation data. Namely, the game apparatus 3 may obtain data representing the position of the target image from the controller 7 as operation data. In still other embodiments, the game apparatus 3 may obtain image data of the taken image from the controller 7 and calculate the position of the target image from the image data. According to one exemplary method for calculating the position of the target image from the image data, two positions of the target image (the positions of the markers 8a and 8b) are specified from the image data and an intermediate point between the two positions is calculated, like in the first example.

SECOND EXAMPLE

Figure 26:
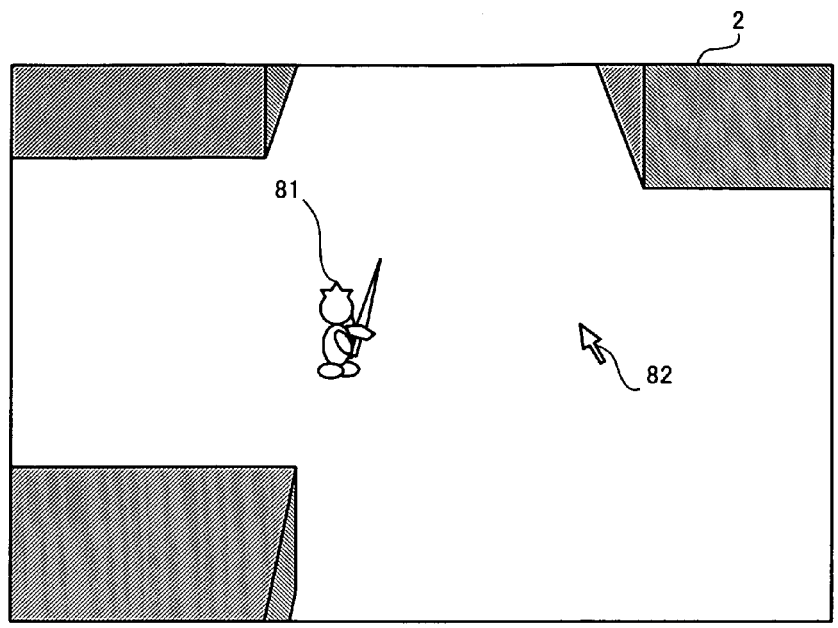
FIG. 26 shows an example of a game screen in a second example.

Hereinafter, a second example in which the present invention is applied to an operation of moving a player character will be described. In this example, a game in which the player character operated by the player is moved in a three-dimensional game space will be described. FIG. 26 shows an example of a game screen in the second example. In FIG. 26, a virtual three-dimensional game space and a player character 81 which is present in the game space are displayed on the display screen of the monitor 2. A cursor 82 is displayed on the display screen. The player character 81 is operated by the player and is an operation target of the rotation operation performed by the player. The cursor 82 is displayed at the indicated position by the controller 7 like in the first example.

Figure 27:
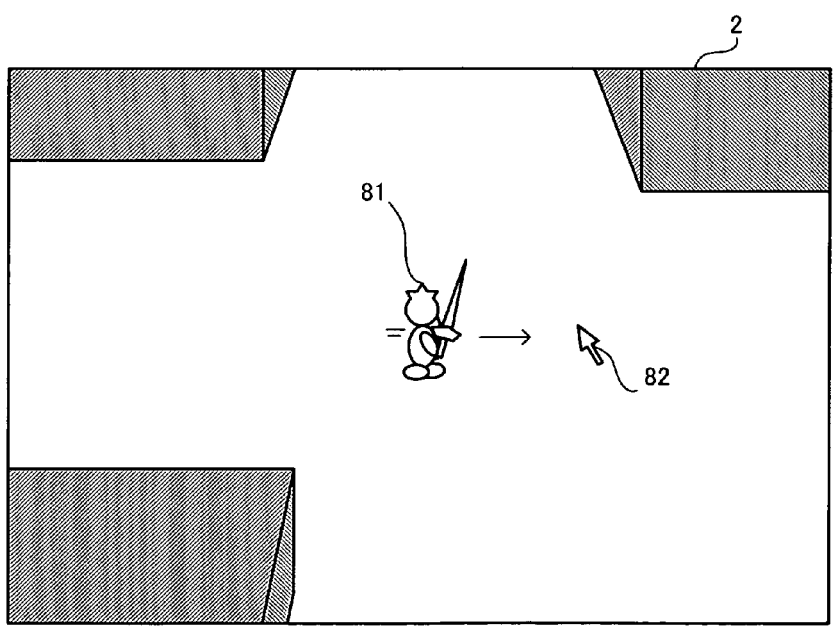
FIG. 27 shows another example of the game screen in the second example.

In the second example, the player can move the player character 81 by rotating the controller 7. For moving the player character 81, the player first moves the cursor 82 in a direction in which he/she wants the player character 81 to move. The operation of moving the cursor 82 is substantially the same as in the first example. Next, in the state where the cursor 82 is located in that direction, the player rotates the controller 7. For example, when the controller 7 is rotated in the state shown in FIG. 26, the player character 81 moves in the direction indicated by the cursor 82 (see FIG. 27).

Figure 28:
FIG. 28 illustrates a moving motion of a player character 81 by the rotation operation.
Figure 28:
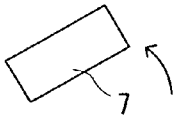
Figure 28:
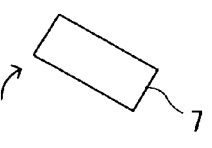

The player can cause the player character 81 to move forward or backward in accordance with the rotation direction of the controller 7. Namely, the player can control the moving direction of the player character 81 in accordance with the rotation direction of the controller 7. FIG. 28 illustrates the moving motion of the player character 81 by the rotation operation. FIG. 28 shows the correspondence between the state of the controller 7 and the moving motion of the player character 81 performed when the controller 7 is in the respective state. In FIG. 28, the controller 7 is seen from behind (from the negative end of the Z-axis direction in FIG. 3A, i.e., from the rear end of the housing 31).

In FIG. 28, in state A, the top surface of the controller 7 is directed upward. A taken image taken in state A is as the taken image I7 shown in FIG. 19. Namely, the images 8a' and 8b' of the markers 8a and 8b are located parallel to the y axis. Regarding FIG. 28, this state will be referred to as a "reference state". A direction of the target image calculated from the taken image in the reference state will be referred to as a "reference direction". In FIG. 28, the reference direction is the direction from the image 8a' of the marker 8a to the image 8b' of the marker 8b (or the opposite direction). Where the controller 7 is in the reference state, the player character 81 does not move (i.e., stops). As described later in detail, the player can set the reference direction.

In state B shown in FIG. 28, the controller 7 has been rotated at 90° counterclockwise at a predetermined angle from the reference state. A taken image taken in state B is as the taken image I8 shown in FIG. 19. Namely, the images 8a' and 8b' have been moved on an arc at the predetermined angle clockwise from the state A. In this state, the player character 81 moves forward in the direction of the position indicated by the cursor 82. In state C shown in FIG. 28, the controller 7 has been rotated at a predetermined angle clockwise from the reference state. A taken image taken in state C is as the taken image I9 shown in FIG. 19. Namely, the images 8a' and 8b' have been moved on an arc at the predetermined angle counterclockwise from the state A. In this state, the player character 81 moves backward, i.e., moves in a direction opposite to the direction toward the position indicated by the cursor 82. In this manner, the player can cause the player character 81 to move forward or backward by rotating the controller 7 counterclockwise or clockwise.

Figure 29:
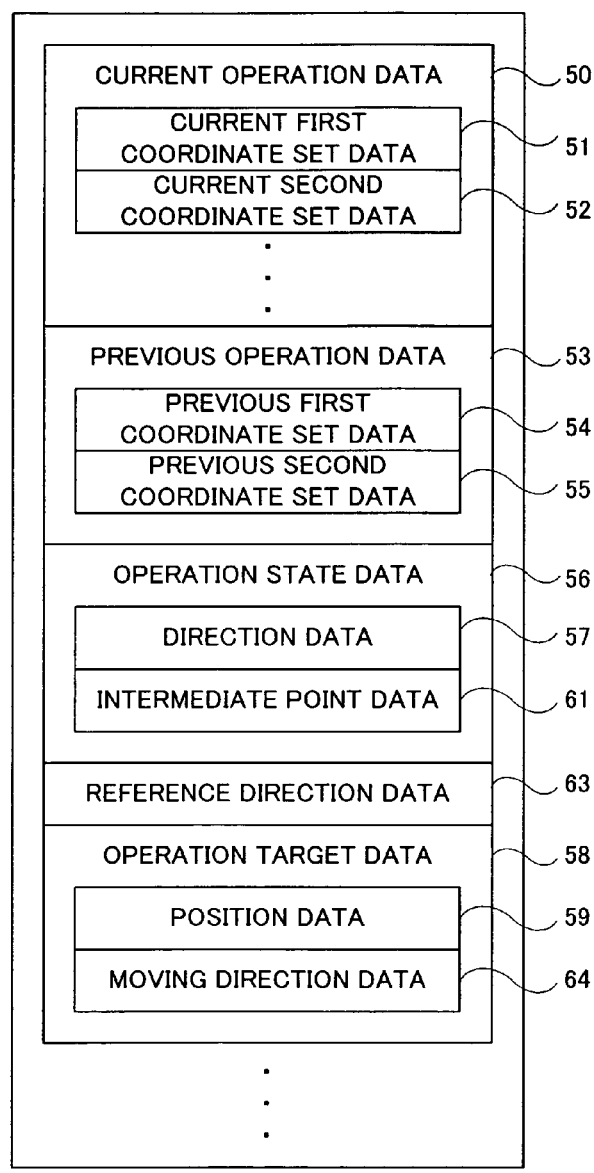
FIG. 29 shows main data stored on the main memory 13 of the game apparatus 3 in the second example.

Next, the game processing in the second example will be described in detail. FIG. 29 shows main data stored on the main memory 13 of the game apparatus 3 in the second example. In the second example, the main memory 13 has the following data stored thereon in addition to the data shown in FIG. 11. The intermediate point data 61 described in the first example is stored on the main memory 13 as a part of the operation state data 56. Reference direction data 63 is also stored on the main memory 13. Moving direction data 64 is also stored on the main memory 13 as a part of the operation target data 58.

The reference direction data 63 represents a reference direction. The reference direction is used as the reference with respect to the direction obtained from the taken image. The reference direction is used for determining the moving amount and the moving direction of the player character 81. Specifically, the moving amount and the moving direction of the player character 81 are determined based on an angular difference between the reference direction and the current direction (the direction represented by the direction data 57). In the second example, the reference direction is set by the player at the start of the game.

The moving direction data 64 represents a moving direction of the player character 81 as the operation target in the three-dimensional game space. Specifically, the moving direction data 64 is data on a three-dimensional vector indicating a direction in the three-dimensional game space. The position data 59 in the second example is data on three-dimensional coordinate set values representing a position of the player character 81 in the three-dimensional game space.

Figure 30:
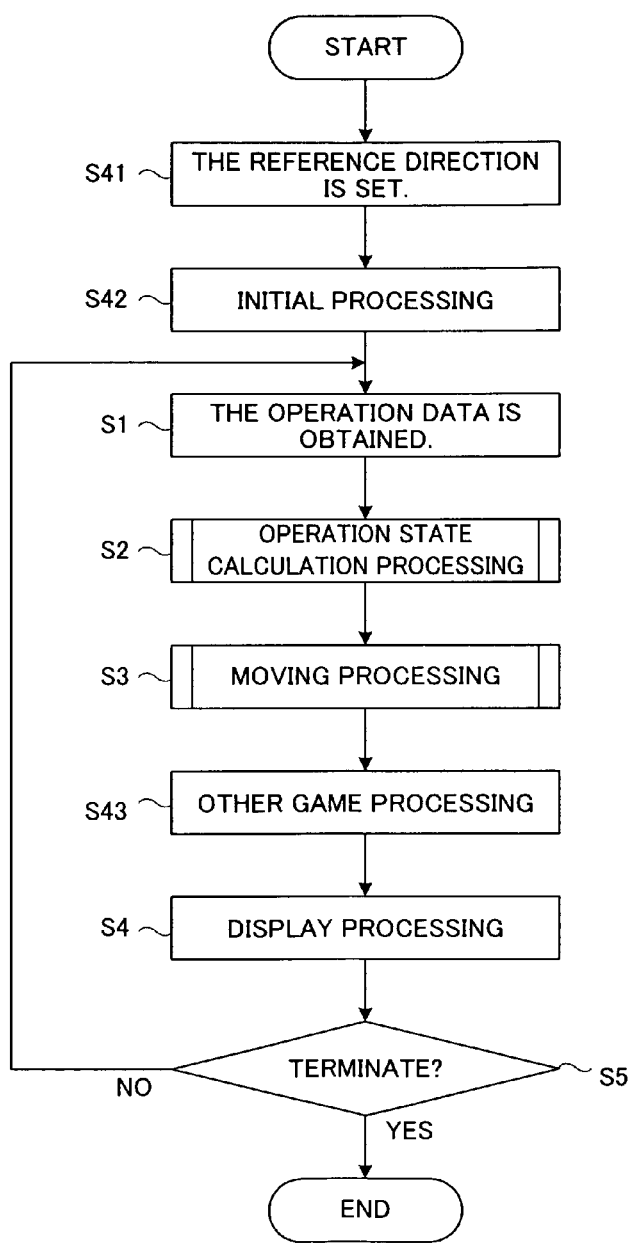
FIG. 30 is a flowchart illustrating a flow of game processing in the second example.

FIG. 30 is a flowchart illustrating a flow of the game processing in the second example. In FIG. 30, substantially the same steps as those in the game processing shown in FIG. 12 bear the same step numbers, and detailed descriptions thereof will be omitted. The processing until the processing in the flowchart shown in FIG. 30 is started is the same as in the case of FIG. 12.

The game processing in the second example is executed as follows. First in step S41, the reference direction is set. Specifically, the CPU 10 urges the player to perform an operation of setting the reference direction through display or the like. In accordance with this, the player holds the controller 7 with an arbitrary posture with respect to the rotation around the indicated direction as an axis and performs an operation of setting the reference direction (for example, an operation of pressing the A button 32i). When this operation is performed, the CPU 10 calculates the reference direction based on the taken image taken at the point when the operation is performed, by substantially the same processing as in step S16. Data representing a vector indicating the calculated reference direction is stored on the main memory 13 as the reference direction data 63. In the second example, such processing in step S41 is executed before the processing of moving the player character 81 (step S3). After step S41, processing in step S42 is executed.

In step S42, initial processing is executed. In the initial processing, a three-dimensional game space is constructed and displayed on the display screen of the monitor 2. Specifically, the CPU 10 constructs the three-dimensional game space and locates the player character 81, an enemy character and the like in the game space. The CPU 10 also sets a virtual camera at a predetermined position in the game space with a predetermined viewing direction. The CPU 10 generates an image of the game space seen from the virtual camera and displays the image on the monitor 2. In this example, the position and the viewing direction of the virtual camera are automatically controlled such that the player character 81 is displayed on the display screen.

After step S42, the processing in step S1 is executed in substantially the same manner as in the first example. The operation state calculation processing in step S2 is also executed in substantially the same manner as in the first example. Namely, by the operation state calculation processing, the operation state data 56 is calculated, and the direction data 57 and the intermediate point data 61 are stored on the main memory 13. After step S2, the processing in step S3 is executed.

In step 3, the moving processing is executed. In the moving processing in the second example, the player character 81 as the operation target is moved in accordance with the rotation operation on the controller 7. Hereinafter, the moving processing will be described in detail.

Figure 31:
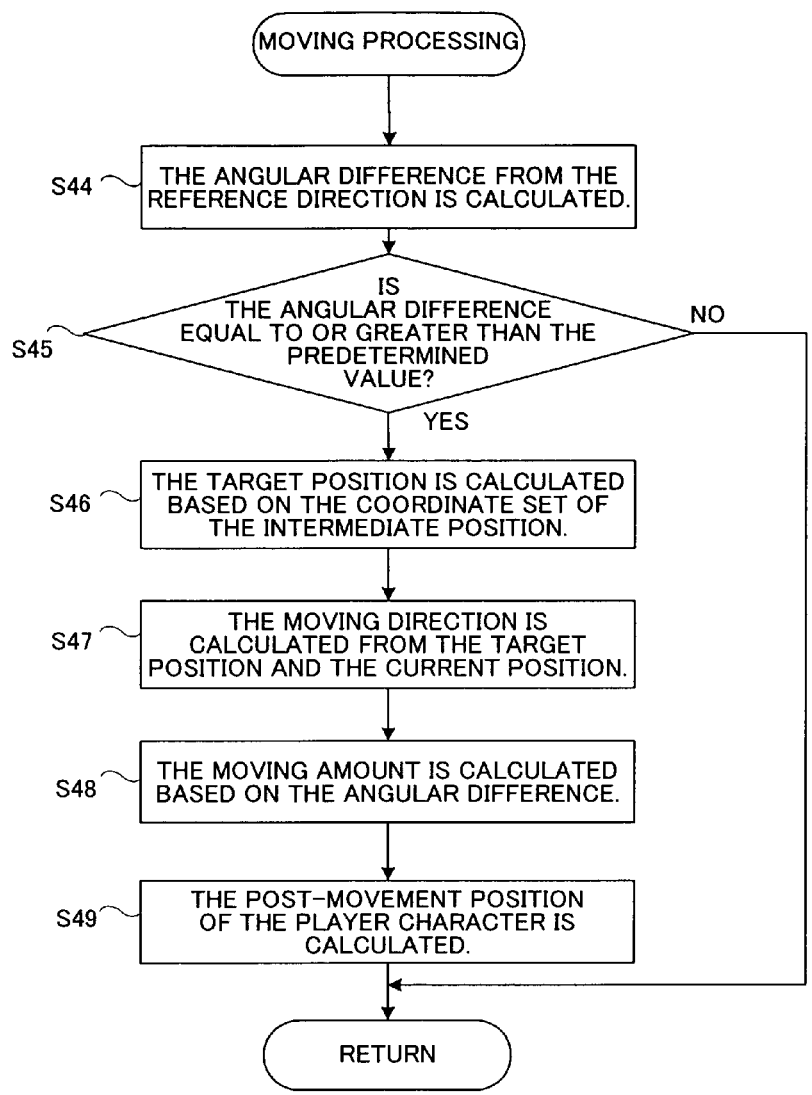
FIG. 31 is a flowchart illustrating a detailed flow of the moving processing in the second example.

FIG. 31 is a flowchart illustrating a detailed flow of the moving processing in the second example. The moving processing in the second example is executed as follows. First in step S44, an angular difference between the direction calculated in step S16 and the reference direction is calculated. Specifically, the CPU 10 calculates an angle (angular difference) θ' made by the vector represented by the reference direction data 63 stored on the main memory 13 (referred to as a "reference vector" in the second example) and the vector represented by the direction data 57 in the operation state data 56 (referred to as a "target vector" in the second example). The angular difference θ' is represented in the range of $-180° < θ ≤ 180°$. The angular difference θ' has a positive value in the clockwise direction with respect to the reference vector, and has a negative value in the counterclockwise direction with respect to the reference vector. An angular difference θ' having a positive value means that the taken image has been rotated clockwise with respect to the reference direction and that the controller 7 has been rotated counterclockwise from the reference state around the indicated direction as an axis (state B shown in FIG. 28). By contrast, an the angular difference θ' having a negative value means that the taken image has been rotated counterclockwise with respect to the reference direction and that the controller 7 has been rotated clockwise from the reference state around the indicated direction as an axis (state C shown in FIG. 28).

Next in steps S45, it is determined whether or not the angular difference calculated in step S44 is equal to or greater than a predetermined value. The predetermined value is determined in advance. When it is determined in step S45 that the angular difference is equal to or greater than the predetermined value, a series of processing in steps S46 through S49 is executed. When it is determined in step S45 that the angular difference is smaller than the predetermined value, the series of processing in steps S46 through S49 is skipped and the CPU 10 terminates the moving processing. The determination in step S45 is executed in order to determine whether or not to move the player character 81.

In step S46, a target position is calculated based on the coordinate set of the intermediate point obtained in step S32. The "target position" is a position in the game space which is designated by the cursor 82. Based on the target position, the moving direction of the player character 81 is determined. Specifically, the CPU 10 first calculates a position on the display screen (two-dimensional coordinate set values) from the coordinate set of the intermediate point. The position on the display screen is calculated by substantially the same method as in the first example. Next, from the position on the display screen, the CPU 10 calculates the position in the game space (three-dimensional coordinate set values) corresponding to the position on the display screen. The "position in the game space corresponding to the position on the display screen" is a position in the game space which is displayed at the position on the display screen. The calculated position in the game space is the target position. After step S46, processing in step S47 is executed.

In step S47, the moving direction of the player character 81 is determined based on the target position calculated in step S46 and the current position of the player character 81. Specifically, the CPU 10 calculates a three-dimensional vector having the current position of the player character 81 as a start point and the target position as an end point. The calculated vector represents the moving direction of the player character 81. Data on the calculated vector is stored on the main memory 13 as the moving direction data 64. After step S47, processing in step S48 is executed.

In step S48, the moving amount (moving amount per frame, i.e., velocity) of the player character 81 is calculated based on the angular difference calculated in step S44. In this example, the moving amount is determined so as to have a positive value when the angular difference θ' has a positive value, and so as to have a negative value when the angular difference θ' has a negative value. The moving amount is also determined such that as the absolute value of the angular difference θ' is greater, the absolute value of the moving amount is greater. Typically, the moving amount is determined to be in direct proportion to the angular difference θ'. After step S48, processing in step S49 is executed.

In step S49, the post-movement position of the player character 81 is calculated. The post-movement position of the player character 81 is determined based on the moving direction calculated in step S47 and the moving amount calculated in step S48. Specifically, the CPU 10 first normalizes the vector representing the moving direction (the vector represented by the moving direction data 64) to calculate a unit vector having a predetermined magnitude. The CPU 10 calculates a vector by multiplying the unit vector by the moving amount. The CPU 10 then sets a position, obtained by moving the player character 81 from the current position (starting position) by the magnitude of the calculated vector in the direction of the calculated vector, as the post-movement position of the player character 81. When the moving amount has a positive value, the calculated vector is in the opposite direction to the unit vector, and thus the player character 81 moves forward. When the moving amount has a negative value, the player character 81 moves backward for the same reason. Data on the coordinate set values representing the post-movement position thus calculated is stored on the main memory 13 as the position data 59. After step S49, the CPU 10 terminates the moving processing.

Returning to FIG. 30, in step S43 after step S3, other game processing than the processing of moving the player character 81 is executed. The other game processing includes, for example, processing of causing the player character 81 to perform a motion other than moving (e.g., a motion of attacking the enemy character) and processing of controlling the motion of the enemy character.

Next in step S4, the display processing is executed. In the display processing, an image of the game space including the player character 81 located at the post-movement position determined in step S3 is displayed. Thus, the player character 81 is displayed on the display screen as moving. The processing in step 5 after step S4 is substantially the same as described above with reference to FIG. 12.

As described above, in the second example, the player character 81 can be moved forward or backward by an operation of rotating the controller 7 itself. Also, the cursor 82 can be moved on the display screen to designate the direction in which the player character 81 is to move by an operation of changing the indicated position by the controller 7. Namely, in the second example, two different types of operations, i.e., an operation of designating a moving amount by which the player character 81 as an operation target is to move and an operation of designating a moving direction in which the player character 81 is to move can be performed by operating the controller 7 itself. A novel operation method using the controller 7 can be provided.

In the second example, the player character 81 does not move when the angular difference θ' between the direction calculated in step S16 and the reference direction is smaller than a predetermined value. Therefore, even if the controller 7 is slightly rotated from the reference state, the player character 81 does not move. If the player character 81 moves as a result of responding too sensitively to the rotation angle of the controller 7, the player character 81 may move despite the player's intention, which deteriorates the operability of the controller 7. Depending on the type of, or the situation in, the game, the player may wish to maintain the operation target at a certain posture. If, in such a case, the operation target moves as a result of responding too sensitively to the rotation angle of the controller 7, it becomes difficult to maintain the operation target at a certain posture and the operability of the controller 7 is deteriorated. By contrast, in the second example, even if the controller 7 is rotated slightly from the reference state, the player character 81 does not move. This prevents the player character 81 from moving despite the player's intention. By setting a so-called "play" margin in the rotation operation of the controller 7 in this manner, the operability of the controller 7 can be improved.

In the second example, an object appearing in the virtual three-dimensional game space is the operation target. Alternatively, the virtual camera for generating an image of the game space may be the operation target. Namely, the virtual camera may be moved to the target position in accordance with the direction calculated in step S16. In the case where the virtual camera is the operation target, the virtual camera can be moved to the target position by substantially the same processing as described above with reference to FIG. 30 and FIG. 31.

In the second example, the player character 81 as the operation target is moved in the direction of the target position. In other embodiments, the player character 81 may be moved up to the target position, as opposed to be moved in the direction toward the target position. In this case, the target position is determined by pressing a predetermined button provided on the controller 7. Namely, the player moves the cursor 82 toward a desired position with the controller 7, and presses the predetermine button when the cursor 82 reaches the desired position. In accordance with the predetermined button being pressed, the game apparatus 3 determines the target position and moves the player character 81 up to the target position. Namely, even if the cursor 82 moves to another position after the predetermined button is pressed, the player character 81 is moved up to the target position unless a new target position is determined. The moving amount per frame may be determined in accordance with the angular difference.

THIRD EXAMPLE

Figure 32:
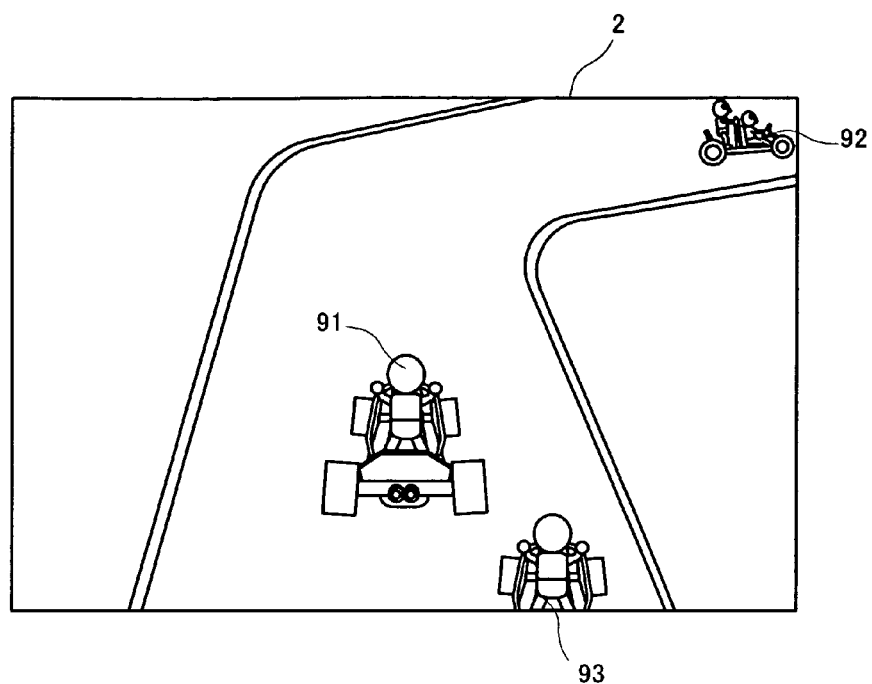
FIG. 32 shows an example of a game screen in a third example.

Hereinafter, a third example in which the present invention is applied to an operation of moving a player character will be described. In this example, a racing game in which the player operates a cart (player character) will be described. FIG. 32 show an example of a game screen in the third example. In FIG. 32, a virtual three-dimensional game space as a race course and carts 91 through 93 which are present in the game space are displayed on the display screen of the monitor 2. The cart 91 is operated by the operator (player cart), and the carts 92 and 93 are controlled by the game apparatus 3 regarding motions thereof.

In the third example, the player can move the player cart 91 by rotating the controller 7 and pressing the operation buttons provided on the controller 7. Specifically, a component regarding the front-rear direction of the acceleration of the player cart 91 is determined by the rotation operation on the controller 7. A component regarding the left-right direction of the acceleration of the player cart 91 is determined by a pressing operation of pressing the cross key 32a. In this example, the acceleration is a variable used for determining the velocity of the player cart 91 per frame. The player cart 91 is moved based on the velocity determined based on the acceleration. The player rotates the controller 7 to adjust the front-rear direction component of the acceleration of the player cart 91, and also presses a leftward or rightward key of the cross key 32a to adjust the left-right direction component of the acceleration of the player cart 91. Thus, the player controls the movement of the player cart 91.

Figure 33:
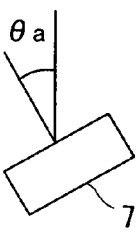
FIG. 33 illustrates an acceleration of a player cart 91 changing by the rotation operation.
Figure 33:
Figure 33:
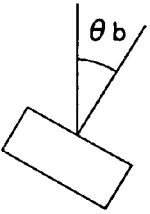

FIG. 33 illustrates the acceleration of the player cart 91 which is changed by the rotation operation. FIG. 33 shows the correspondence between the state of the controller 7 and the acceleration (front-rear direction component) of the player cart 91 when the controller 7 is in the respective state. In FIG. 33, the controller 7 is seen from behind (from the negative end of the Z-axis direction in FIG. 3A, i.e., from the rear end of the housing 31).

In state A shown in FIG. 33, the controller 7 has been rotated counterclockwise at a predetermined angle θa from a state where the top surface of the controller 7 is directed upward. In the third example, an upward direction vertical to the top surface of the controller 7 in the state where the top surface of the controller 7 is directed upward is set as 0°. In the state where the controller 7 is in state A, the acceleration of the player cart 91 is calculated as "0". In the third example, state A will be referred to as a "reference state". A direction of the target image calculated from a taken image in the reference state will be referred to as a "reference direction".

In state B shown in FIG. 33, the controller 7 has been rotated clockwise at the predetermined angle from state A. In the case where the controller 7 is in state B, the acceleration of the player cart 91 is calculated as "A1". In state C shown in FIG. 33, the controller 7 has been rotated clockwise at a predetermined angle θa from state B where the top surface of the controller 7 is directed upward. In the case where the controller 7 is in state C, the acceleration of the player cart 91 is calculated as "Amax". "Amax" is the maximum value of the acceleration. As described above, the acceleration of the player cart 91 is calculated so as to increase as the controller 7 is rotated clockwise from state A and so as to be maximum in state C.

Figure 34:
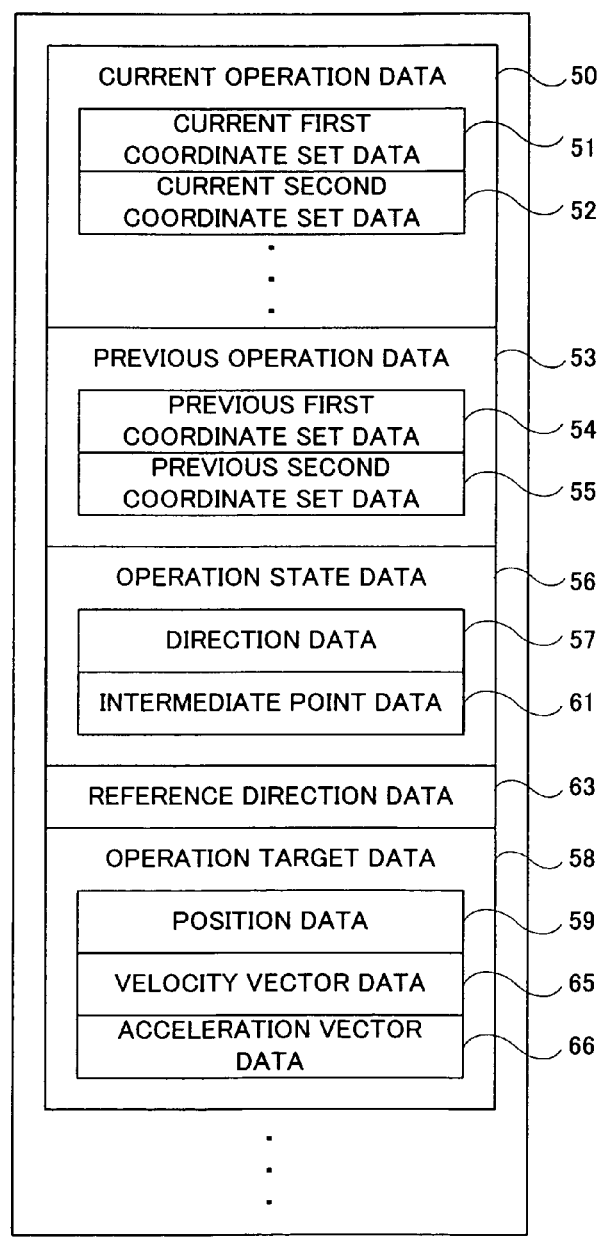
FIG. 34 shows main data stored on the main memory 13 of the game apparatus 3 in the third example.

Next, the game processing in the third example will be described in detail. FIG. 34 shows main data stored on the main memory 13 of the game apparatus 3 in the third example. In the third example, the main memory 13 has the following data stored thereon in addition to the data shown in FIG. 11. The reference direction data 63 is stored on the main memory 13. Velocity vector data 65 and acceleration vector data 66 are also stored on the main memory 13 as a part of the operation state data 58.

The reference direction data 63 represents a reference direction. The reference direction is used as the reference with respect to the direction obtained from the taken image. The reference direction is used for calculating the acceleration of the player cart 91. Specifically, the acceleration of the player cart 91 is determined based on an angular difference between the reference direction and the current direction (the direction represented by the direction data 57). The reference direction is predetermined in the third example, but may be set by the player at the start of the game in other embodiments.

The velocity vector data 65 represents a velocity of the player cart 91. Namely, the velocity vector data 65 represents a moving direction and a moving amount of the player cart 91 per frame. The acceleration vector data 66 represents an acceleration vector of the player cart 91. In the third example, the acceleration vector data 66 is used for calculating the velocity of the player cart 91.

Figure 35:
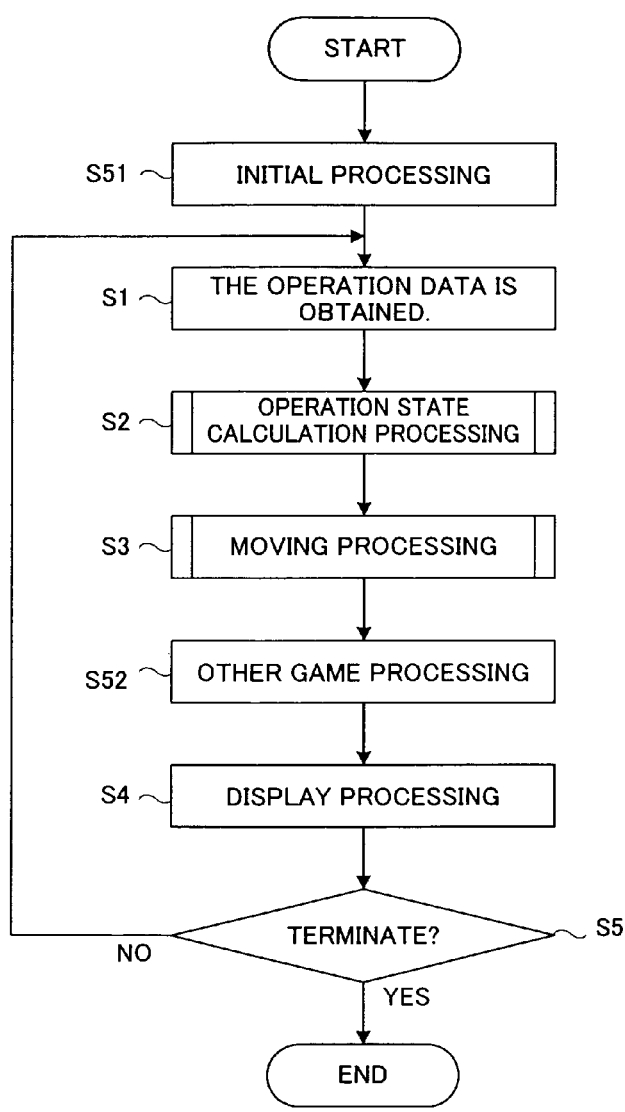
FIG. 35 is a flowchart illustrating a flow of game processing in the third example.

FIG. 35 is a flowchart illustrating a flow of the game processing in the third example. In FIG. 35, substantially the same steps as those in the game processing shown in FIG. 12 bear the same step numbers, and detailed descriptions thereof will be omitted. The processing until the processing in the flowchart shown in FIG. 35 is started is the same as in the case of FIG. 12.

The game processing in the third example is executed as follows. First in step S51, initial processing is executed. In the initial processing, a three-dimensional game space is constructed and displayed on the display screen of the monitor 2. Specifically, the CPU 10 constructs the three-dimensional game space and locates a plurality of carts including the player cart 91 in the game space. The CPU 10 also sets a virtual camera at a predetermined position in the game space with a predetermined viewing direction. The CPU 10 generates an image of the game space seen from the virtual camera and displays the image on the monitor 2. In this example, the position and the viewing direction of the virtual camera are automatically controlled such that the player cart 91 is displayed on the display screen.

After step S51, the processing in step S1 is executed in substantially the same manner as described above with reference to FIG. 12. The operation state calculation processing in step S2 is also executed in substantially the same manner as described above with reference to FIG. 12. Namely, by the operation state calculation processing, the operation state data 56 is calculated, and the direction data 57 is stored on the main memory 13. After step S2, the processing in step S3 is executed.

In step S3, the moving processing is executed. In the moving processing in the third example, the player cart 91 as the operation target is moved in accordance with the rotation operation on the controller 7 and the pressing operation on the cross key 32*a*. Hereinafter, the moving processing will be described in detail.

Figure 36:
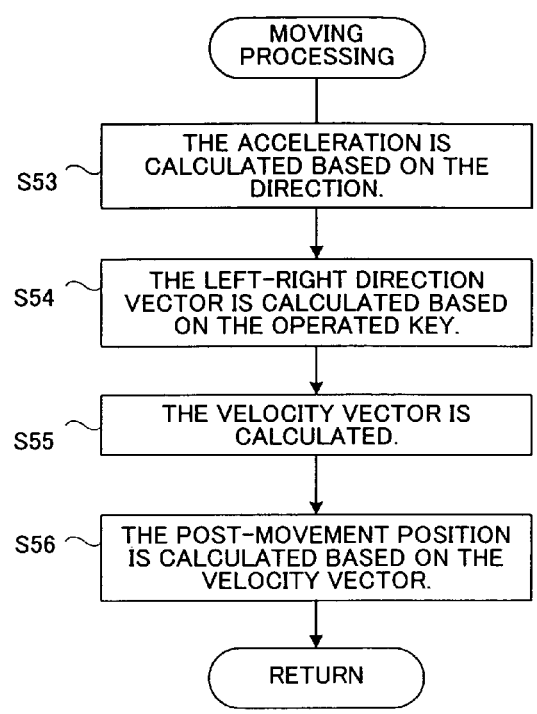
FIG. 36 is a flowchart illustrating a detailed flow of the moving processing in the third example.

FIG. 36 is a flowchart illustrating a detailed flow of the moving processing in the third example. The moving processing in the third example is executed as follows. First in step S53, the front-rear direction component of the acceleration of the player cart 91 is calculated based on the direction calculated in step S16, more specifically, based on the angular difference between the direction calculated in step S16 and the reference direction. The angular difference is represented in the range from greater than −180° to equal to or smaller than 180°. The angular difference has a positive value in the counterclockwise direction with respect to the reference vector as described in the second example and has a negative value the clockwise direction with respect to the reference vector. An angular difference having a positive value means that the taken image has been rotated counterclockwise with respect to the reference direction and that the controller 7 has been rotated clockwise from the reference state around the indicated direction as an axis.

Specifically, the CPU 10 first calculates the angular difference between the reference direction and the direction calculated in step S16. Next, the CPU 10 calculates the front-rear direction component of the acceleration so as to have a magnitude in accordance with the calculated angular difference. As shown in FIG. 33, the front-rear direction component A of the acceleration is calculated to have a magnitude in the range of 0≤A≤Amax and in accordance with the angular difference. In the case where the controller 7 is rotated counterclockwise further from state A, i.e., in the case where the angular difference has a negative value, the front-rear direction component of the acceleration is calculated as "0". In the case where the controller 7 is rotated clockwise further from state C, i.e., in the case where the angular difference has a value greater than θa+θb, the front-rear direction component of the acceleration is calculated as "Amax". After step S53, processing in step S54 is executed.

In steps S54, the left-right direction component of the acceleration is determined based on the pressing on an operation key. Specifically, the CPU 10 determines which of the rightward key and the leftward key of the cross key 32*a* has been pressed based on the operation data obtained in step S1. When the rightward key has been pressed, the CPU 10 determines the magnitude of the left-right direction component to be a predetermined value representing the rightward direction. When the leftward key has been pressed, the CPU 10 determines the magnitude of the left-right direction component to be a predetermined value representing the leftward direction. An acceleration vector is obtained by synthesizing the front-rear direction component of the acceleration calculated in step S53 and the left-right direction component of the acceleration calculated in step S54. Data on the calculated acceleration vector is stored on the main memory 13 as the acceleration vector data 66. After step S54, processing in step S55 is executed.

In step S55, the velocity is calculated based on the acceleration calculated in steps S53 and S54. A new velocity vector is obtained by adding the velocity vector in the previous frame and the acceleration vector obtained in the steps S53 and S54. Specifically, the CPU 10 refers to the velocity vector data 65 and the acceleration vector data 66 stored on the main memory 13 to calculate the new velocity vector. The CPU 10 then stores data on the calculated velocity vector on the main memory 13 as new vector data 65. After step S55, processing in step S56 is executed.

In step S56, a post-movement position of the player cart 91 is calculated based on the velocity calculated in step S55. Specifically, the CPU 10 calculates a position, obtained by moving the player cart 91 from the current position thereof (starting position) by the magnitude of the velocity vector in the direction of the velocity vector, as the post-movement position of the player cart 91. Data on the calculated post-movement position is stored on the main memory 13 as the updated position data 59. After step S56, the CPU 10 terminates the moving processing.

Returning to FIG. 35, in step S52 after step S3, other game processing is executed. For example, processing of moving the carts other than the player cart 91 is executed. Next in step S4, the display processing is executed. In the display processing, an image of the game space including the player cart 91 located at the post-movement position determined in step S3 is displayed. Thus, the player cart 91 is displayed on the display screen as moving. The processing in step 5 after step S4 is substantially the same as described above with reference to FIG. 12.

As described above, in the third example, the acceleration (velocity) of the player cart 91 in the game space can be changed by an operation of rotating the controller 7 itself. Also, the moving direction of the player cart 91 can be changed by an operation of pressing an operation button on the controller 7. Namely, in the third example, the movement of the player cart 91 as the operation target can be controlled by operating the controller 7 itself and an operation button provided on the controller 7. Thus, a novel operation method of operating one operation target by a combination of an operation of moving the controller 7 itself and an operation performed on an operation button provided thereon can be provided.

In the above embodiments, a rotation angle, i.e., a difference between a vector corresponding to the direction data 57 and the reference vector is calculated as an angular difference, which is one example of the rotation amount. Alternatively, a difference between the vectors may be calculated as a vector (differential vector), which may be used instead of the angular difference. Still alternatively, the operation target may be moved using only the value of a predetermined component of the differential vector. In other embodiments, the operation target may be moved using only the value of a vector corresponding to the direction data, without using the reference vector. For example, the correspondence between the value of the vector corresponding to the direction data and the position of the operation target (the position on the display screen or in the game space) when the vector has the respective value may be determined. In such a case, the operation target can be moved using only the value of the vector. Thus, the cost of calculating the angular difference can be alleviated while allowing controls to be performed based on the inclination of the controller 7.

In the above description, the information processing system and the program according to the present invention are realized as a game system and a game program. The present invention is not limited to uses in the game field, and is applicable to any information processing system using an input device for detecting the position or direction of the input device itself using a taken image.

For instance, the first example is applicable to a system for designating an arbitrary position on a display screen, as well as for displaying a game menu screen. Such a system is used in a conference or the like by a presenter to explain the content displayed on the screen. Specifically, the cursor is moved on the display screen and the image displayed on the display screen is scrolled, both in substantially the same manner as in the first example. With such a system, the presenter can perform an operation of moving the cursor to designate an arbitrary position on the display screen and an operation of scrolling the display content on the display screen with one controller 7. Since the designation of a position with the cursor and the scrolling of the display content can be done with one hand, this system is very convenient to the presenter.

The present invention provides a novel operation of an information processing system using an input device which is used by the user while being held in his/her hand, and is applicable to a game apparatus or a game program, for example.

While the invention has been described in detail, the foregoing description is in all aspects illustrative and not restrictive. It is understood that numerous other modifications and variations can be devised without departing from the scope of the invention.

What is claimed is:

1. A non-transitory computer readable storage medium having stored thereon a program executable by at least one computer of an information processing apparatus for receiving operation data from a handheld operation device including an imaging device for taking images of an imaging target and for displaying, in a display area on a display device, a menu object containing selectable items and enabling a user to interact with the displayed menu object in accordance with calculation processing performed using the operation data, the imaging device taking first and second images, the program causing the at least one computer to perform operations comprising:

obtaining a first image taken by the imaging device of the operation device as the operation data;

conditionally selecting the displayed menu object as a user-selected operation target based on a position of the imaging target in a taken image;

calculating a first two-dimensional vector based on an orientation of the imaging target in the first taken image;

calculating a second two-dimensional vector based on an orientation of the imaging target in the second taken image;

calculating an angular difference between said first and second two-dimensional vectors, the angular difference indicative of roll rotation of the operation device about an imaging direction axis of the imaging device between the imaging device and the user-selected operation target;

calculating a scroll amount, s, based on the calculated angular difference so that the scroll amount has a magnitude that is proportional to the absolute value of the angular difference;

linearly scrolling the selectable items within the selected displayed menu object in a predetermined direction by an amount responsive to the calculated scroll amount, s; and allowing the user to initiate an action by pointing the handheld device at and further selecting a scrolled selectable item displayed on the display area of the display device.

2. A non-transitory storage medium according to claim 1, wherein calculation of a two-dimensional vector includes:

determining coordinate sets of two predetermined points in the image of the imaging target in a coordinate system corresponding to the taken image; and calculating a two-dimensional vector connecting the coordinate sets of the two predetermined points.

3. A non-transitory storage medium according to claim 2, wherein the program further causes said at least one computer to perform operations including calculating an indicated coordinate set which corresponds to a position on the display area indicated by a user by pointing an imaging direction of the handheld operation device at a display area of the display device, the indicated coordinate set determined based at least in part on a coordinate set of an intermediate point between the two predetermined points and wherein a user-selected operation target is selected based on the indicated coordinate set.

4. A non-transitory storage medium according to claim 3, wherein a menu object including one or more images is displayed within a predetermined range within the display area of the display device; and the program further causes said at least one computer to perform operations including determining if the indicated coordinate set is within a range corresponding to the predetermined range and, if the indicated coordinate set is within said range, setting the menu object as the user-selected operation target; and moving a display content of the object set as the operation target so that an image displayed in the predetermined range is scrolled in the predetermined direction.

5. A non-transitory storage medium according to claim 3, wherein a menu object displayed within a predetermined range of the display area of the display device includes plural item images representing associated selectable items;

a display content of the menu object which is set as the operation target is moved, such that the selectable items are scrolled in the predetermined direction so as to be displayed in the predetermined range sequentially; and the program further causes said at least one computer to perform operations including:

accepting an instruction input from the operation device that indicates that one of the selectable items is selected; and when the instruction input is accepted at a time when an item image is displayed at a position of the calculated indicted coordinate set, determining that the selectable item represented by the item image displayed at a position of the calculated indicated coordinate set is selected.

6. A non-transitory storage medium according to claim 1, wherein the program further causes said at least one computer to perform operations including calculating an indicated coordinate set which corresponds to a position on the display area indicated by a user by pointing an imaging direction of the handheld operation device at a display area of the display device, the indicated coordinate set in correspondence with a position of the image of the imaging target in a taken image, wherein a user-selected operation target is selected based on the indicated coordinate set.

7. A non-transitory storage medium according to claim 6, wherein a menu object including one or more images is displayed within a predetermined range within the display area of the display device; and the program further causes said at least one computer to perform operations including determining if the indicated coordinate set is within a range corresponding to the predetermined range and, if the indicated coordinate set is within said range, setting the menu object as the user-selected operation target; and moving a display content of the object set as the operation target so that an image displayed in the predetermined range is scrolled in the predetermined direction.

8. A non-transitory storage medium according to claim 6, wherein a menu object displayed in a predetermined range of the display area includes plural item images representing associated selectable items;

a display content of the menu object which is set as the operation target is moved, such that the selectable items are scrolled in the predetermined direction so as to be displayed in the predetermined range sequentially; and the program further causes said at least one computer to perform operations including:

accepting an instruction input from the operation device that indicates that one of the selectable items is selected; and when the instruction input is accepted at a time when one of the item images is displayed at a position of the calculated indicted coordinate set, determining that a selectable item represented by an associated one of the item images is selected.

9. A non-transitory storage medium according to claim 1, wherein the program further causes said at least one computer to perform operations including setting an indicated coordinate set which corresponds to a position on the display area indicated by a user by pointing an imaging direction of the handheld operation device at a particular location in the display area of the display device, wherein a user-selected operation target is selected based on the indicated coordinate set.

10. A non-transitory storage medium according to claim 9, wherein a menu object including one or more images is displayed within a predetermined range within the display area of the display device; and the program further causes said at least one computer to perform operations including determining if the indicated coordinate set is within a range corresponding to the predetermined range and, if the indicated coordinate set is within said range, setting the menu object as the user-selected operation target; and moving a display content of the object set as the operation target so that an image displayed in the predetermined range is scrolled in the predetermined direction.

11. A non-transitory storage medium according to claim 9, wherein:

the virtual space includes an object to be displayed in a predetermined range of the display area as item images representing selectable items;

a display content of the object which is set is moved, such that the selectable items are scrolled in the predetermined direction to be displayed in the predetermined range sequentially; and the program further causes the computer to execute:

accepting an instruction input showing that one of the selectable items is selected; and when the instruction input is accepted at the point when one of the item images is displayed at a position of the indicted coordinate set, determining that the selectable item represented by the one of the item images is selected.

12. A non-transitory storage medium according to claim 1, wherein:

the virtual space includes an object to be displayed in a predetermined range of the display area; and a display content of the object is moved such that an image displayed in the predetermined range is scrolled in the predetermined direction.

13. A non-transitory computer readable storage medium according to claim 1 wherein the linear scrolling of selectable items is performed in a first predetermined direction if the calculated angular difference is positive and in a second predetermined direction if the calculated angular difference is negative.

14. A non-transitory computer readable storage medium having stored thereon a program executable by at least one computer of an information processing apparatus for receiving operation data from a handheld operation device, which includes an imaging device for taking images of an imaging target and a processor for calculating coordinates of a plurality of marker points in the image of the imaging target taken by the imaging device, and for displaying, in a display area on a display device, a menu object containing selectable items and enabling a user to interact with the displayed menu object in accordance with calculation processing performed using the operation data, the imaging device taking first and second images, the program causing the at least one computer to perform operations comprising:

obtaining coordinates of plural marker points of the first taken image as operation data from the handheld device;

conditionally selecting the displayed menu object as a user-selected operation target based on position of the plural marker points of the first taken image;

calculating a first two-dimensional vector based on said coordinates of plural marker points in the first taken image;

obtaining coordinates of plural marker points of the second taken image as operation data from the handheld device; and calculating a second two-dimensional vector based on said coordinates of plural marker points of the second taken image;

calculating an angular difference between said first and second two-dimensional vectors, the angular difference indicative of roll rotation of the operation device about an imaging direction axis of the imaging device between the imaging device and the user-selected operation target;

calculating a scroll amount, s, based on the calculated angular difference so that the scroll amount has a magnitude that is proportional to the absolute value of the angular difference;

linearly scrolling the selectable items within the selected displayed menu object in a predetermined direction by an amount responsive to the calculated scroll amount, s; and allowing the user to initiate an action by pointing the handheld operation device at and further selecting a scrolled selectable item displayed on the display area of the display device.

15. A non-transitory storage medium according to claim 14, wherein:

the program further causes said at least one computer to perform operations including calculating an indicated coordinate set which corresponds to a position on the display area indicated by a user by pointing an imaging direction of the handheld operation device at a display area of the display device, the indicated coordinate set determined based at least in part on a coordinate set of an intermediate point between two predetermined marker points, wherein a user-selected operation target is selected based on the indicated coordinate set.

16. A non-transitory storage medium according to claim 15, wherein a menu object including one or more images is displayed within a predetermined range within the display area of the display device; and the program further causes said at least one computer to perform operations including determining if the indicated coordinate set is within a range corresponding to the predetermined range and, if the indicated coordinate set is within said range, setting the menu object as the user-selected operation target; and moving a display content of the object set as the operation target such that an image displayed in the predetermined range is scrolled in the predetermined direction.

17. A non-transitory storage medium according to claim 15, wherein a displayed virtual space includes an object to be displayed within a predetermined range within the display area of the display device, the object including item images representing selectable items; and the program further causes said at least one computer to perform operations including:

moving a display content of the object which is set as the operation target such that the selectable items are scrolled sequentially in the predetermined direction;

accepting an instruction input from the operation device that indicates that one of the selectable items is selected; and when the instruction input is accepted at a time when an item image is displayed at a position of the calculated indicted coordinate set, determining that the selectable item represented by the item image displayed at a position of the calculated indicted coordinate set is selected.

18. A non-transitory storage medium according to claim 14, wherein the program further causes said at least one computer to perform operations including setting an indicated coordinate set which corresponds to a position on the display area indicated by a user by pointing an imaging direction of the handheld operation device at a particular location in the display area of the display device, wherein a user-selected operation target is selected based on the indicated coordinate set.

19. A non-transitory storage medium according to claim 18, wherein a menu object including one or more images is displayed within a predetermined range within the display area of the display device; and the program further causes said at least one computer to perform operations including determining if the indicated coordinate set is within a range corresponding to the predetermined range and, if the indicated coordinate set is within said range, setting the menu object as the user-selected operation target; and moving a display content of the object set as the operation target such that an image displayed in the predetermined range is scrolled in the predetermined direction.

20. A non-transitory storage medium according to claim 18, wherein a displayed virtual space includes an object to be displayed within a predetermined range within the display area of the display device, the object including item images representing selectable items; and the program further causes said at least one computer to perform operations including:

moving a display content of the object which is set as the operation target such that the selectable items are scrolled sequentially in the predetermined direction;

accepting an instruction input from the operation device that indicates that one of the selectable items is selected; and when the instruction input is accepted at a time when an item image is displayed at a position of the calculated indicted coordinate set, determining that the selectable item represented by the item image displayed at a position of the calculated indicted coordinate set is selected.

21. A non-transitory storage medium according to claim 14, wherein a virtual space is displayed in a display area on the display device and the virtual space is a virtual three-dimensional space; and the program further causes said at least one computer to perform operations including:

setting a virtual camera directed in a predetermined direction at a predetermined position in the virtual space;

setting the virtual camera as the operation target; and moving the virtual camera set as the operation target in a predetermined three-dimensional direction in the virtual space;

wherein an image of the virtual space as seen from the virtual camera is displayed on the display area.

22. A non-transitory storage medium according to claim 14, wherein a virtual space is displayed in a display area on the display device and the virtual space Includes an object which is displayed within a predetermined range within the display area of the display device; and the program further causes said at least one computer to perform operations including moving a display content of the object such that an image displayed in the predetermined range is scrolled in the predetermined direction.

23. A non-transitory computer readable storage medium according to claim 14 wherein the linear scrolling of selectable items is performed in a first predetermined direction if the calculated angular difference is positive and in a second predetermined direction if the calculated angular difference is negative.

24. A non-transitory computer readable storage medium having stored thereon a program executable by at least one computer of an information processing apparatus for receiving operation data from a handheld operation device that includes an imaging device for taking images of an imaging target and a processor for calculating a two-dimensional vector based on an orientation of the imaging target in an image taken by the imaging device, and for displaying, in a display area on a display device, a menu object containing selectable items and enabling a user to interact with the displayed menu object in accordance with calculation processing performed using the operation data, the imaging device taking first and second images, the program causing the at least one computer to execute:

obtaining a calculated first two-dimensional vector based on an orientation of the imaging target in the first taken image as operation data from the handheld device;

conditionally selecting the displayed menu object as a user-selected operation target based at least in part on a position of the calculated first two-dimensional vector;

obtaining a calculated second two-dimensional vector based on an orientation of the imaging target in the second taken image as operation data from the handheld device;

calculating an angular difference between said first and second two-dimensional vectors, the angular difference indicative of roll rotation of the operation device about an imaging direction axis of the imaging device between the imaging device and the user-selected operation target;

calculating a scroll amount, s, based on the calculated angular difference so that the scroll amount has a magnitude that is proportional to the absolute value of the angular difference;

linearly scrolling the selectable items within the selected displayed menu object in a predetermined direction by an amount responsive to the calculated scroll amount, s; and allowing the user to initiate an action by pointing the handheld operation device at and further selecting a scrolled selectable item displayed on the display area of the display device.

25. A non-transitory storage medium according to claim 24, wherein operation data obtained from the handheld device further includes a coordinate set of at least one point corresponding to a position of the imaging target in an image taken by the imaging device;

the program further causes said at least one computer to perform operations including calculating an indicated coordinate set which corresponds to a position on the display area indicated by a user by pointing an imaging direction of the handheld operation device at a display area of the display device, the indicated coordinate set determined based at least in part on said at least one point wherein a user-selected operation target is selected based on the indicated coordinate set.

26. A non-transitory storage medium according to claim 25, wherein a menu object including one or more images is displayed within a predetermined range within the display area of the display device; and the program further causes said at least one computer to perform operations including determining if the indicated coordinate set is within a range corresponding to the predetermined range and, if the indicated coordinate set is within said range, setting the menu object as the user-selected operation target; and moving a display content of the object set as the operation target such that an image displayed in the predetermined range is scrolled in the predetermined direction.

27. A non-transitory storage medium according to claim 25, wherein a displayed virtual space includes an object to be displayed within a predetermined range within the display area of the display device, the object including item images representing selectable items; and the program further causes said at least one computer to perform operations including:

moving a display content of the object which is set as the operation target such that the selectable items are scrolled sequentially in the predetermined direction;

accepting an instruction input from the operation device that indicates that one of the selectable items is selected; and when the instruction input is accepted at a time when an item image is displayed at a position of the calculated indicted coordinate set, determining that the selectable item represented by the item image displayed at a position of the calculated indicted coordinate set is selected.

28. A non-transitory storage medium according to claim 24, wherein a menu object including one or more images is displayed within a predetermined range within the display area of the display device; and the program further causes said at least one computer to perform operations including moving a display content of the menu object so that an image displayed in the predetermined range is scrolled in the predetermined direction.

29. A non-transitory computer readable storage medium according to claim 24 wherein the linear scrolling of selectable items is performed in a first predetermined direction if the calculated angular difference is positive and in a second predetermined direction if the calculated angular difference is negative.

30. An information processing system including an operation device operable by a user and which includes an imaging device for taking an image of a predetermined imaging target, the imaging device taking at least first and second images, and an information processing apparatus communicably connected to the operation device, and a display device, the information processing system comprising:

a processor;

a memory coupled to said processor, said memory storing instructions that, when executed by said processor, control said processor to:

display a window on the display device having a scrollable menu containing selectable items for enabling a user to interact with the displayed selectable items;

receive coordinate sets from the operation device of marker points in a first image of the imaging target taken by the imagining device;

conditionally select a displayed menu for scrolling of selectable items based on a position of said marker points in said taken first image;
calculate a first two-dimensional vector based on coordinate sets of said marker points of a taken first image;
receive coordinate sets from the operation device of marker points in the imaging target from a taken second image;
calculate a second two-dimensional vector based on coordinate sets of marker points of the taken second image;
calculate an angular difference between said first and second two-dimensional vectors, the angular difference indicative of roll rotation of the operation device about an imaging direction axis of the imaging device between the imaging device and the operation target;
calculate a scroll amount, s, based on the calculated angular difference so that the scroll amount has a magnitude that is proportional to the absolute value of the angular difference;
linearly scroll the selectable items within the selected displayed menu object by an amount responsive to the calculated scroll amount, s; and
allow the user to initiate an action by pointing to and further selecting a scrolled selectable item displayed in the menu on the display device.

31. An information processing system according to claim 30, wherein:
a plurality of windows are displayed;
said processor is further controlled to calculate an indicated coordinate set of one point on the display area of the display device, based on a positional relationship between the coordinate sets of the two predetermined points in the first taken image; and
one of the plurality of windows which overlaps the indicated coordinate set is detected and a content in the one window is scrolled in accordance with the rotation amount.

32. A visual entertainment method comprising:
displaying, on a display screen of a display device, a virtual space including one or more operation target other than a cursor;
acquiring, with an optical sensor disposed within a handheld user input device, a plurality of images of an imaging target positioned near the display device;
identifying first and second points corresponding to the imaging target in one or more acquired image;
determining a vector connecting the first point to the second point;
conditionally selecting a displayed operation target other than a cursor based upon an indicated position on the display screen corresponding to a pointing direction of the user input device and determined at least in part based upon positions of the first and second points in an acquired image;
calculating an angular difference value for a change in a direction of a determined vector from a first acquired image and a determined vector from a second acquired image or between a determined vector in an acquired image and a predetermined reference direction corresponding to the imaging target, the angular difference value indicative of a roll rotation of the handheld user input device about an imaging direction axis of the optical sensor between the user input device and the displayed operation target;
calculating a linear displacement amount based on the calculated angular difference value so that the calculated linear displacement amount has a magnitude that is proportional to the absolute value of the angular difference value; and
linearly translating a displayed position of the conditionally selected operation target in a predetermined direction on the display screen by an amount corresponding to the calculated linear displacement amount.

* * * * *